US012737067B2

(12) United States Patent
Bae et al.

(10) Patent No.: US 12,737,067 B2
(45) Date of Patent: Sep. 15, 2026

(54) SYSTEMS AND METHODS FOR TOUCH SENSING BASED ON RESISTOR-CAPACITOR DELAYS

(71) Applicant: The Regents of the University of Colorado, Denver, CO (US)

(72) Inventors: Suyun Bae, Boulder, CO (US); Takanori Fujiwara, Norrköping (SE); Michael Rivera, Lafayette, CO (US); Danielle Szafir, Denver, CO (US); Ellen Do, Denver, CO (US)

(73) Assignee: The Regents of the University of Colorado, Denver, CO (US)

( * ) Notice: Subject to any disclaimer, the term of this patent is extended or adjusted under 35 U.S.C. 154(b) by 218 days.

(21) Appl. No.: 18/642,346

(22) Filed: Apr. 22, 2024

(65) Prior Publication Data

US 2024/0353947 A1 Oct. 24, 2024

Related U.S. Application Data

(60) Provisional application No. 63/497,594, filed on Apr. 21, 2023.

(51) Int. Cl.

| | |
|---|---|
| ***G06F 3/041*** | (2006.01) |
| ***B33Y 80/00*** | (2015.01) |
| ***G06F 3/03*** | (2006.01) |
| ***G06F 3/044*** | (2006.01) |
| ***G06F 3/048*** | (2013.01) |

(52) U.S. Cl.

CPC ............ *G06F 3/0416* (2013.01); *B33Y 80/00* (2014.12); *G06F 3/044* (2013.01); *G06F 2203/04103* (2013.01); *G06F 2203/04104* (2013.01)

(58) Field of Classification Search

CPC .......... G06F 3/03; G06F 3/0354; G06F 3/041; G06F 3/044; G06F 3/0484; G06F 3/0488

See application file for complete search history.

(56) References Cited

U.S. PATENT DOCUMENTS

2011/0187677 A1* 8/2011 Hotelling .............. G06F 3/0443 345/174

2016/0103524 A1* 4/2016 Snelgrove ............. G06F 3/0446 345/174

OTHER PUBLICATIONS

Allahverdi, Kamyar, et al. "Landscaper: A modeling system for 3D printing scale models of landscapes." Computer Graphics Forum. vol. 37. No. 3:439-451, 2018.

(Continued)

*Primary Examiner* — Neel D Shah

(74) *Attorney, Agent, or Firm* — Meunier Carlin & Curfman LLC

(57) ABSTRACT

An exemplary system and method for a single-conductor capacitive touch or contact sensor or human-machine-interface that can be integrated into a 2D or 3D-formed body. The exemplary system and method can be employed in the design and/or construction/fabrication of a tactile sensor-device having minimal instrumentation and wiring to provide interactive functionality. In some embodiments, the exemplary system and method can provide n number of sensing nodes on a device through the use of a single channel input of a controller without multiplexing by evaluating and encoding each sensing node to an RC delay uniquely established for the sensing node.

20 Claims, 16 Drawing Sheets

(56) References Cited

OTHER PUBLICATIONS

Amar, Robert, James Eagan, and John Stasko. "Low-level components of analytic activity in information visualization." IEEE Symposium on Information Visualization, 2005. INFOVIS 2005. IEEE, 2005.
Ang, Kathleen D., et al. "Physicalizing cardiac blood flow data via 3D printing." Computers & Graphics 85 (2019): 42-54.
Arduino. Arduino Uno R3. https://docs.arduino.cc/hardware/uno-rev3, 2023. Accessed: Mar. 24, 2023.
Badger. P., Capacitive sensing library. https://playground.arduino.cc/Main/CapacitiveSensor/. Accessed: Mar. 24, 2023.
Bae, S. Sandra, et al. "Cultivating visualization literacy for children through curiosity and play." IEEE Transactions on Visualization and Computer Graphics 29.1 (2022): 257-267.
Bae, S. Sandra, et al. "Making data tangible: A cross-disciplinary design space for data physicalization." Proceedings of the 2022 CHI Conference on Human Factors in Computing Systems. 2022.
Barabási, A.L, et al. Network Science. Cambridge university press, 2016.
Bennett, et al., The aesthetics of graph visualization. In D. W. Cunningham, G. Meyer, and L. Neumann, eds., Computational Aesthetics in Graphics, Visualization, and Imaging. The Eurographics Association, 2007.
Besançon, et al., "Mouse, tactile, and tangible input for 3D manipulation." In Proc. CHI, pp. 4727-4740, 2017.
Besançon, e al., "The state of the art of spatial interfaces for 3D visualization." Comput Graph Forum, 40(1):293-326, 2021.
Billinghurst, Mark, Adrian Clark, and Gun Lee. "A survey of augmented reality." Foundations and Trends® in Human-Computer Interaction 8.2-3 (2015): 73-272.
Bostock, Michael, Vadim Ogievetsky, and Jeffrey Heer. "$D^3$ data-driven documents." IEEE transactions on visualization and computer graphics 17.12 (2011): 2301-2309.
Brown, Ronald. "Series and parallel resistors and capacitors." The Physics Teacher 41.8 (2003): 483-485.
Burstyn, J., et al., PrintPut: Resistive and capacitive input widgets for interactive 3D prints. In Proc. INTERACT, pp. 332-339, 2015.
S. Davidson. Grasshopper: Algorithmic modeling for Rhino. https://www.grasshopper3d.com/, 2023. Accessed: Mar. 24, 2023.
De Freitas, Alexandre Abreu, et al. "A flexible pipeline to create different types of data physicalizations." 2022 26th International Conference Information Visualisation (IV). IEEE, 2022.
Dehmamy, Nima, Soodabeh Milanlouei, and Albert-László Barabási. "A structural transition in physical networks." Nature 563.7733 (2018): 676-680.
Dijkshoorn, et al., "Characterizing the electrical properties of anisotropic, 3D-printed conductive sheets for sensor applications." IEEE Sens J, 20(23):14218-14227, 2020.
Dimara, Evanthia, and Charles Perin. "What is interaction for data visualization?." IEEE transactions on visualization and computer graphics 26.1 (2019): 119-129.
Djavaherpour, H., et al., (Jun. 2021). Data to physicalization: A survey of the physical rendering process. In Computer Graphics Forum (vol. 40, No. 3, pp. 569-598).
Dorota Grabkowska. What Made Me. https://www.grabkowska.com/what-made-me, 2023.
Drogemuller, et al., Haptic and visual comprehension of a 2D graph layout through physicalisation. In Proc. CHI, 2021.
ESD Association. Fundamentals of electrostatic discharge: Part five—device sensitivity and testing. https://www.esda.org/esd-overview/esdfundamentals/part-5-device-sensitivity-and-testing/, 2011.
Feick, et al., TanGi: Tangible proxies for embodied object exploration and manipulation in virtual reality. In Proc. ISMAR, pp. 195-206, 2020.
Fens, et al., Personal health data: Visualization modalities and their perceived values. In Proc. WSCG, 2014.
Foley, James D., Victor L. Wallace, and Peggy Chan. "The human factors of computer graphics interaction techniques." IEEE computer Graphics and Applications 4.11 (1984): 13-48.
Freksa, Christian, et al. "Geometric problem solving with strings and pins." Spatial Cognition & Computation 19.1 (2019): 46-68.
Fruchterman, Thomas MJ, and Edward M. Reingold. "Graph drawing by force-directed placement." Software: Practice and experience 21.11 (1991): 1129-1164.
Fujiwara, Takanori, et al. "An incremental dimensionality reduction method for visualizing streaming multidimensional data." IEEE transactions on visualization and computer graphics 26.1 (2019): 418-428.
Fujiwara, Takanori, Tarik Crnovrsanin, and Kwan-Liu Ma. "Concise provenance of interactive network analysis." Visual Informatics 2.4 (2018): 213-224.
Gerber, Samuel, et al. "Visual exploration of high dimensional scalar functions." IEEE transactions on visualization and computer graphics 16.6 (2010): 1271-1280.
J. C. Gower, G. B. Dijksterhuis, et al. Procrustes Problems, vol. 30. Oxford University Press on Demand, 2004.
Grosse-Puppendahl, et al., Finding common ground: A survey of capacitive sensing in humancomputer interaction. In Proc. CHI, p. 3293-3315, 2017.
Hagberg, et al., Exploring network structure, dynamics, and function using NetworkX. In G. Varoquaux, T. Vaught, and J. Millman, eds., Proc. SciPy, pp. 11-15, 2008.
Hand. A survey of 3D interaction techniques. Comput Graph Forum, 16(5):269-281, 1997.
Hanton, et al., Protospray: Combining 3d printing and spraying to create interactive displays with arbitrary shapes. In Proc. CHI, CHI '20, p. 1-13, 2020.
Hayes, M. Lcapy: Symbolic linear circuit analysis with Python. PeerJ Comput Sci, p. e875, 2022.
He, et al., Mod-Elec: A design tool for prototyping physical computing devices using conductive 3D printing. Proc. IMWUT, 5(4), 2022.
Heer, et al., Prefuse: A toolkit for interactive information visualizaiton. In Proc. CHI, p. 421-430, 2005.
B. Herman, M. Omdal, S. Zeller, C. A. Richter, F. Samsel, G. Abram, and D. F. Keefe. Multi-touch querying on data physicalizations in immersive AR. Proc ACM Hum-Comput Interact, 5(ISS), 2021.
T. Hermann and H. Ritter. Listen to your data: Model-based sonification for data analysis. Advances in intelligent computing and multimedia systems, 8:189-194, 1999.
G. Hu, M. Mao, Y. Zhao, et al. Remote care and collaboration for empty nest family: Smart home, digital twin and mixed reality. In Proc. ICVR, pp. 126-134, 2022.
H. H. Huang, H. Pfister, and Y. Yang. Is embodied interaction beneficial? A study on navigating network visualizations. Inf Vis, p. 14738716231157082, 2016.
S. Huron, S. Carpendale, A. Thudt, A. Tang, and M. Mauerer. Constructive visualization. In Proc. DIS, p. 433-442, 2014.
M. Ibrahim, Y. Mogan, S. S. Jamry, and R. Periyasamy. Resistivity study on conductive composite filament for freeform fabrication of functionality embedded products. ARPN J Eng Appl Sci, 11(10), 2016.
ISANMATE. Wood filament PLA+. https://www.isanmate.com/productcategory/3d_filaments/pla/wood_filament, 2023.
Y. Ishiguro and I. Poupyrev. 3d printed interactive speakers. In Proceedings of the SIGCHI Conference on Human Factors in Computing Systems, pp. 1733-1742, 2014.
R. J. Jacob, A. Girouard, L. M. Hirshfield, M. S. Horn, O. Shaer, E. T. Solovey, and J. Zigelbaum. Reality-based interaction: A framework for post-WIMP interfaces. In Proc. CHI, p. 201-210, 2008.
Y. Jansen and P. Dragicevic. An interaction model for visualizations beyond the desktop. IEEE TVCG, 19(12):2396-2405, 2013.
Y. Jansen, P. Dragicevic, and J.-D. Fekete. Evaluating the efficiency of physical visualizations. In Proc. CHI, p. 2593-2602, 2013.
Y. Jin, I. Qamar, M. Wessely, A. Adhikari, K. Bulovic, P. Punpongsanon, and S. Mueller. Photo-Chromeleon: Re-programmable multi-color textures using photochromic dyes. In Proc. UIST, p. 701-712, 2019.

(56) References Cited

OTHER PUBLICATIONS

D. Keim. Information visualization and visual data mining. IEEE TVCG, 8(1):1-8, 2002.
J. W. Kelly, M. N. Avraamides, and N. A. Giudice. Haptic experiences influence visually acquired memories: Reference frames during multimodal spatial learning. Psychon Bull Rev, 18:1119-1125, 2011.
A. Kerren, H. Purchase, and M. Ward. Multivariate Network Visualization: Dagstuhl Seminar # 13201. Lecture Notes in Computer Science. Springer International Publishing, 2014.
R. A. Khot, J. Andres, J. Lai, J. von Kaenel, and F. F. Mueller. Fantibles: Capturing cricket fan's story in 3D. In Proc. DIS, p. 883-894, 2016.
M. Le Goc, L. H. Kim, A. Parsaei, J.-D. Fekete, P. Dragicevic, and S. Follmer. Zooids: Building blocks for swarm user interfaces. In Proc. UIST, p. 97-109, 2016.
Z. Liu and J. Stasko. Mental models, visual reasoning and interaction in information visualization: A top-down perspective. IEEE TVCG, 16(6):999-1008, 2010.
I. López García and E. Hornecker. Scaling data physicalization—how does size influence experience? In Proc. TEI, pp. 1-14, 2021.
J. Maxwell. Thermodynamic surfaces. 1871.
M. J. McGuffin, R. Servera, and M. Forest. Path tracing in 2D, 3D, and physicalized networks. IEEE Trans Vis Compute Graph, pp. 1-14, 2023.
A. Meurer, C. P. Smith, M. Paprocki, O.Certík, S. B. Kirpichev, et al. SymPy: Symbolic computing in Python. PeerJ Comput Sci, 2017.
Mosaic Manufacturing. Palette 2. https://www.mosaicmfg.com/products/palette-2, 2023. Accessed: Mar. 24, 2023.
T. D. Ngo, A. Kashani, G. Imbalzano, K. T. Nguyen, and D. Hui. Additive manufacturing (3D printing): A review of materials, methods, applications and challenges. Compos B Eng, 143:172-196, 2018.
M. Ono, B. Shizuki, and J. Tanaka. Touch & activate: adding interactivity to existing objects using active acoustic sensing. In Proc. UIST, pp. 31-40, 2013.
A. Paszke, S. Gross, F. Massa, A. Lerer, J. Bradbury, et al. PyTorch: An imperative style, high-performance deep learning library. In Proc. NeurIPS, vol. 32, 2019.
B. Patnaik, H. Peng, and N. Elmqvist. Sensemaking sans power: Interactive data visualization using color-changing ink. IEEE Transactions on Visualization and Computer Graphics, pp. 1-12, 2022. doi: 10.1109/TVCG.2022.3209631.
Tiago P. Peixoto. 2014. The graph-tool python library. figshare (2014). http://figshare.com/articles/graph_tool/1164194.
T. P. Peixoto. The Netzschleuder network catalogue and repository. https://networks.skewed.de/, 2020.
ProtoPasta. Conductive PLA. https://www.proto-pasta.com/products/conductive-pla, 2023. Accessed: Jun. 28, 2023.
Prusa Research. Original Prusa 13 MK3S+. https://www.prusa3d.com/category/original-prusa-i3-mk3s/, 2023.
R. Justin Stewart. Justin stewart's data sculptures. https://www.rbloggers.com/2013/10/the-maker-way-using-r-to-reify-social-mediadata-via-3d-printing/, 2023.
E. D. Ragan, A. Endert, J. Sanyal, and J. Chen. Characterizing provenance in visualization and data analysis: An organizational framework of provenance types and purposes. IEEE TVCG, 22(1):31-40, 2016.
W.-D. Rase. Creating physical 3D maps using rapid prototyping techniques. True-3D in Cartography: Autostereoscopic and Solid Visualisation of Geodata, pp. 119-134, 2012.
Robert McNeel & Associates. Rhinoceros. https://www.rhino3d.com/, 2023. Accessed: Mar. 24, 2023.
J. C. Roberts, P. D. Ritsos, S. K. Badam, D. Brodbeck, J. Kennedy, and N. Elmqvist. Visualization beyond the desktop—the next big thing. IEEE Comput Graph Appl, 34(6):26-34, 2014.
F. C. Rodríguez, G. Frattini, L. F. Krapp, H. Martinez-Hung, D. M. Moreno, et al. MoleculARweb: A web site for chemistry and structural biology education through interactive augmented reality out of the box in commodity devices. J Chem Educ, 98(7):2243-2255, 2021.
J. S. Roo and M. Hachet. One reality: Augmenting how the physical world is experienced by combining multiple mixed reality modalities. In Proc. UIST, p. 787-795, 2017.
Rosling, Hans. "Global population growth, box by box." TED@ Cannes (2010).
S. Ruder. An overview of gradient descent optimization algorithms. arXiv:1609.04747, 2016.
K. A. Satriadi, J. Smiley, B. Ens, M. Cordeil, T. Czauderna, et al. Tangible globes for data visualisation in augmented reality. In Proc. CHI, 2022.
A. Satyanarayan, D. Moritz, K.Wongsuphasawat, and J. Heer. Vega-Lite: A grammar of interactive graphics. IEEE TVCG, 23(1):341-350, 2016.
V. Savage, C. Chang, and B. Hartmann. Sauron: embedded single-camera sensing of printed physical user interfaces. In Proc. UIST, pp. 447-456, 2013.
V. Savage, R. Schmidt, T. Grossman, G. Fitzmaurice, and B. Hartmann. A series of tubes: Adding interactivity to 3D prints using internal pipes. In Proc. UIST, p. 3-12, 2014. https://doi.org/10.1145/2642918.2647374.
M. Schmitz, M. Khalilbeigi, M. Balwierz, R. Lissermann, M. Mühlhäuser, and J. Steimle. Capricate: A fabrication pipeline to design and 3D print capacitive touch sensors for interactive objects. In Proc. UIST, p. 253-258, 2015.
Schmitz, M., Stitz, M., Müller, F., Funk, M., & Mühlhäuser, M. (May 2019) . . . /trilaterate: A fabrication pipeline to design and 3D print hover-, touch-, and force-sensitive objects. In Proceedings of the 2019 CHI conference on human factors in computing systems (pp. 1-13).
K. J. Schönborn, G. E. Höst, and K. E. Lundin Palmerius. Interactive visualization for learning and teaching nanoscience and nanotechnology. In K. Winkelmann and B. Bhushan, eds., Global Perspectives of Nanoscience and Engineering Education, pp. 195-222. Springer, 2016.
E. Segel and J. Heer. Narrative visualization: Telling stories with data. IEEE TVCG, 16(6):1139-1148, 2010.
Shervashidze, S. Vishwanathan, T. Petri, K. Mehlhorn, and K. Borgwardt. Efficient graphlet kernels for large graph comparison. In Artificial intelligence and statistics, pp. 488-495. PMLR, 2009.
B. Shneiderman. The eyes have it: A task by data type taxonomy for information visualizations. In Proc. VL, pp. 336-343, 1996.
W.-S. Soh, K.-Y. See, W.-Y. Chang, M. Oswal, L.-B. Wang, et al. Comprehensive analysis of serpentine line design. In 2009 Asia Pacific Microwave Conference, pp. 1285-1288. IEEE, 2009.
S. Stusak, M. Hobe, and A. Butz. If your mind can grasp it, your hands will help. In Proc. TEI, p. 92-99, 2016.
S. Stusak, J. Schwarz, and A. Butz. Evaluating the memorability of physical visualizations. In Proc. CHI, p. 3247-3250, 2015.
S. Stusak, A. Tabard, F. Sauka, R. A. Khot, and A. Butz. Activity Sculptures: Exploring the impact of physical visualizations on running activity. IEEE TVCG, 20(12):2201-2210, 2014.
S. Swaminathan, C. Shi, Y. Jansen, P. Dragicevic, L. A. Oehlberg, and J.-D. Fekete. Supporting the design and fabrication of physical visualizations. In Proc. CHI, p. 3845-3854, 2014.
F. Taher, Y. Jansen, J. Woodruff, J. Hardy, K. Hornbæk, and J. Alexander. Investigating the use of a dynamic physical bar chart for data exploration and presentation. IEEE TVCG, 23(1):451-460, 2017.
C. E. Tejada, R. Ramakers, S. Boring, and D. Ashbrook. Airtouch: 3dprinted touch-sensitive objects using pneumatic sensing. In Proc. CHI, pp. 1-10, 2020.
M. C. Thrun and F. Lerch. Visualization and 3D printing of multivariate data of biomarkers. In Proc. WSCG, 2016.
Ultimaker. Ultimaker S3. https://ultimaker.com/3d-printers/ultimaker-s3, 2023.
J. Vasquez, H. Twigg-Smith, J. Tran O'Leary, and N. Peek. Jubilee: An extensible machine for multi-tool fabrication. In Proc. CHI, p. 1-13, 2020.

(56) References Cited

OTHER PUBLICATIONS

G. Verhulsdonck. Issues of designing gestures into online interactions: Implications for communicating in virtual environments. In Proc. DOC, pp. 26-33, 2007.

P. Virtanen, R. Gommers, T. E. Oliphant, M. Haberland, et al. SciPy 1.0: Fundamental algorithms for scientific computing in Python. Nat Methods, 17:261-272, 2020.

Y. Wang, Z. Jin, Q. Wang, W. Cui, T. Ma, and H. Qu. DeepDrawing: A deep learning approach to graph drawing. IEEE TVCG, 26(1):676-686, 2020.

M. Whitlock, S. Smart, and D. A. Szafir. Graphical perception for immersive analytics. In Proc. VR, pp. 616-625, 2020.

K. Willis, E. Brockmeyer, S. Hudson, and I. Poupyrev. Printed optics: 3D printing of embedded optical elements for interactive devices. In Proc. UIST, pp. 589-598, 2012.

J. A. Wittkopf, K. Erickson, p. Olumbummo, A. Hartman, H. Tom, and L. Zhao. 3d printed electronics with multi jet fusion. In NIP & Digital Fabrication Conference, vol. 2019, pp. 29-33. Society for Imaging Science and Technology, 2019.

K. Xu, S. Attfield, T. Jankun-Kelly, A. Wheat, P. H. Nguyen, and N. Selvaraj. Analytic provenance for sensemaking: A research agenda. IEEE Comput Graph Appl, 35(3):56-64, 2015.

J. S. Yi, Y. a. Kang, J. Stasko, and J. Jacko. Toward a deeper understanding of the role of interaction in information visualization. IEEE TVCG, 13(6):1224-1231, 2007.

A. Ynnerman, J. Löwgren, and L. Tibell. Exploranation: A new science communication paradigm. IEEE Comput Graph Appl, 38(3):13-20, 2018.

A. Ynnerman, T. Rydell, D. Antoine, D. Hughes, A. Persson, and P. Ljung. Interactive visualization of 3D scanned mummies at public venues. Commun ACM, 59(12):72-81, 2016.

Moritz Bächer, Benjamin Hepp, Fabrizio Pece, Paul G. Kry, Bernd Bickel, Bernhard Thomaszewski, and Otmar Hilliges. 2016. DefSense: Computational design of customized deformable input devices. In Proc. CHI. ACM, New York, NY, USA, 3806-3816. https://doi.org/10.1145/2858036.2858354.

S. Sandra Bae, Takanori Fujiwara, Anders Ynnerman, Ellen Yi-Luen Do, Michael L. Rivera, and Danielle Albers Szafir. 2024. A computational design pipeline to fabricate sensing network physicalizations. IEEE Transactions on Visualization and Computer Graphics 30, 1 (2024), 913-923. https://doi.org/10.1109/TVCG.2023.3327198.

Rafael Ballagas, Sarthak Ghosh, and James Landay. 2018. The design space of 3D printable interactivity. Proceedings of the ACM on Interactive, Mobile, Wearable and Ubiquitous Technologies 2, 2 (2018), 1-21.

Patrick Baudisch and Stefanie Mueller. 2017. Personal fabrication. Foundations and Trends® in Human-Computer Interaction 10, 3-4 (2017), 165-293. https://doi.org/10.1561/1100000055.

Chris. 2018. The perfect multi-button input resistor ladder. http://www.ignorantofthings.com/2018/07/the-perfect-multi-button-input-resistor.html.

David Espalin, Danny W Muse, Eric MacDonald, and Ryan B Wicker. 2014. 3D Printing multifunctionality: Structures with electronics. The International Journal of Advanced Manufacturing Technology 72 (2014), 963-978.

Patrick F. Flowers, Christopher Reyes, Shengrong Ye, Myung Jun Kim, and Benjamin J. Wiley. 2017. 3D printing electronic components and circuits with conductive thermoplastic filament. Additive Manufacturing 18 (2017), 156-163. https://doi.org/10.1016/j.addma.2017.10.002.

Guo Liang Goh, Haining Zhang, Tzyy Haur Chong, and Wai Yee Yeong. 2021. 3D printing of multilayered and multimaterial electronics: a review. Advanced Electronic Materials 7, 10 (2021), 2100445.

Daniel Groeger, Elena Chong Loo, and Jürgen Steimle. 2016. HotFlex: Post-print customization of 3D prints using embedded state change. In Proc. CHI. ACM, New York, NY, USA, 420-432. https://doi.org/10.1145/2858036.2858191.

Peter E Hart, Nils J Nilsson, and Bertram Raphael. 1968. A formal basis for the heuristic determination of minimum cost paths. IEEE Transactions on Systems Science and Cybernetics 4, 2 (1968), 100-107.

Garrett Johnson. 2023. three-mesh-bvh. https://github.com/gkjohnson/threemesh-bvh. Accessed: Sep. 10, 2023.

Eric Macdonald, Rudy Salas, David Espalin, Mireya Perez, Efrain Aguilera, Dan Muse, and Ryan B. Wicker. 2014. 3D Printing for the rapid prototyping of structural electronics. IEEE Access 2 (2014), 234-242. https://doi.org/10.1109/access.2014.2311810.

Fabian Pedregosa, Gaël Varoquaux, Alexandre Gramfort, Vincent Michel, Bertrand Thirion, et al. 2011. Scikit-learn: Machine learning in Python. Journal of Machine Learning Research 12 (2011), 2825-2830.

Huaishu Peng, Jennifer Mankoff, Scott E. Hudson, and James McCann. 2015. A layered fabric 3D printer for soft interactive objects. In Proc. CHI. ACM, New York, NY, USA, 1789-1798. https://doi.org/10.1145/2702123.2702327.

Narjes Pourjafarian, Anusha Withana, Joseph A. Paradiso, and Jürgen Steimle. 2019. Multi-Touch Kit: A do-it-yourself technique for capacitive multi-touch sensing using a commodity microcontroller. In Proc. UIST (New Orleans, LA, USA). ACM, New York, NY, USA, 1071-1083. https://doi.org/10.1145/3332165.3347895.

Jordi-Roger Riba, Francesca Capelli, and Manuel Moreno-Eguilaz. 2019. Analysis and mitigation of stray capacitance effects in resistive high-voltage dividers. Energies 12, 12 (2019). https://doi.org/10.3390/en12122278.

Jarek Rossignac. 2005. Shape complexity. The Visual Computer 21 (2005), 985-996.

Munehiko Sato, Ivan Poupyrev, and Chris Harrison. 2012. Touché: enhancing touch interaction on humans, screens, liquids, and everyday objects. In Proceedings of the SIGCHI Conference on Human Factors in Computing Systems (Austin, Texas, USA) (CHI '12). Association for Computing Machinery, New York, NY, USA, 483-492. https://doi.org/10.1145/2207676.2207743.

Martin Schmitz, Florian Müller, Max Mühlhäuser, Jan Riemann, and Huy Viet Viet Le. 2021. Itsy-Bits: Fabrication and recognition of 3D-printed tangibles with small footprints on capacitive touchscreens. In Proc. CHI. ACM, New York, NY, USA, Article 419, 12 pages. https://doi.org/10.1145/3411764.3445502.

Martin Schmitz, Jürgen Steimle, Jochen Huber, Niloofar Dezfuli, and Max Mühlhäuser. 2017. Flexibles: Deformation-aware 3D-printed tangibles for capacitive touchscreens. In Proc. CHI. ACM, New York, NY, USA, 1001-1014. https://doi.org/10.1145/3025453.3025663.

Bane Sullivan and Alexander Kaszynski. 2019. PyVista: 3D plotting and mesh analysis through a streamlined interface for the Visualization Toolkit (VTK). Journal of Open Source Software 4, 37 (May 2019), 1450. https://doi.org/10.21105/joss.01450.

Saiganesh Swaminathan, Jonathon Fagert, Michael Rivera, Andrew Cao, Gierad Laput, Hae Young Noh, and Scott E. Hudson. 2020. OptiStructures: Fabrication of room-scale interactive structures with embedded fiber Bragg grating optical sensors and displays. Proceedings of the ACM on Interactive, Mobile, Wearable and Ubiquitous Technologies 4, 2, Article 50 (Jun. 2020), 21 pages. https://doi.org/10.1145/3397310.

three.js authors. 2023. three.js. https://github.com/mrdoob/three.js. Accessed: Sep. 10, 2023.

Nobuyuki Umetani and Ryan Schmidt. 2017. SurfCuit: Surface-mounted circuits on 3D prints. IEEE Computer Graphics and Applications 37, 3 (2017), 52-60. https://doi.org/10.1109/MCG.2017.40.

Guanyun Wang, Fang Qin, Haolin Liu, Ye Tao, Yang Zhang, Yongjie Jessica Zhang, and Lining Yao. 2020. MorphingCircuit: An integrated design, simulation, and fabrication workflow for self-morphing electronics. Proceedings of the ACM on Interactive, Mobile, Wearable and Ubiquitous Technologies 4, 4 (2020), 1-26.

Qingnan Zhou and Alec Jacobson. 2016. Thingi10k: A dataset of 10,000 3Dprinting models. arXiv preprint arXiv:1605.04797 (2016).

Junyi Zhu, Lotta-Gili Blumberg, Yunyi Zhu, Martin Nisser, Ethan Levi Carlson, Xin Wen, Kevin Shum, Jessica Ayeley Quaye, and Stefanie Mueller. 2020. CurveBoards: Integrating breadboards into

(56) References Cited

OTHER PUBLICATIONS physical objects to prototype function in the context of form. In Proc. CHI. ACM, New York, NY, USA, 1-13. https://doi.org/10.1145/3313831.3376617.

Junyi Zhu, Yunyi Zhu, Jiaming Cui, Leon Cheng, Jackson Snowden, Mark Chounlakone, Michael Wessely, and Stefanie Mueller. 2020. MorphSensor: A 3D electronic design tool for reforming sensor modules. In Proc. UIST (Virtual Event, USA). ACM, New York, NY, USA, 541-553. https://doi.org/10.1145/3379337.3415898.

* cited by examiner a
302
$R_1$ ($r_1\Omega$)
Microcontroller
3D-printed object
b
$R_2$ ($r_2\Omega$)
306a
$R_p$ ($r_p\Omega$)
306b
$p^{th}$ touch point
310
306c
$R_N$ ($r_N\Omega$)
C (c farad)
304
$V_{in}$ ($v_{in}$ volt)
Receive pin
GND
GND
$R_{N+1}$ ($r_{N+1}\Omega$)

Obtain design data for an object or network that includes nodes for touch sensing 502

Identify links between the nodes 504

Determine a resistance value for each of the identified links such that an RC delay of each node is different 506

Generate a layout for a touch sensing circuit 508

Adjust the layout using an optimization algorithm 510

Generate a geometry file for the object or network that includes the touch sensing circuit 512

Print a 3D model based on the geometry file 514

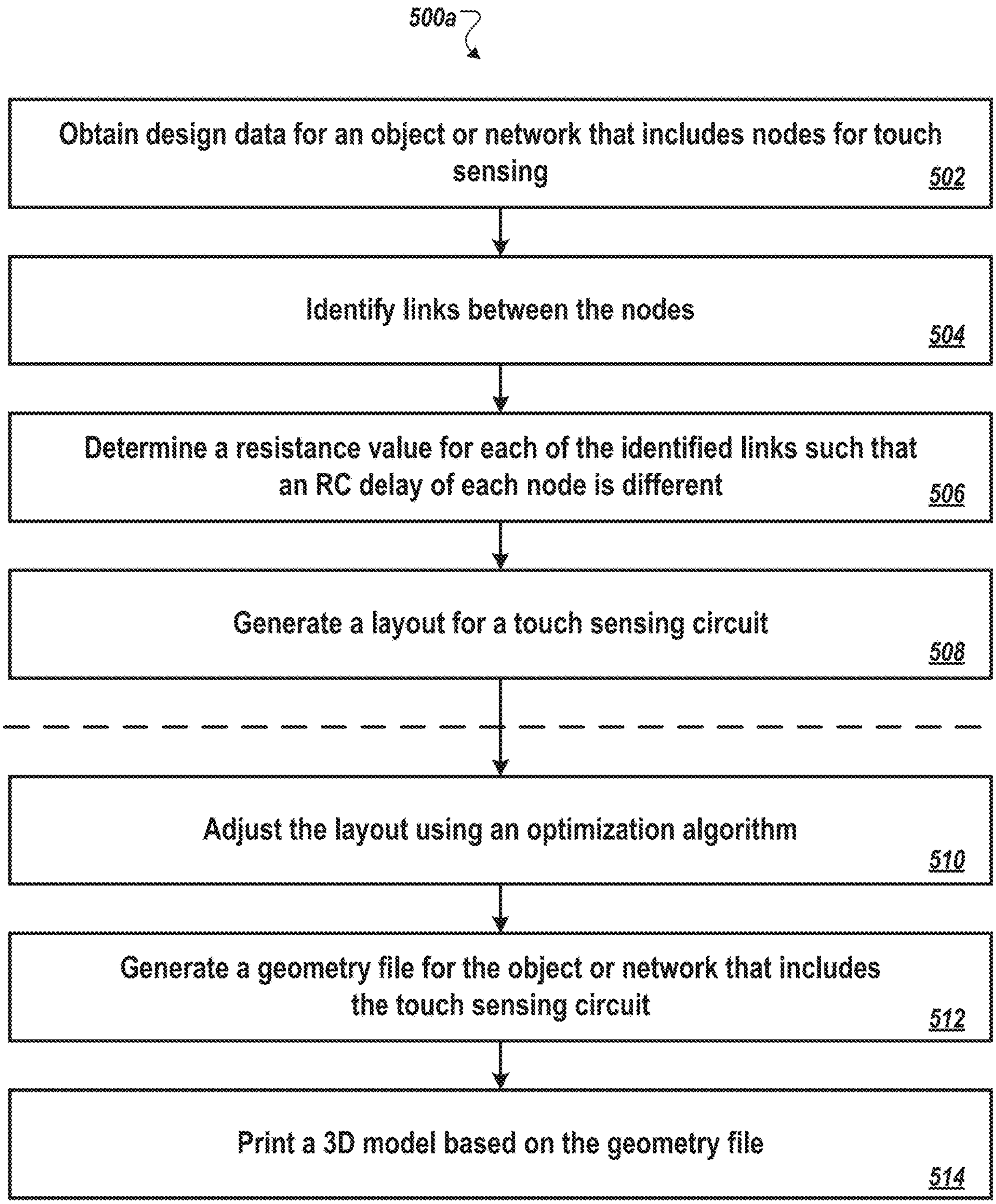

*FIG. 5A*

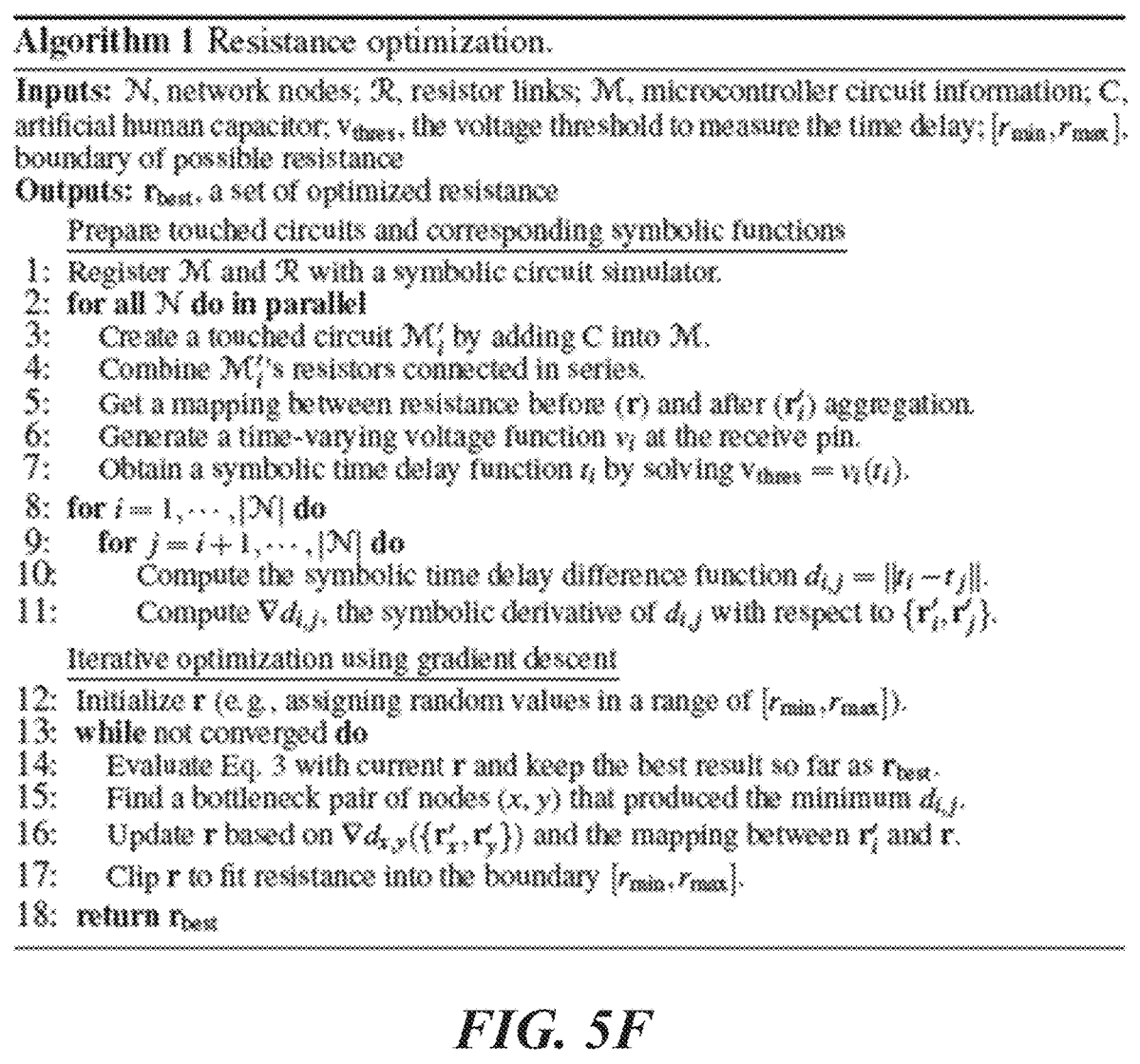

Algorithm 1 Resistance optimization.

Inputs: $\mathcal{N}$, network nodes; $\mathcal{R}$, resistor links; $\mathcal{M}$, microcontroller circuit information; C, artificial human capacitor; $v_{thres}$, the voltage threshold to measure the time delay; $[r_{min}, r_{max}]$, boundary of possible resistance

Outputs: $\mathbf{r}_{best}$, a set of optimized resistance

Prepare touched circuits and corresponding symbolic functions

```
Register 𝓜 and 𝓡 with a symbolic circuit simulator.
for all 𝓝 do in parallel
    Create a touched circuit 𝓜'_i by adding C into 𝓜.
    Combine 𝓜'_i's resistors connected in series.
    Get a mapping between resistance before (r) and after (r'_i) aggregation.
    Generate a time-varying voltage function v_i at the receive pin.
    Obtain a symbolic time delay function t_i by solving v_thres = v_i(t_i).
for i = 1, ···, |𝓝| do
    for j = i + 1, ···, |𝓝| do
        Compute the symbolic time delay difference function d_{i,j} = ||t_i − t_j||.
        Compute ∇d_{i,j}, the symbolic derivative of d_{i,j} with respect to {r'_i, r'_j}.
```

Iterative optimization using gradient descent

```
Initialize r (e.g., assigning random values in a range of [r_min, r_max]).
while not converged do
    Evaluate Eq. 3 with current r and keep the best result so far as r_best.
    Find a bottleneck pair of nodes (x, y) that produced the minimum d_{i,j}.
    Update r based on ∇d_{x,y}({r'_x, r'_y}) and the mapping between r'_i and r.
    Clip r to fit resistance into the boundary [r_min, r_max].
return r_best
```

*FIG. 5F*

(a) Required resistance (b) Required conduit length

| | Object Information | | | | Completion Time (s) | | | | |
|---|---|---|---|---|---|---|---|---|---|
| | volume (mm$^3$) | triangles | voxels | touch points | voxelize | Dijkstra | circuit embed | misc | total |
|  *Stanford Bunny* | 302391 | 259898 | 444696 | 5 | 60 | 53 | 12 | 28 | 155 |
|  *MIDI Drumpad (4)* | 78284 | 2116 | 50176 | 4 | 1 | 3 | 6 | 5 | 16 |
|  *Hilbert Curve* | 173667 | 39936 | 285897 | 10 | 12 | 1 | 51 | 49 | 117 |
|  *Globe* | 317412 | 29472 | 325651 | 6 | 19 | 23 | 9 | 23 | 74 |
|  *Chinese Lion* | 613578 | 69994 | 384825 | 6 | 23 | 133 | 23 | 22 | 201 |

SYSTEMS AND METHODS FOR TOUCH SENSING BASED ON RESISTOR-CAPACITOR DELAYS

RELATED APPLICATION

This application claims priority to, and the benefit of, U.S. Provisional Patent Application No. 63/497,594, filed Apr. 21, 2023, entitled "SYSTEMS AND METHODS FOR TOUCH SENSING BASED ON RESISTOR-CAPACITOR DELAYS," which is incorporated by reference in its entirety.

STATEMENT REGARDING FEDERALLY SPONSORED RESEARCH OR DEVELOPMENT

This invention was made with government support under grant numbers 1764089, 2040489, and 2320920, awarded by the National Science Foundation. The government has certain rights in the invention.

BACKGROUND

In modern times, many physical objects integrate sensors for detecting touch, which can be used to provide feedback to users or otherwise introduce interactivity. Commonly, touch sensors detect touch based on capacitance, resistance, or pressure changes. It may be desirable to integrate touch sensing into 3-dimensional (3D) objects, e.g., to introduce interactivity; however, current touch sensors and touch-sensing techniques may not be suitable for integration into complex 3D objects, such as network physicalizations. For example, many objects made on 3D printers are static forms with no interactive capabilities.

There are benefits to improving instrumentation for interactivity and tactile or contact sensors.

SUMMARY

An exemplary system and method are disclosed for a single-conductor capacitive touch or contact sensor or human-machine-interface that can be integrated into a 2D or 3D-formed body. The exemplary system and method can be employed in the design and/or construction/fabrication of a tactile sensor-device having minimal instrumentation and wiring to provide interactive functionality. In some embodiments, the exemplary system and method can provide n number of sensing nodes on a device through the use of a single channel input of a controller without multiplexing by evaluating and encoding each sensing node to an RC delay uniquely established for the sensing node.

In some embodiments, the exemplary system and method can be implemented using a computational pipeline that can determine capacitive touchpoints into any 3D models with optimized electrical resistance configurations for each of the user-defined touchpoints.

RC delay is the time required to charge a capacitor in a circuit through a particular amount of resistance. By creating unique RC time delays for all touchpoints, each touchpoint can be capacitively sensed using a single-wire or double-wire connection. The exemplary system and method can enable interactivity in 3D printed objects for an extensive range of 3D geometry while imposing minimal instrumentation of electronic components.

The computational pipeline, in some embodiments, can allow a designer to prepare a freeform model (e.g., 3D modeling with CAD software or using an existing 3D model) and select different areas on the model's surface to turn them into touchpoints and wiring connection point(s). The pipeline then can employ a graph-based pathfinding algorithm to serially connect the touchpoints and use the serial path to generate conductive traces (i.e., 3D-printable resistors) between each pair of touchpoints using a serpentine trace space-filling algorithm. In some embodiments, the computational pipeline can generate parallel connections, e.g., to optimize resistance values. The pipeline can additionally produce meshes that are 3D printed with conductive and non-conductive materials. After 3D printing, the user can wire the object to a microcontroller with either a single-wire or double-wire connection and perform calibration. In some embodiments, the computational pipeline can voxelate the provided freeform model to generate a volume to which the pipeline can constraint the desired electronics. Several studies were conducted that demonstrate the scalability, performance, accuracy, and applicability of the approach.

In an aspect, a system is disclosed for capacitive touch sensing, the system comprising a resistor network (single or double wire connection configuration) comprising a first subcircuit and a plurality of touch-sensing nodes, the plurality of touch-sensing nodes including a first node and one or more additional nodes, wherein: i) the first node is electrically connected to the first subcircuit by a first conductor, ii) the first node is electrically connected to at least one of the one or more additional nodes by a second conductor, and iii) the one or more additional touch-sensing nodes are electrically interconnected by respective third conductors; and a controller configured to: detect a voltage drop on the first subcircuit responsive to one of the plurality of touch-sensing nodes being touched or contacted; and determine which of the plurality of touch-sensing nodes was touched or contacted (e.g., by a capacitive body, human or otherwise) based on a time delay between detecting the voltage drop and a voltage on the first subcircuit returning to a first threshold, wherein each of the plurality of touch-sensing nodes is associated with a unique time delay responsive to being touched.

In some embodiments, the controller is further configured to apply an initial voltage to the first subcircuit.

In some embodiments, the controller is configured to output an encoded signal (analog, digital output) or a data value (computer data) of the determined touch-sensing node (e.g., via analog, digital, serial output pins, via a transmission via a network, wired or wireless).

In some embodiments, the controller is further configured to determine when two of the plurality of touch-sensing nodes are simultaneously touched (e.g., a sum of the RC delays for N points are designed to be a unique value such that when multiple are touches, the delays can be decomposed into the summed components (each individual RC delay) to localize multiple touches.), wherein the controller is configured to modify the output of the encoded signal (analog, digital output) or the data value (computer data) based on the determination.

In some embodiments, the plurality of touch-sensing nodes each has (i) an area having a defined resistance that is substantially lower than the conductors and (ii) the area having a define capacitance that is substantially higher than the conductors to effect a resistor-capacitor (RC) delay when touched or contacted by the capacitive body.

In some embodiments, the first conductor, second conductor, and third conductors are conductive traces, ink, or dyes.

In some embodiments, the circuit is integrated or embedded into a substrate comprising a 3-dimensional (3D) object.

In some embodiments, the controller comprises a microcontroller, wherein the single-conductor circuit is connected to a general purpose input/output pin (using analog sensing in a digital circuit), and wherein the determining which of the plurality of touch-sensing nodes.

In some embodiments, the substrate is a fabric or textile (e.g., fibers, yarns, smart textile).

In some embodiments, the single-conductor circuit forms a touch or contact sensor (e.g., robotic applications, HMI) sensitive to electrostatic discharge.

In some embodiments, the 3D object and the circuit are 3D printed using multi-material printing. In some embodiments, the object can be a 2D object, e.g., a sensor, surface, or fabric.

In some embodiments, the resistor network was determined by constructing a weighted neighbor graph of vertices and finding a path (e.g., shortest path, optimized path for material, interference, path that sprovides unique sensing) between pairs of vertices.

In another aspect, a method is disclosed for detecting touch at a given location on a substrate, the method comprising: providing a touch-sensing circuit formed on the substrate, the touch-sensing circuit comprising a first subcircuit and a plurality of touch-sensing nodes, the plurality of touch-sensing nodes including a first node and one or more additional nodes, wherein: i) the first node is electrically connected to the first subcircuit by a first conductor, ii) the first node is electrically connected to at least one of the one or more additional nodes by a second conductor, and iii) the one or more additional touch-sensing nodes are electrically interconnected by respective third conductors; detecting a voltage drop on the first subcircuit responsive to one of the plurality of touch-sensing nodes being touched or contacted by a capacitive body; and determining which of the plurality of touch-sensing nodes was touched or contacted based on a time delay between detecting the voltage drop and a voltage on the first subcircuit returning to a threshold, wherein each of the plurality of touch-sensing nodes is associated with a unique time delay responsive to being touched.

In some embodiments, the method further includes applying an initial voltage to the first subcircuit.

In some embodiments, the method further includes outputting an encoded signal (analog, digital output) or a data value (computer data) of the determined touch-sensing node.

In some embodiments, the circuit is integrated into a 3-dimensional (3D) object or fabric.

In some embodiments, the 3D object and the circuit are 3D printed using multi-material printing.

In another aspect, a method of fabricating a resistor network for an capacitive touch or contact sensing apparatus, the method comprising: forming a resistor network (single or double wire connection configuration) comprising a first subcircuit and a plurality of touch-sensing nodes, the plurality of touch-sensing nodes including a first node and one or more additional nodes, wherein: i) the first node is electrically connected to the first subcircuit by a first conductor, ii) the first node is electrically connected to at least one of the one or more additional nodes by a second conductor, and iii) the one or more additional touch-sensing nodes are electrically interconnected by respective third conductors; and connecting a controller to the resistor network, the controller being configured to: (i) detect a voltage drop on the first subcircuit responsive to one of the plurality of touch-sensing nodes being touched or contacted and (ii) determine which of the plurality of touch-sensing nodes was touched or contacted (e.g., by a capacitive body, human or otherwise) based on a time delay between detecting the voltage drop and a voltage on the first subcircuit returning to a first threshold, wherein each of the plurality of touch-sensing nodes is associated with a unique time delay responsive to being touched.

In another aspect, a system is disclosed for designing a circuit for capacitive touch sensing, the system comprising: one or more processors; and memory having instructions stored thereon that, when executed by the one or more processors, cause the system to: obtain design data for an object or a network, wherein the design data includes two or more predefined nodes for sensing touch on the object or the network; identify a link between each of the two or more predefined nodes, wherein each of the two or more predefined nodes is connected to at least one other node via a respective link, and wherein each link acts as a resistor between respective ones of the two or more nodes; calculate a resistance value for each of link such that each of the two or more nodes causes a unique resistive-capacitive (RC) time delay when touched; and generate a layout for the circuit that includes the two or more predefined nodes and the links between the two or more predefined nodes based on the calculated resistance values.

In some embodiments, the instructions, when executed by the one or more processors, cause the system to: receive a 3D model for the object; voxelize the 3D model as a freeform model; and trim voxels close to the freeform model surface to generate a trimmed voxel representation; construct a weighted neighbor graph from the trimmed voxel representation to provide the design data having the two or more predefined nodes.

In some embodiments, the design data is a 3-dimensional (3D) digital model of the object or the network.

In some embodiments, the instructions further cause the system to adjust the layout using a trained neural network.

In some embodiments, the trained neural network is configured to determine whether any of the links between the two or more predefined nodes are intersecting.

In some embodiments, the instructions further cause the system to generate a geometry file of the object or the network that includes the circuit.

In some embodiments, the circuit is embedded within the object or the network.

In some embodiments, the instructions further cause the system to print a 3-dimensional (3D) model of the object or the network via a 3D printer.

In some embodiments, the 3D model of the object or the network is printed with two or more materials, wherein one of the two or more materials is a conductive material.

In some embodiments, each link comprises a conductive trace printed with the conductive material.

In some embodiments, the step of generating a layout for the circuit comprises determining, for each identified link, a length and/or a thickness of the link that corresponds to an associated calculated resistance.

In another aspect, a method of designing a circuit for sensing touch, the method comprising: obtaining design data for an object or a network, wherein the design data includes two or more predefined nodes for sensing touch on the object or the network; identifying a link between each of the two or more predefined nodes, wherein each of the two or more predefined nodes is connected to at least one other node via a respective link, and wherein each link acts as a resistor between respective ones of the two or more nodes; calculating a resistance value for each of link such that each of the two or more nodes causes a unique resistive-capacitive (RC) time delay when touched; and generating a layout for the circuit that includes the two or more predefined nodes and the links between the two or more predefined nodes based on the calculated resistance values.

In some embodiments, the design data is a 3-dimensional (3D) digital model of the object or the network.

In some embodiments, the method includes adjusting the layout using a trained neural network.

In some embodiments, the trained neural network is configured to determine whether any of the links between the two or more predefined nodes are intersecting.

In some embodiments, the method further includes generating a geometry file of the object or the network that includes the circuit.

In some embodiments, the circuit is embedded within the object or the network.

In some embodiments, the method further includes printing a 3-dimensional (3D) model of the object or the network via a 3D printer.

In some embodiments, the 3D model of the object or the network is printed with two or more materials, wherein one of the two or more materials is a conductive material.

In some embodiments, each link comprises a conductive trace printed with the conductive material.

In some embodiments, the step of generating a layout for the circuit comprises determining, for each identified link, a length and/or a thickness of the link that corresponds to an associated calculated resistance.

Additional features will be set forth in part in the description which follows or may be learned by practice. The features will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

FIGS. 5A-5F show a flow chart and associated process for modeling and a first algorithm for a touch sensing circuit in accordance with an illustrative embodiment.

Figure 1A:
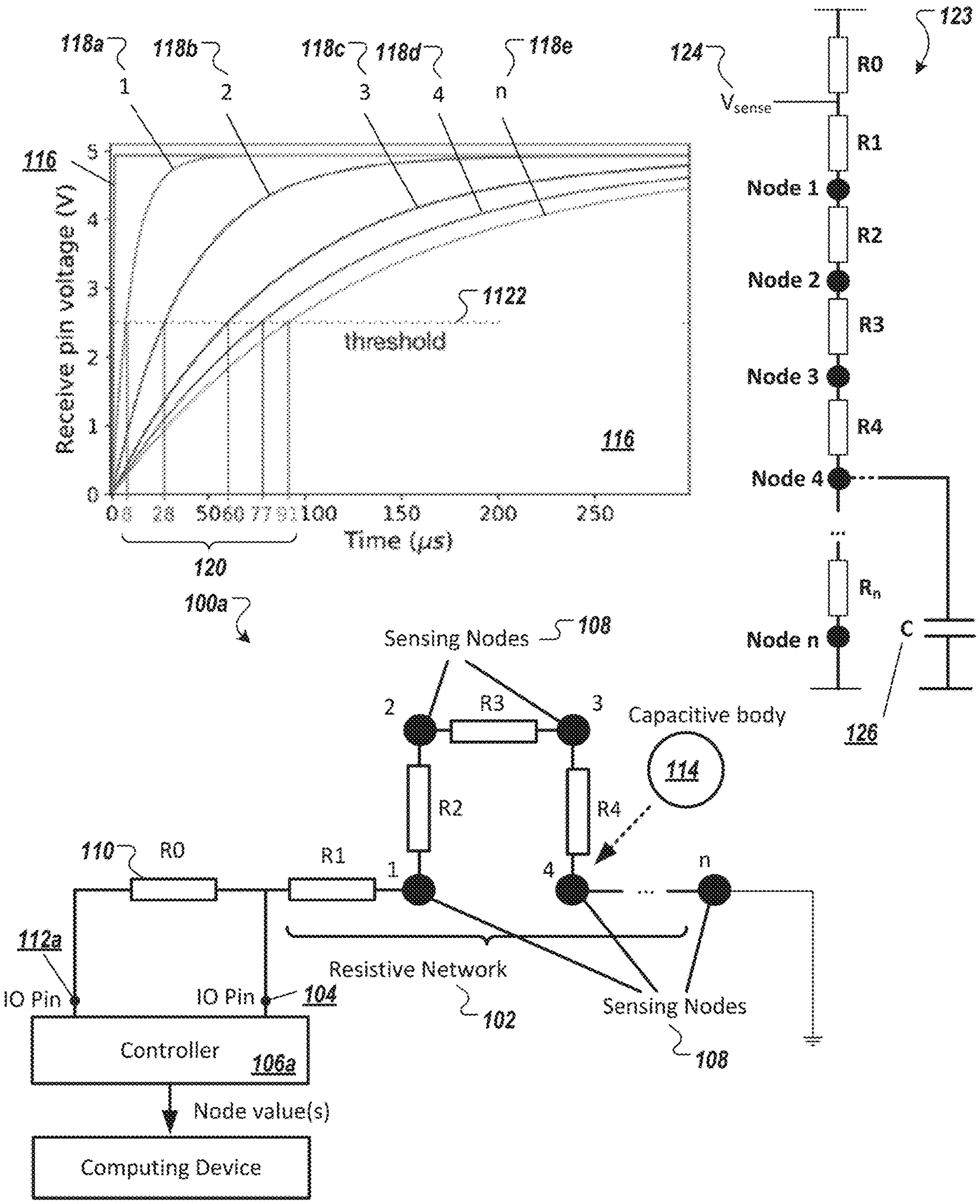
FIGS. 1A, 1B, 1C each shows an example system 100 (shown as 100*a*, 100*b*, 100*c*) comprising a single-conductor capacitive touch or contact sensor that is formed on a substrate 101 (not shown, see FIG. 1B, 1C, among others) and operatable based on RC-delay detection, in accordance with an illustrative embodiment.

Various objects, aspects, and features of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

To facilitate an understanding of the principles and features of various embodiments of the present invention, they are explained hereinafter with reference to their implementation in illustrative embodiments.

Some references, which may include various patents, patent applications, and publications, are cited in a reference list and discussed in the disclosure provided herein. The citation and/or discussion of such references is provided merely to clarify the description of the present disclosure and is not an admission that any such reference is "prior art" to any aspects of the present disclosure described herein. In terms of notation, "[n]" corresponds to the n-th reference in the list. All references cited and discussed in this specification are incorporated herein by reference in their entirety and to the same extent as if each reference was individually incorporated by reference.

Example System

Figure 1B:
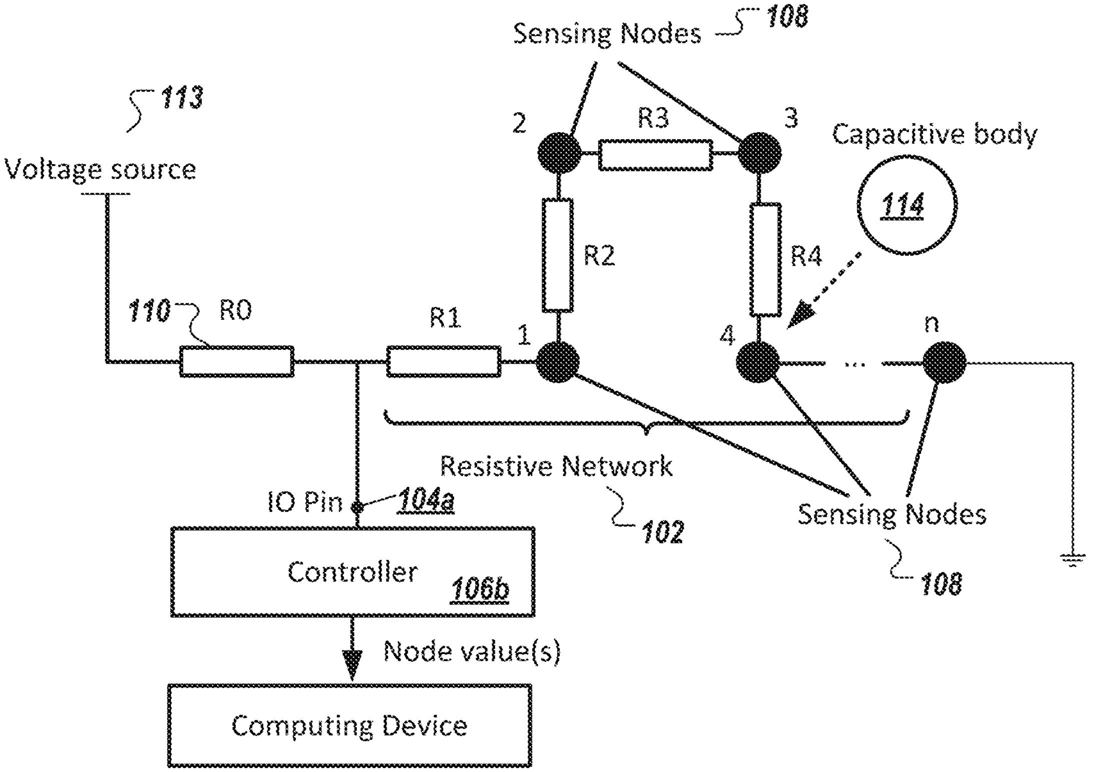
Figure 1C:
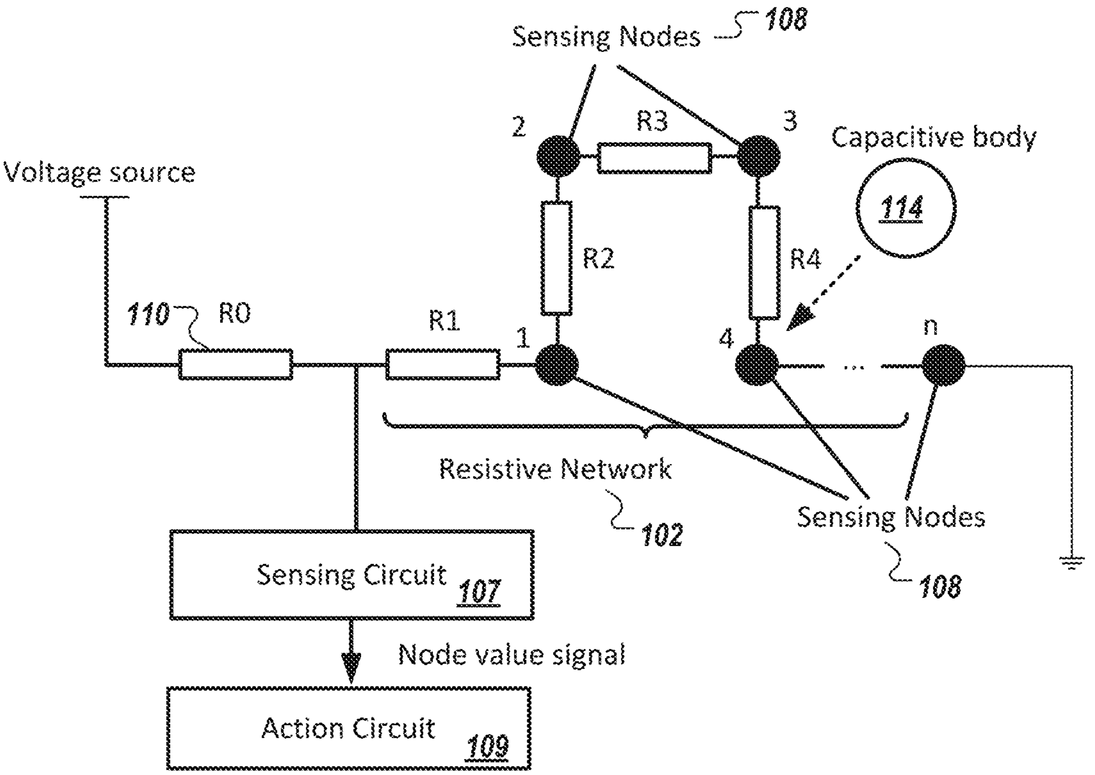

FIGS. 1A, 1B, 1C each shows an example system 100 (shown as 100*a*, 100*b*, 100*c*) comprising a single-conductor capacitive touch or contact sensor that is formed on a substrate 101 (not shown, see FIG. 1B, IC, among others) and operatable based on RC-delay detection, in accordance with an illustrative embodiment. In the example shown in FIG. 1A, the system 100*a* includes a resistor network 102 that forms a voltage divider circuit with a high-impedance input digital pin 104 of an embedded microcontroller 106 (shown as "Controller" 106*a*) and a resistor "R0" 110 coupled to a voltage source 112 (shown as "IO Pin" 112*a*). To this end, controller 106 can provide a voltage and serve as a voltage source for the resistor network 102. In FIG. 1B, the system 100*b* shows the resistor network 102 forming the voltage divider circuit with an external voltage source 113 that couples to a voltage sense input 104 (shown as 104*a*) of the embedded microcontroller 106 (shown as "Controller" 106*b*) through the resistor "R0" 110. In FIG. 1C, system 100*c* shows the resistor network 102 forming the voltage divider circuit with an external voltage source 113 that couples to a sensing circuit 107 configured to sense voltage input and generate an output, corresponding to a RC time delay, to an action circuit 109.

In each of FIGS. 1A, 1B, and 1C, the resistor network 102 includes a plurality of touch-sensing nodes 108 (shown as sensing nodes "1," "2," "3," "4," and "5") that are connected by interconnects having resistance values (shown as "R1," "R2," "R3," "R4," and "R5"). In the example shown in FIGS. 1A-1C, the resistor network 102 includes a set of repeating resistive conductor/interconnect and a sensing node (shown as "R1" and node "1, "R2" and node "2", "R3"

and node "3", "R4" and node "4", and "R5" and node 5). Each sensing node 108 has an area having a defined resistance that is substantially lower than the conductors and an area having a define capacitance that is substantially higher than the conductors to effect a resistor-capacitor (RC) delay when touched or contacted by the capacitive body.

In the example shown in FIG. 1A, and similarly for the implementations shown in FIGS. 1B and 1C, the controller 106 is configured to detect, via RC-delay detection, a voltage drop at the sensing pin 104, in the resistive network 102 responsive to one of the plurality of touch-sensing nodes 108 being touched or contacted by a capacitive body 114. RC delay refers to the amount of time needed to charge a capacitor defined by the capacitive coupling between the node and the capacitive body 114 (e.g., person). To this point, the touch-sensing circuit described herein leverages the RC delay through the geometry of conductive traces between nodes.

In plot 116, the RC delay for each sensing node 108 in the resistive network 102 is shown for a given touch or contact by the capacitive body 114. As shown in plot 116, a given touch or contact by the capacitive body 114 at a respective sensing node 108 causes a voltage drop 116 followed by a voltage recovery defined by different RC delays (shown as node "1" 118*a*, node "2" 118*b*, node "3" 118*c*, node "4" 118*d*, and node "5" 118*c*) resulting from the different aggregated resistance value at which capacitance from the capacitive body is introduced to the resistive network. That is, the voltage recovery for each of the difference nodes 118 would have a different RC delay 118*a*-118*e* having a different corresponding time 120 to which the voltage would recover and reach a pre-defined threshold 122. To this end, each sensing node 108 of the resistive network 102 is associated with a unique time delay responsive to being touched or contacted.

An equivalent circuit diagram 123 is shown for this example when node "4" is touched or contacted by the capacitive body 114. In diagram 123, nodes "1" to node "n" are shown interconnected by resistor "R1" to resistor "$R_n$". A voltage sense 124 is defined between R0 and the resistive networks R1 to Rn. With the temporary contact or touch at node "4", the capacitive body 114 provides a capacitance 126 to the resistive network at node "4" to form a temporary RC circuit, resulting in the voltage drop and recovery for RC-delay detection at Vsense 124. A common ground between the controller 106 and resistor network 102 are employed to ensure the same reference voltage. The number of nodes 108 can be 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32. In some embodiments, the number of nodes 108 can be greater than 32, e.g., dependent on having a distinguishable margin in the detectable time 122.

The controller 106 can thus determine which of the plurality of touch-sensing nodes 108 was touched or contacted (e.g., by a capacitive body, human or otherwise) based on time count at which a time delay between a detected voltage drop and the voltage returning to the threshold 120. The controller 106 may implement a clock to count the number of cycles for the time, which can be mapped to a given node. That is, the controller is configured to detect a voltage drop in the resistive network responsive to one of the plurality of touch-sensing nodes being touched or contacted and determine which of the plurality of touch-sensing nodes was touched or contacted (e.g., by a capacitive body, human or otherwise) based on a time delay between detecting the voltage drop and a voltage on the first subcircuit returning to a first threshold, wherein each of the plurality of touch-sensing nodes is associated with a unique time delay responsive to being touched. In the example shown in FIG. 1A, the threshold is set at about 0.5 (e.g., 2.5V) of the source voltage. In some embodiments, the threshold may be set between 0.5 and 0.9 of the source voltage, e.g., 0.50, 0.55, 0.60, 0.65, 0.70, 0.75, 0.80, 0.85, 0.90. To determine the resistance values in the resistor network, in some embodiments, a weighted neighbor graph of vertices may be generated to which an optimized path, e.g., based on shortest path, material, interference, unique sensing, or a combination thereof, among others, between pairs of the vertices may be employed.

In some embodiments, the controller (106) comprises a microcontroller having an input pin or general purpose input/output pin (using analog sensing in a digital circuit), which can be used to provide for the voltage drop measure and corresponding time to voltage recovery.

In some embodiments, each or a portion of the sensing nodes has resistance in the 1Ω-100Ω range, e.g., about 10 Ω, 20 Ω, 30 Ω, 40 Ω, 50 Ω, 60 Ω, 70 Ω, 80 Ω, 90 Ω, 100Ω, while the conductors may have resistance in the range of 10 kΩ-10 MΩ, e.g., 10 kΩ, 20 kΩ, 30 kΩ, 40 kΩ, 50 kΩ, 60 kΩ, 70 kΩ, 80 kΩ, 90 kΩ, 100 kΩ, 200 kΩ, 250 kΩ, 300 kΩ, 350 kΩ, 400 kΩ, 450 kΩ, 500 kΩ, 550 kΩ, 600 kΩ, 650 kΩ, 700 kΩ, 750 kΩ, 800 kΩ, 850 kΩ, 900 kΩ, 950 kΩ, 1000 kΩ, 2 MΩ, 3 MΩ, 4 MΩ, 5 MΩ, 6 MΩ, 7 MΩ, 8 MΩ, 9 MΩ, 10 MΩ. In some embodiments, the sensing node has a resistance of less than 10Ω, e.g., less than 1Ω. In some embodiments, the sensing node has resistance up to 1 kΩ or 10 kΩ. At much smaller resistances, the sensing resolution (ability of the microcontroller to sense a change in voltage) could be a limiting factor. The ranges are merely illustrative as the resistance for the conductors and sensing nodes can be tailored via the techniques and processes described herein.

The resistance values may be defined by conductive wires, metal traces, or conductive ink or dyes (e.g., having serpentine winding). In some embodiments, the conductive wires, metal traces, or conductive ink or dyes are coupled to an external resistive component, e.g., surface mounts, carbon pile, carbon film, and metal film, among others. The conductive wires, metal traces, or conductive ink or dyes may be insulated, e.g., encapsulated by a non-conductive sheath or film.

Indeed, the plurality of touch-sensing nodes including a first node and one or more additional nodes, where i) the first node is electrically connected to the first subcircuit by a first conductor, ii) the first node is electrically connected to at least one of the one or more additional nodes by a second conductor, and iii) the one or more additional touch-sensing nodes are electrically interconnected by respective third conductors.

Referring still to FIG. 1A, and similarly in FIGS. 1B and 1C, once controller 106 (e.g., 106*a*, 106*b*) or circuit 107 has determined the time of the RC-delay, the controller 106 or circuit 107 is configured to output an encoded signal (analog, digital output) or a data value (computer data) of the determined touch-sensing node (e.g., via analog, digital, serial output pins, via a transmission via a network, wired or wireless). For 5 nodes, 6 analog outputs may be used, with one of the outputs corresponding to "no contact." Digital outputs may be encoded in a 4-bit, 5-bit, 6-bit, 7-bit, 8-bit data stream, etc. Similarly, a data value can be encoded as an 8-bit integer, 16-bit integer, or 24-bit integer data value, among others, e.g., char, float, etc.

In some embodiments, the controller is further configured to determine when two of the plurality of touch-sensing nodes are simultaneously touched. In such embodiments, the sum of the RC delays for the combination of any two nodes can be configured to be unique such that when multiple are touched, the delays can be decomposed into the summed components (each individual RC delay) to localize multiple touches.

As used herein, the substrate 101 can be a two-dimensional (2D) or 3-dimensional (3D) object. The resistive network 102 may be adhered to the substrate 101. In some embodiments, the substrate may be formed into a fabricated resistive network 102, e.g., via 3D printers. In some embodiments, substrate 101 and resistive networks 102 may be printed via a single 3D printer system or other additive manufacturing system. In some embodiments, the substrate is a fabric or textile (e.g., fibers, yarns, smart textile). In some embodiments, the 3D object and the circuit are 3D printed using multi-material printing. In some embodiments, object 102 can be a 2D object, e.g., a sensor, surface, or fabric.

The system (e.g., 100) may be employed as a sensor, e.g., for robotics or human-machine interface devices. In some embodiments, the system is implemented as an interactive object that can receive input (e.g., from touch) and produce output (e.g., light, sound, color change) in a controlled manner. The sensing network may respond to touch inputs for interactive physicalizations. In some embodiments, the sensing networks may be integrated into trace routing for 3D-printed optical fibers [108], electroluminescent inks [38], or color-changing dyes [53]. The substrate may employ color-changing inks [69]. In some embodiments with sound output, 3D-printed speakers may be used for sonification [43].

Figure 4:
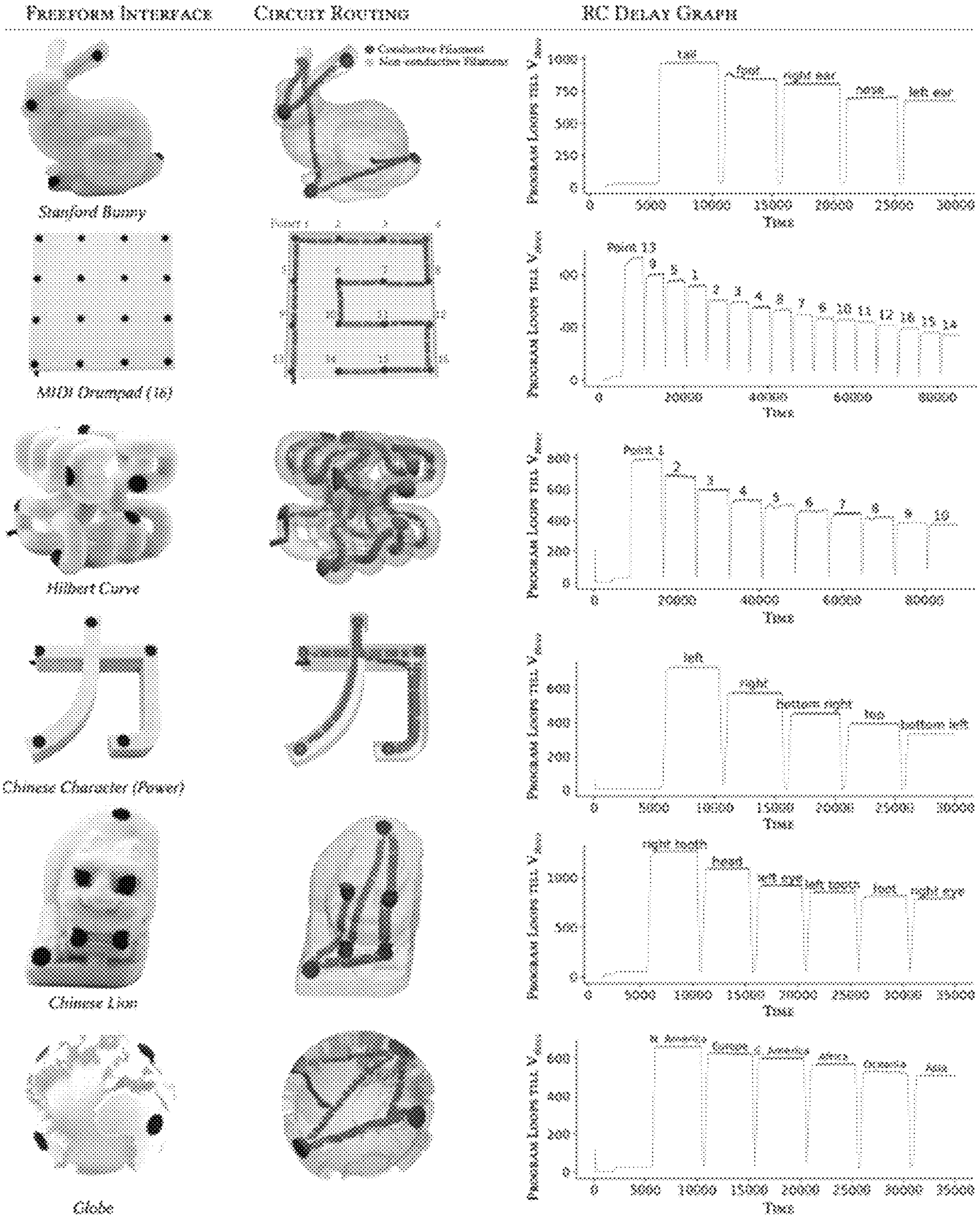
FIG. 4 shows some examples 3D printed model, its internal circuit, and its respective RC delay graph with the single-wire connection.

FIG. 4 shows some examples 3D printed model, its internal circuit, and its respective RC delay graph with the single-wire connection. The capacitive body 114 may have a capacitance value or charge to cause the voltage drop when touched or contacted to the sensing nodes 108.

Example Operation

Figure 2A:
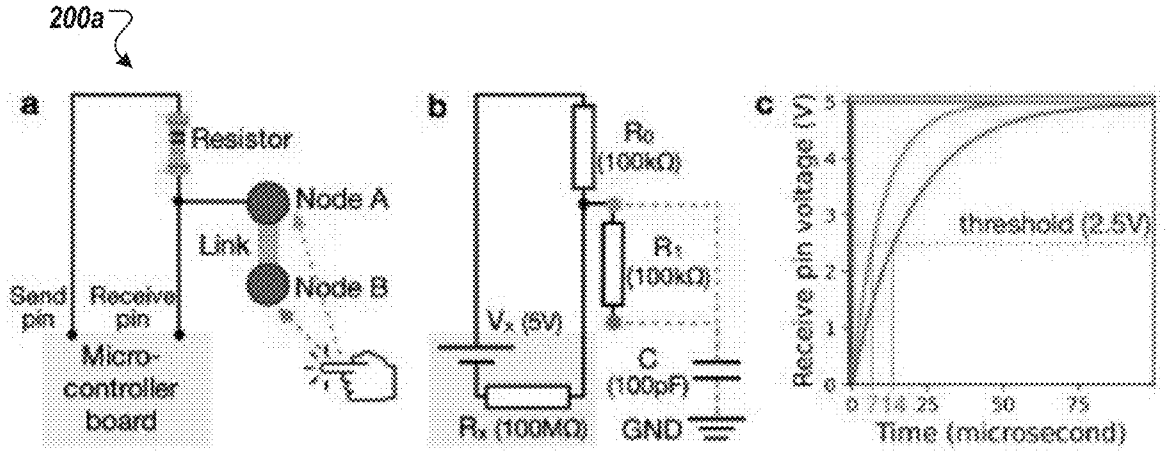
FIG. 2A shows an example touch-sensing circuit and associated methods.

FIG. 2A shows an example touch-sensing circuit and associated methods. Each node, when touched by a person, causes a unique response in the circuit due to a phenomenon known as resistor-capacitor (RC) delay. Specifically, when a person touches a node, the person's body and the node become capacitively coupled (e.g., energy moves from the node into the person's body, which acts as a ground), inducing an RC delay. As noted, RC delay refers to the amount of time needed to charge a capacitor between the node and the capacitive body. In particular, the connections between nodes (e.g., conductive traces) can be designed with unique resistance values such that each capacitive region (e.g., regions that function as entry points of capacitive coupling for the RC delay) takes a different amount of time to charge once a user touches it. That is, each node induces a different RC delay in the circuit when touched or contacted with the capacitive body. This enables a controller to determine which node in a multi-node circuit has been touched by measuring the time taken to reach a predefined voltage threshold (e.g., 2.5V). For example, in FIG. 2A, 0 μs indicates that no nodes are touched, 7 μs indicates that "Node A" has been touched, and 14 μs indicates that "Node B" has been touched.

The circuit design can be determined, in some embodiments, by identifying links to be used as resistors (e.g., "resistor links") from the input data to which a suitable resistance for each resistor link is selected such that the RC delay is different for each node of the circuit. A layout can then be generated, e.g., to obtain a 3D representation network. In some implementations, the circuit layout can be adjusted using a neural network, e.g., to prevent conductive components (e.g., nodes and resistor links) from intersecting to avoid interference with the circuit.

Turning to FIG. 2A, subpanel A, circuit 200*a* shows a first subcircuit and plurality of nodes (e.g., "Node A" and "Node B") that are connected to the first subcircuit. In some implementations, the first subcircuit extends from a transmission pin or output of controller 106 to a receiving pin or input of controller 106. In some such implementations, controller 106 applies a voltage to the first subcircuit via the transmission pin or output and senses a voltage on the first subcircuit via the receiving pin or input. In other implementations, a voltage is applied on the first subcircuit by another source (e.g., another circuit, a power source, etc.), and the controller (e.g., 106) (shown as a "microcontroller board") is configured only to sense a voltage on the first subcircuit. In some implementations, for example, controller 102 senses a voltage of circuit 200*a* via a sensor (e.g., a voltage sensor) rather than being directly connected, e.g., in series, to the first subcircuit of circuit 200*a*.

As shown, the plurality of nodes are generally connected to the first subcircuit through a first node ("Node A"). In some implementations, the first node ("Node A") is the only node that connects to the first subcircuit, and each additional node ("Node B") connects to the first node or another node of the plurality of nodes. In the example shown, "Node A" is connected directly to the first subcircuit, and "Node B" is connected to "Node A" through a conductive link. Generally, each node of the plurality of nodes is connected to at least one other node through a conductive link. In some implementations, each conductive link has a resistance value. Shown in FIG. 2A, subpanel B, for example, the link between "Node A" and "Node B" may have a resistance of 100 kΩ. In addition, the first subcircuit may include a resistor (e.g., 100 kΩ in the example of FIG. 2A, subpanel B) such that the link(s) between each node form a voltage divider.

As discussed above, the conductive links that connect each node may have a resistance value that is specifically selected to cause a unique RC delay for each node when touched or contacted. In the example of FIG. 2A, "Node A" and "Node B" are connected by a link with a resistance of 100 kΩ. As shown in FIG. 2A, subpanel C, this results in a unique RC delay profile (e.g., time delay) for each node when touched or contacted. In some implementations, an initial voltage (e.g., 5V) may be applied to circuit 100 such that when a node is touched or contacted, a voltage drop is detected. In FIG. 2A, subpanel C, for example, 5V is applied to circuit 100; so, if none of the nodes are touched, controller 106 detects a voltage of 5V. If "Node A" is touched, however, the voltage detected by controller 106 may drop momentarily, e.g., to 0V, as the "capacitive region" formed due to the capacitive coupling between the person's body and the node charges. As the capacitive region charges (e.g., back to 5V), a unique RC delay profile (e.g., shown in FIG. 2A, subpanel C) is detected.

A microcontroller (e.g., controller 106) can include a processor and memory. While shown as individual components, it will be appreciated that processor and/or memory can be implemented using a variety of different types and quantities of processors and memory. For example, the processor may represent a single processing device or multiple processing devices. Similarly, memory may represent a single memory device or multiple memory devices. Processor can be a microcontroller, microprocessor, an ASIC, one or more FPGAs, a group of processing components, or other suitable electronic processing structures. In some embodiments, the processor is configured to execute program code stored in memory to cause the controller to perform one or more operations, as described below in greater detail. It will be appreciated that, in embodiments where the controller is part of another computing device, the components of controller may be shared with, or the same as, the host device.

Memory can include one or more devices (e.g., memory units, memory devices, storage devices, etc.) for storing data and/or computer code for completing and/or facilitating the various processes described in the present disclosure. In some embodiments, the memory includes tangible (e.g., non-transitory), computer-readable media that store code or instructions executable by the processor. Tangible, computer-readable media refers to any physical media that is capable of providing data that causes the controller to operate in a particular fashion. Examples of tangible, computer-readable media may include, but are not limited to, volatile media, non-volatile media, removable media, and non-removable media implemented in any method or technology for storage of information such as computer-readable instructions, data structures, program modules or other data. Accordingly, memory can include RAM, ROM, hard drive storage, temporary storage, non-volatile memory, flash memory, optical memory, or any other suitable memory for storing software objects and/or computer instructions. Memory can include database components, object code components, script components, or any other type of information structure for supporting the various activities and information structures described in the present disclosure. Memory can be communicably connected to processor 104, such as via processing circuit, and can include computer code for executing (e.g., by processor 104) one or more processes described herein.

Single-Wire Connection and Double-Wire Connection

Figure 2B:
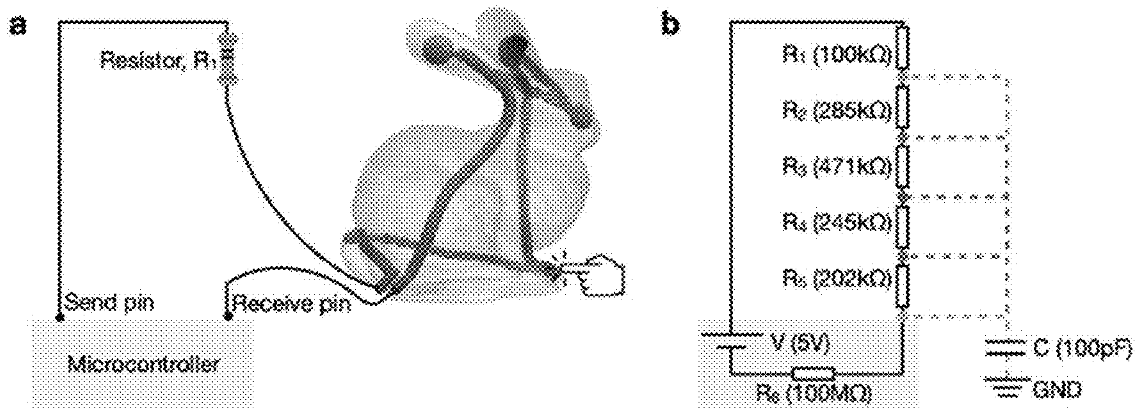
FIGS. 2B and 2C each show a single-wire connection configuration and double-wire connection, respectively, for the single-conductor capacitive touch or contact sensor.
Figure 2C:
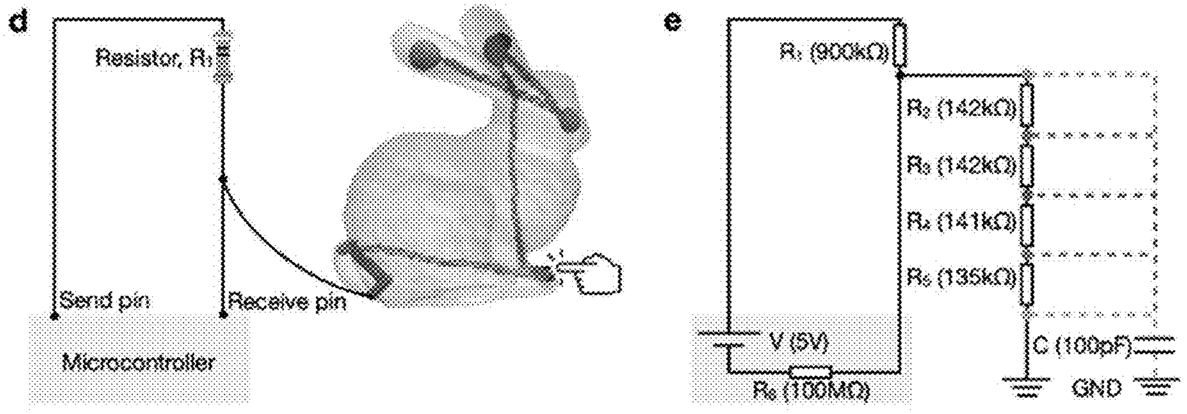

FIGS. 2B and 2C each show a single-wire connection configuration and double-wire connection, respectively, for the single-conductor capacitive touch or contact sensor. When using high resistance for the conductive traces in the low-conductivity conduits, a double-wire connection can be employed as long as each low-conductivity conduit has sufficiently high resistance. To support a single-wire connection, the interplay of all resistances in the circuit must be considered as the single-wire connection can form a parallel circuit (FIG. 2C, subpanel B) while the double-wire connection results in a series circuit (FIG. 2B, subpanel B).

Double-wire Connection. When a substrate (e.g., freeform model) is connected to the single-conductor capacitive touch or contact sensor, each low-conductivity conduit has to have a sufficiently large resistance (e.g., 50 kΩ), to allow the voltage sensing to have sufficient buffer to capture the RC delay differences among the touchpoints.

Figure 3A:
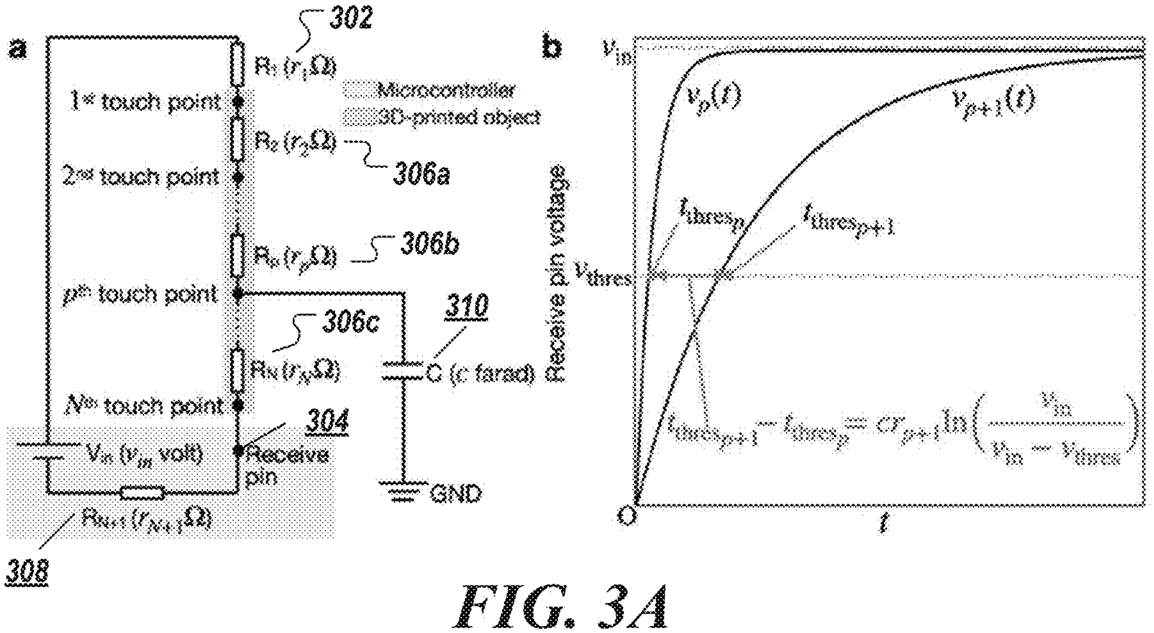
FIGS. 3A and 3B show an example circuit relationship for a double-wire connection configuration and single-wire connection, respectively, in accordance with an illustrative embodiment.

FIG. 3A shows an example circuit where R1 (302) is a resistor connected to a microcontroller having voltage sensing input 104 (shown as 304), and R2, . . . , RN (N: the number of touchpoints) (e.g., 102; shown as 306*a*, 306*b*, . . . , 306*c*) are the resistors embedded into the 3D printed object. The voltage sensing input 304 has a voltage source with $v_{in}$ and a resistor between its voltage source and the receive pin. In this illustration, the microcontroller's resistor (308) and its resistance are shown as $R_{N+1}$ and $r_{N+1}$, respectively. In addition, the capacitor formed by touch has capacitance c (e.g., 114, shown as 310).

When touching the p-th touchpoint (1≤p≤N), the voltage change measured at the receive pin can be written per Equation 1.

$$v_p(t) = v_{in}\left(1 - \exp\left(-\frac{t \cdot r_{all}}{c \cdot r_{all} r_{after}}\right)\right)\frac{r_{N+1} r_{till}^2 r_{after}^2}{r_{all}\left(\sum_{i=0}^{p} r_i r_{after}\right)} \quad \text{(Eq. 2A)}$$

In Equation 2A, t is the time to charge a capacitor;

$$r_{all} = \sum_{j=1}^{N+1} r_i,\ r_{till} = \sum_{j=1}^{p} r_p,$$

and $$r_{after} = \sum_{j=p+1}^{N+1} r_j.$$

To induce a high-impedance state for the receive pin, $r_{N+1}$ is usually very large (e.g., 100MΩ). This value can be predetermined, e.g., by the microcontroller's manufacturer. When r1, . . . , rN (306*a* . . . 306C) are relatively small (e.g., 100 kΩ), Equation 1 can be approximated as Equation 2B.

$$v_p(t) \approx v_{in}\left(1 - \exp\left(-\frac{t}{c \cdot r_{till}}\right)\right) \quad \text{(Eq. 2B)}$$

From Equation 2B, the time required to reach a microcontroller's logic threshold voltage, $v_{thres}$ can be approximated as Equation 3.

$$t_{thres_p} \approx c \cdot r_{till} \ln\left(\frac{v_{in}}{v_{in} - v_{thres}}\right) \quad \text{(Eq. 3)}$$

Figure 2D:
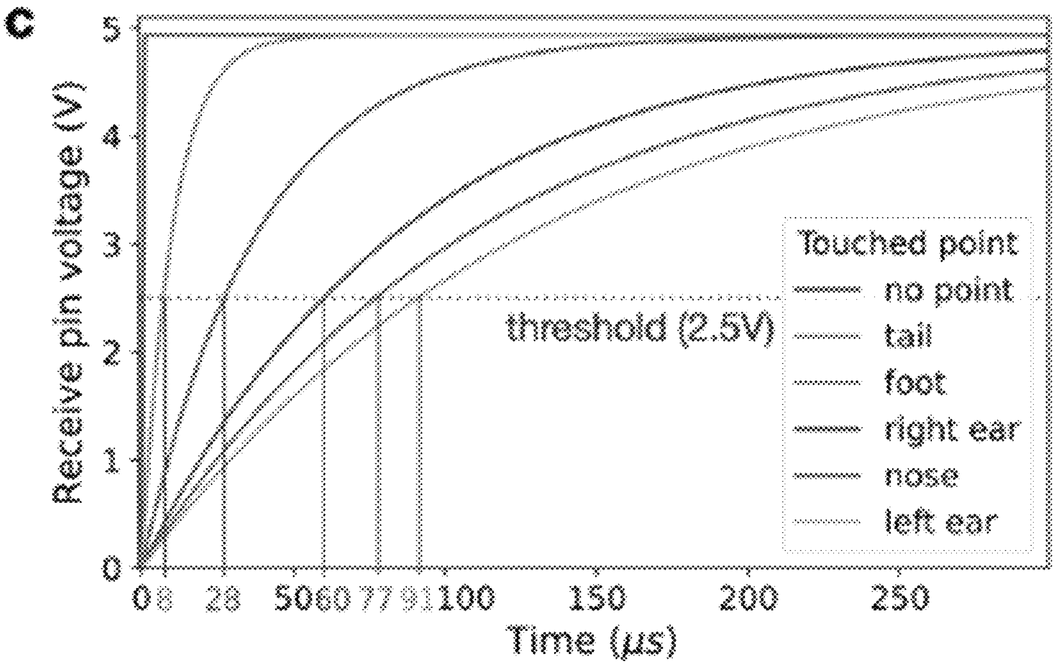
FIGS. 2D and 2E each show the RC delay associated with the single-wire connection configuration and double-wire connection configuration ofs FIGS. 2B and 2C, respectively, in accordance with an illustrative embodiment.
Figure 2E:
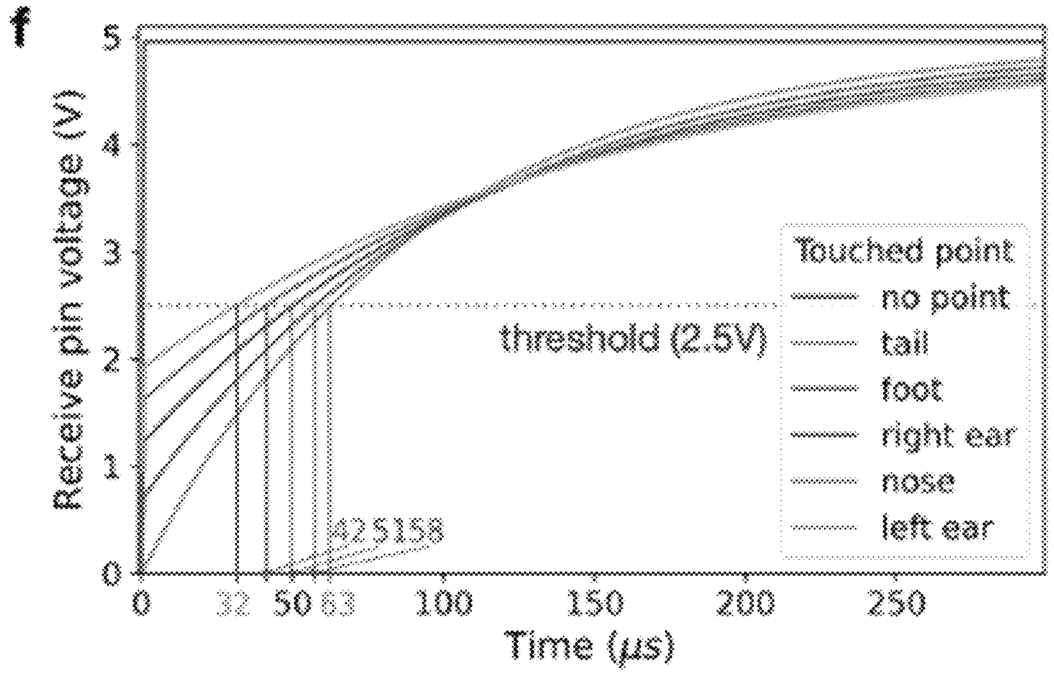

FIGS. 2D and 2E each show the RC delay associated with the single-wire connection configuration and double-wire connection configuration ofs FIGS. 2B and 2C, respectively, in accordance with an illustrative embodiment.

FIG. 3A, subpanel B shows the relationship derived from Equations 1-3. Using Eq. 3, the RC delay can be considered to only depend on $r_{till}$ as the cumulative sum of resistance values involved from the voltage source to a selected touchpoint. The value $t_{thres_{p+1}} - t_{thres_p}$ can be derived as $$c \cdot r_{p+1} \ln\left(\frac{v_{in}}{v_{in} - v_{thres}}\right),$$

indicating that larger resistance for each of r1, . . . , rN can result in larger differences between $t_{thres_p}$ and $t_{thres_{p+1}}$. To this end, $t_{thres1} \le t_{thres2} \le \ldots \le t_{thres_N}$ because c≥0, $r_p \ge 0$, and $$\ln\left(\frac{v_{in}}{v_{in} - v_{thres}}\right) \ge 0.$$

Per the above, the double-wire connection can be determined by generating a serpentine trace pattern (alone in combination with external resistance) that is as long as possible within a conduit's volume. Thus, the resistive network only needs to ensure $t_{thres_{p+1}} - t_{thres_p}$ is sufficient large for a microcontroller to measure (e.g., 200 clock cycles of a microcontroller's CPU). When $r_{till}$ is extremely large, $t_{thres_p}$ may be too large to provide reasonable latency for interactivity (e.g., when $t_{thres_p}$>10 ms). For example, a hypothetical scenario where $t_{thres_p}$>10 ms may require $r_{till}$>140 MΩ when using certain microcontroller and c=100 pF as a representative capacitance [7]. Under this assumption, $v_{in}$=5 V, and $v_{thres}$=2.5V. Generating conductive traces where $r_{till}$>140 MΩ inside a freeform model may be infeasible without external resistance.

Figure 3B:
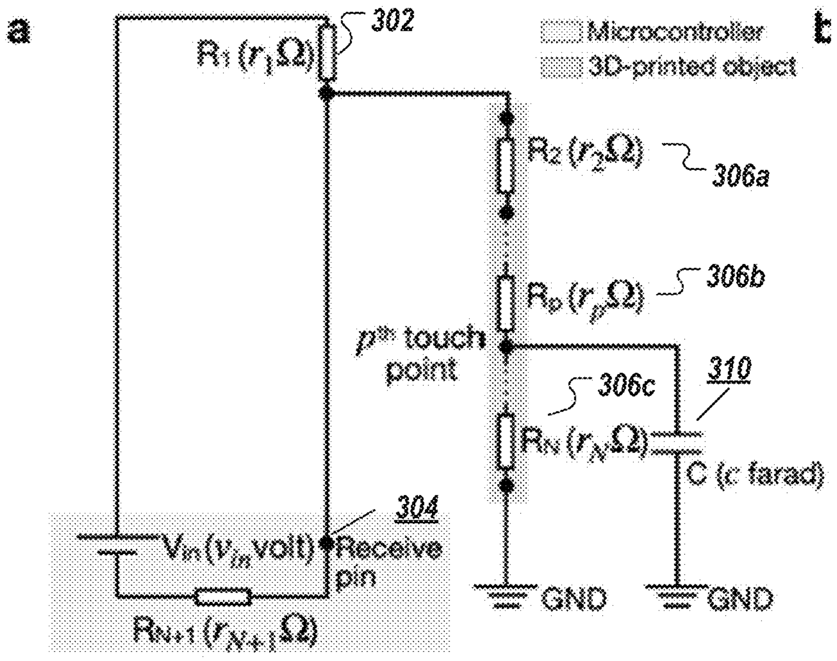

Single-wire Connection. FIG. 3B shows an example analysis for a single-wire connection. The connection makes a branch in the electrical path (i.e., forming a parallel circuit). Consequently, for the single-wire connection, the measured voltage change at the voltage input can be expressed as Equation 4.

$$v_p(t) = v_{in} - \frac{1}{r_1 + r_{N+1}}\left(r_{N+1} - \frac{r_1 r_{N+1}^2}{r_1 r_{till} + r_{N+1} r_{till} - r_1^2}\exp\left(-\frac{r_1 + r_{N+1}}{c\left(r_1 r_{till} + r_{N+1} r_{till} - r_1^2\right)}\right)\right) \quad \text{(Eq. 4)}$$

Similar to the double-wire connection, Equation 4 can be approximated as Equation 5.

$$v_p(t) \approx v_{in}\left(1 - \frac{r_1}{r_{till}}\exp\left(-\frac{t}{c \cdot r_{till}}\right)\right) \quad \text{(Eq. 5)}$$

The approximate time required to reach a microcontroller's logic threshold voltage can be determined per Equation 6.

$$t_{thres_p} \approx c \cdot r_{till} \ln\left(\frac{v_{in}}{\frac{r_{till}}{r_1}v_{in} - v_{thres}}\right) \quad \text{(Eq. 6)}$$

It can be observed that the difference between Equations 5 and 6 and Equations 2 and 3 is the coefficient $r1/r_{till}$ (or $r_{till}/r_{r_1}$). The coefficient introduces greater complexity for the single-wire connection compared to the double-wire connection. A difference from the double-wire connection is the voltage measured at the receive pin at t=0: $v_p(0)=v_{in}(1-r_1/r_{till})$, indicating $v_p(0)$ changes depending on the relationships between $r_1$ and $r_{till}$ (note: $r_{till}=r_1+\ldots+r_p$). Additionally, the coefficient, $r_1/r_{till}$, can influence the slope of the exponential function in Equation 5, suggesting $r_1$ and $\{r_2, \ldots, r_n\}$ should be carefully selected to support the single-wire connection.

One consideration is to provide a hard constraint for r1. To sense a selected touchpoint, it should be avoided that $v_p(0) \geq v_{thres}$ (i.e., $r_1/r_{till} \leq 1-v_{thres}/v_{in}$). For example, FIG. 3D, subpanel b1 shows this violation, and a microcontroller would not be able to detect if a touchpoint has been selected for two of the points (i.e., p=1 and p=2). Thus, to ensure all touchpoints can be sensed, it must be satisfied that $r_1/r_{till} > 1-v_{thres}/v_{in}$ for all touchpoints. For a given microcontroller, e.g., where $1-v_{thres}/v_{in}=0.5$, the hard constraint should correspond to $r_1 > r_2 + \ldots + r_N$, indicating $r_1$ must be greater than the cumulative sum of the resistance inside the freeform model, i.e., resistive network (e.g., 102).

Another consideration is to maximize the difference in $t_{thresp}$ for each touchpoint (e.g., p-th vs. (p+1)-th touchpoint) to resolve the complex relationships among $r_1$ and $r_2, \ldots, r_N$. FIG. 3B shows four variations that use different resistance values for the same example. Among the four variations, FIG. 3B, subpanel b4 achieves the maximum difference in $t_{thresp}$ for each touchpoint by employing a heuristic resistance optimization for the single-wire connection.

Conductive printed network. For a printed network, nodes should have high conductivity, so their resistance is essentially negligible. Links, in contrast, should have low conductivity so they can act as resistors. This process requires converting network data, specifically the links, into a network of resistors as conductive traces (i.e., electrical paths). The resistance of these traces can be tuned by varying their length and thickness [47]. Here, low conductivity/high resistance can be achieved by printing a long, thin line with a conductive filament with specific geometry computed using the resistivity law per Equation 1A.

$$r = \frac{\rho l}{a} \quad \text{(Eq. 1)}$$

In Equation 1A, r is the resultant resistance, ρ is the resistivity of a material, and/and a are, respectively, the length and cross-sectional area of an object. Nodes may be printed using a conductive filament, producing a large cross-sectional area per length and resulting in low resistance. Links may enclose conductive traces using non-conductive filament, which may be varied to support a range of visual design parameters (e.g., length, width, color).

Capacitive sensing of different nodes. When an electrical circuit consists of a power source, a resistor, and a capacitor in series, the voltage change (also referred to as voltage drop herein) of the capacitor may be expressed as Equation 1B.

$$v(t) = v_{in}\left(1 - e^{-\frac{c}{c \cdot r}}\right) \quad \text{(Eq. 1B)}$$

In Equation 1B, t is the time from the start of charging the capacitor; $v_{in}$ is the input voltage from the power source; c is the capacitor's capacitance; and r is the resistor's resistance. When capacitive sensing is applied to a printed network, the equation may change based on the number of links (i.e., resistors) and their resistance, the resistors' connections (series, parallel, or a combination), and the touched node (i.e., a connection between a user/node). Equation 1B may be employed to compute circuits that obtain different time delays when touching different nodes.

Example Method of Design #1—Network Physicalization by Generate Network Structures A computational pipeline can be employed that uses a network dataset to generate a resistor network that is optimized to uniquely identify nodes through capacitive sensing. Then, the pipeline automatically can generate the necessary geometry files to fabricate a printed network (i.e., materialize the resistor network).

Referring now to FIG. 5A, a flow chart of process 500 for modeling a touch sensing circuit is shown, according to some implementations. In some implementations, process 500 is implemented by computer system 200, as described above. It will be appreciated that certain steps of process 500 may be optional and in some implementations, process 500 may be implemented using less than all of the steps. It will also be appreciated that the order of steps shown in FIG. 5A is not intended to be limiting.

At step 502, design data for an object or network that includes multiple nodes for touch sensing is obtained. In some implementations, the design data is data for a network. In some implementations, the design data is a 3D digital model of the object or the network. In some implementations, the design data is received by user input (e.g., as an upload by the user). In some implementations, the design data is obtained from a database or other source. In some implementations, the design data includes two or more predefined nodes for sensing touch on the object or the network. At step 504, links between each of the nodes are identified. In some implementations, each node is connected to at least one other node via a respective link. In some implementations, each link acts as a resistor between nodes. At step 506, a resistance value for each link is calculated. Generally, resistance values are selected such that each of the two or more nodes causes a unique resistive-capacitive (RC) time delay when touched. At step 508, a layout for a touch-sensing circuit is generated. In some implementations, a 3D representation network is generated.

At step 510, the layout for the circuit is optionally adjusted. In some implementations, the circuit layout (e.g., a 3D network) generated at step 508 may have an undesirable structure for fabrication. For example, conductive nodes and resistor links might intersect with each other, resulting in unexpected changes in the circuit. Thus, a layout adjustment algorithm can be used to adjust network geometry to avoid fabrication issues. A primary goal of this adjustment may be that resistor links do not intersect. In some cases, the adjusted layout preserves the structure of the original layout as much as possible. At step 512, a geometry file is generated. In some implementations, the geometry file is a CAD file of the object or network, which includes the circuit. At step 514, a 3D model of the object or network—which includes the touch sensing circuit—is printed via a 3D printer based on the geometry file.

Figure 5B:
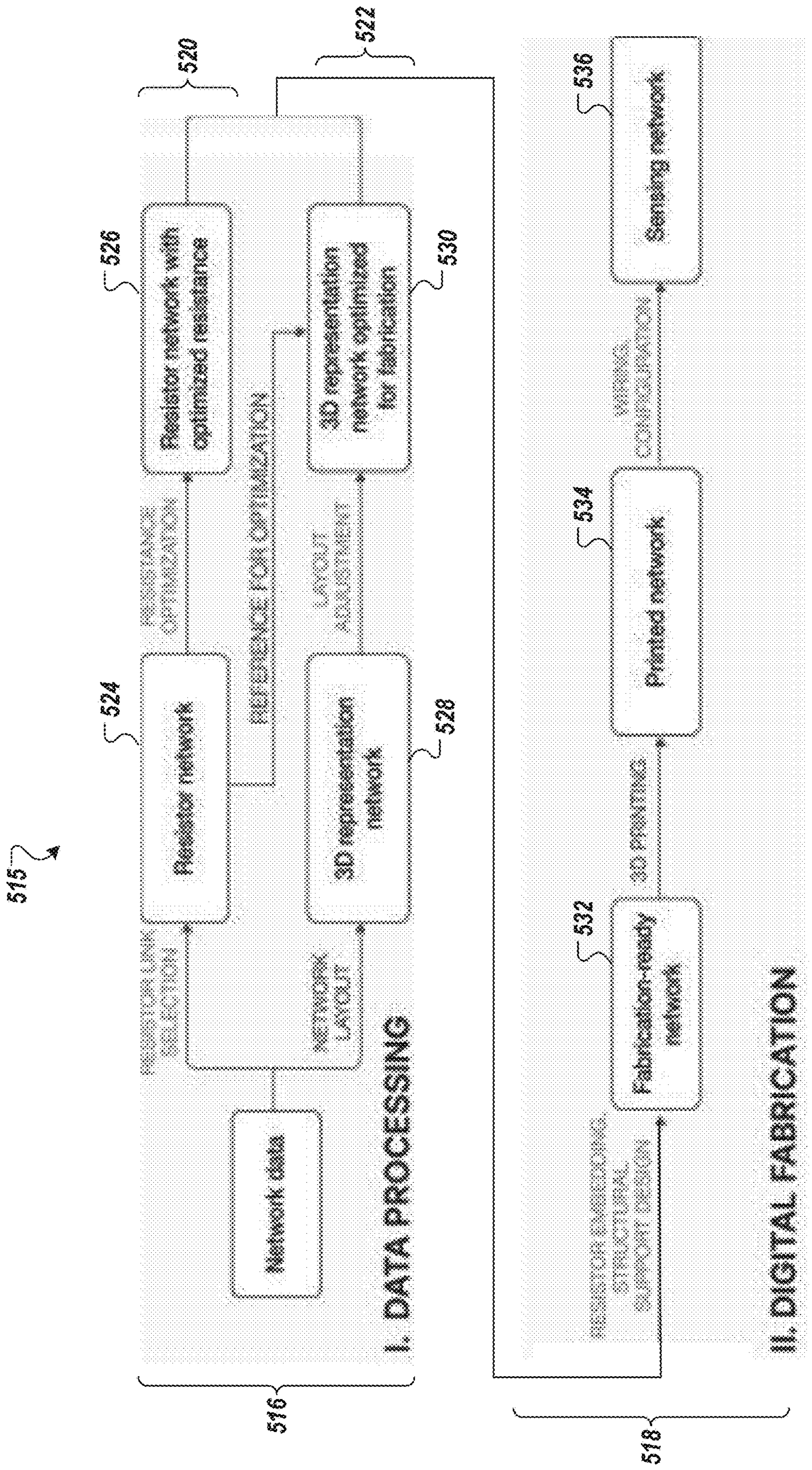

Example Computation Pipeline. FIG. 5B shows an example of a computational pipeline 515 that implements the method of FIG. 5A. In the example shown in FIG. 5B, the computation pipeline includes (i) data processing operations 516 and digital fabrication operations 518.

A. Data processing (516). Data processing operation (516), in this example, is shown implemented in two parallel tracks (520, 522). The first track (520) involves designing the resistor network, and the second track (522) adjusts the network layout to satisfy fabrication constraints. The term "resistor network" in the computation design pipeline operation refers to a network of resistors derived from network data that would be converted into conductive traces.

The resistor network design operation 520 starts by selecting (524) links to be used as resistors from the network data. The selected links form resistor links. Operation 520 then performs a resistance optimization process (526) to identify a suitable resistance for each resistor link such that the RC delay is different for every touched/contacted node.

Figure 5C:
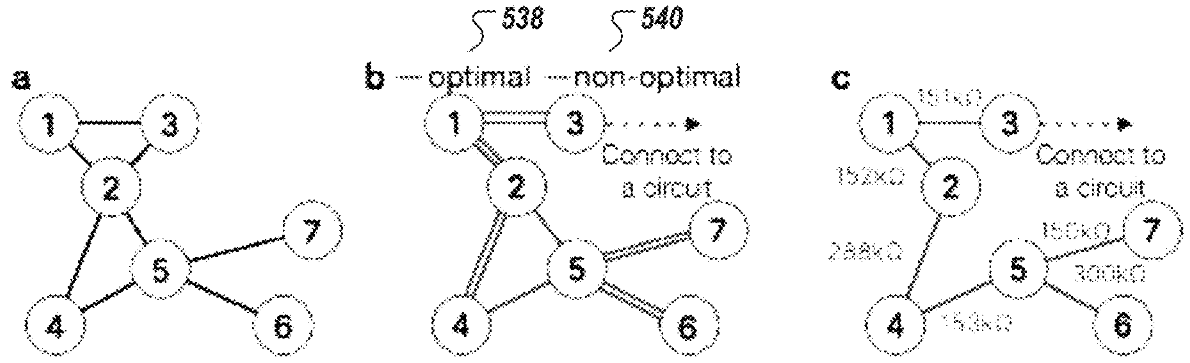
Figure 5D:
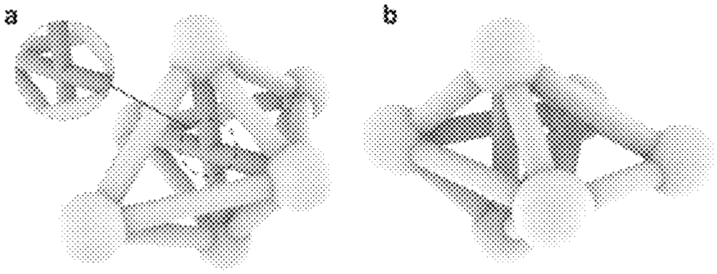

The network layout design operation (522) begins by performing a network layout of the network data to generate (528) a 3D representation network. The term "3D representation network" in the computation design pipeline operation refers to a 3D representation of network data, assigning spatial positions to nodes and links. An existing network layout algorithm can be used, or the user can manually define positions in the source network data. Next, operation 522 applies a network layout adjustment operation (530) using neural networks. The adjustment may be to primarily prevent conductive components (i.e., nodes and resistor links) from intersecting to avoid interference with the circuit (FIG. 5D).

B. Digital Fabrication (518). The digital fabrication operation (518) uses the outputs from the data processing stage (516) to dynamically generate (532) a fabrication-ready network (e.g., CAD files). The term "fabrication-ready network" in the computation design pipeline operation refers to a digital model for 3D printing that embeds a resistor network within a 3D representation network. In the example shown in FIG. 5B, the process involves computationally (i) drawing the resistor network as long, thin traces and (ii) updating the link geometry to structurally reinforce the connection between nodes and links. Operation 518 then includes fabricating (our network using multi-material printing and then connecting the printed network to a microcontroller. The term "printed network" in the computation design pipeline operation refers to a 3D printed network produced from a fabrication-ready network 3D model.

Resistor Network Design (520). The operation (520) to design the resistor network may include selecting (524) a subset of links to be used as resistor links and optimizing (526) their resistance to achieve unique RC delays when a node is touched. The term "resistor network" in the computation design pipeline operation refers to a network of resistors derived from network data that would be converted into conductive traces.

Networks typically contain more links than nodes (e.g., 10 nodes and 30 links), but in the instant operation, all links do not need to be resistors to electrically connect all nodes for sensing. For Resistor Link Selection (524), for a network with N nodes and L links, the operation would find (N−1) resistor links that connect all N nodes. The minimum set of such links can be found by performing a traversal search such as breadth-first search (BFS) or depth-first search (DFS) over the network.

The operation may use DFS to reduce the computational complexity of the resistance optimization process (526). DFS can select a set of resistor links that generate fewer path branches compared to BFS. However, based on the starting node of the traversal, DFS may fail to find a set of resistor links with the minimum number of branches. For example, in FIG. 5B, subpanel B, two different sets of resistor links are shown selected from network data in FIG. 5C, subpanel A. The optimal resistor links (538) have a minimum number of branches (FIG. 5C, subpanel B shows two branches: nodes 3-6 and 5-7), while the non-optimal resistor links (540) do not (showing three branches: nodes 3-6, 2-4, and 5-7). To find the optimal set of resistor links, the operation can run DFS N times in which each iteration selects a different node as a starting node. The operation may then select the result with the minimum number of branches. After determining the resistor links, the operation may also select one leaf node as the connection point to the microcontroller's circuit (e.g., Node 3 in FIG. 5C, subpanel B). Then, for each resistor link, the operation may calculate its appropriate resistance using the resistance optimization (see FIG. 5C, subpanel C).

Resistance Optimization (526). For the optimization goal, the system may identify which node is touched based on how long it takes for a capacitor to reach a certain voltage threshold (i.e., RC delay). When a user touches a node, a new connection to a capacitor (i.e., the user's body) and the ground is introduced into the electrical circuit. This connection may vary based on the touched node, inducing a different RC delay based on the circuit design. Although slight time delays are theoretically sufficient to recognize the selection of different nodes (e.g., 10 ns), there is a benefit to maximizing the minimum difference among the time delays for fault tolerance in the microcontroller and 3D printer.

For a microcontroller implementation that captures time delays, the CPU clock of microcontrollers can be considered to limit the precision of the measurement. For example, 16 MHz for a controller would translate to 62 ns. Additionally, errors can be considered to be introduced during the 3D printing process. An optimization goal can be formulated as Equation 7.

$$\underset{r\in\mathbb{R}^{N-1},r_{min}\le r_k\le r_{max}}{\operatorname{argmax}} \min\{d_{i,j}(r)|1\le i\le N, i\le j\le N\} \quad \text{(Eq. 7)}$$

In Equation 7, r is a vector of resistance assigned to (N−1) resistor links, $r_{min}$ and $r_{max}$ specify the value boundary for each resistance $r_k$ in r, and $d_{i,j}(r)$ is the difference of the time delays between cases when nodes i and j are touched/contacted. The difference in the time delays may be defined as $d_{i,j}(r)=\|t_i(r)-t_j(r)\|$, where $t_i(r)$ is the time delay when node i is touched/contacted. The parameter $t_i$ is the node's time delay function.

The optimization for Eq. 7 has several challenges, including the time delay function differing based on the selected node, as touching a new node results in a different circuit. Consequently, various different circuits may need to be evaluated.

To this end, the optimization may employ a circuit simulator to computationally generate and evaluate a circuit corresponding to each touched node.

Additionally, the optimization may have to optimize r, which can include a large number of parameters (e.g., N−1). The operation may compute the derivative of each time delay function with respect to r and then apply gradient descent to efficiently optimize all parameters.

FIG. 5F shows an example algorithm (also referred to as "Algorithm 1") for the circuit generation and simplification operation. The optimization may start by registering the circuit information (including the microcontroller's circuit and resistor links) with a circuit simulator (line 1).

Afterward, the algorithm includes generating N different circuits, each of which corresponds to a case where one of the N nodes is touched (line 3). Circuit simulators (e.g., SPICE [101]) typically have an analysis function to observe voltage changes. The circuit simulator can allow all necessary equations and functions to calculate the time delay caused by each touch without user intervention. Examples of circuit simulators that may be used include [16], [63], and Lcapy [39], to derive derivatives. In symbolic computations, mathematical symbols can be used as-is to solve equations and compute derivatives without converting them to numerical values. Consequently, the precise derivatives can be obtained for the optimization and also perform an efficient optimization by reusing the same symbolic functions across iterations.

Symbolic computing can have high computational costs when several symbols are involved, particularly when we compute the matrix inversion operation required for solving our optimization equations. The time complexity for this matrix inversion operation is $\mathcal{O}(S^3)$, where S is the number of symbols. To mitigate the complexity, the resistors connected in series can be simplified as one resistor [14]. Given three resistors (i.e., r1, r2, r3), the symbolic computation without combining these resistors would involve three symbols. In contrast, combining three resistors with $$r'_a = r1 + r2 + r3$$

would only involve $$r'_a$$

in the computation.

Combining resistors can radically reduce computational costs. To maximally reduce the number of symbols, the operation may use the DFS-based resistor link selection. The algorithm combines resistors for each of the N-generated circuits, derives their voltage change functions, and solves each function for a given voltage threshold (lines 4-7 in Alg. 1). The operation may further speed up the processes by solving the functions in parallel. For the circuit induced by touching node i, the algorithm denotes a vector of resistance of the combined resistors as $$r'_i,$$

a bijective mapping from r to $$r'_i \text{ as } f_i: r \to r'_i$$

and its inverse mapping as $$f_i^{-1}: r'_i \to r.$$

It is noted that $$|r'_i| \ll |r|.$$

Gradient-based optimization. From all pairs of the time delay functions, the operation can symbolically derive the time delay difference (i.e., $d_{i,j}$) and its derivative ($\nabla d_{i,j}$) with respect to $$\{r'_i, r'_j\}$$

(lines 8-11). The algorithm then assigns concrete values to r and iteratively optimize these values. The algorithm may first initialize r with user-specified or random values within a range of $[r_{min}, r_{max}]$ (line 12). The algorithm can evaluate Equation 7 with the current r (line 14) by inserting the values of r into $d_{i,j}$ while referring to the mappings $f_i$ and $f_j$. The algorithm then updates r to improve the minimum time delay difference with gradient descent. To achieve this, the algorithm may first identify the bottleneck $d_{x,y}$, corresponding to the cause of the minimum time delay difference (line 15). The algorithm then updates r based on $$\nabla d_{x,y}(\{r'_x, r'_y\}).$$

Because the obtained gradients are for the combined resistors, the algorithm can then evenly distribute each combined resistance's gradient to the set of original resistor links by referring to $$f_x^{-1}$$

and $$f_y^{-1}.$$

For example, when a combined resistor consists of $\{r_1, r_2, r_3\}$ and its gradient is 3, the algorithm can assign 1 as a gradient for each of $\{r_1, r_2, r_3\}$. The gradients after the conversion can be referred to as grad $(d_{x,y})$ (r). The algorithm can formulate the update of r by gradient descent (line 16) per Equation 8.

$$r \leftarrow r - \alpha \ \mathrm{grad}(d_{x,y})(r) \quad \text{(Eq. 8)}$$

In Equation 8, $\alpha \in R$ is a step size to control the pace of the optimization (e.g., 1% of (r_max−r_min)). The algorithm can then clip each resistance of r in the user-specified boundary, $[r_{min}, r_{max}]$ (line 17). The algorithm repeats until the optimization reaches convergence and then use the value of r that achieves the best result for Equation 7 (lines 13-18).

Network Layout Design (522). Referring to FIG. 5B, for the network layout design (522), the computational pipeline can generate (528) a 3D representation network. The computational pipeline can conduct (530) post-hoc adjustments, e.g., via an existing network layout algorithm, e.g., force-directed Fruchterman-Reingold layout [30], among others. The computational pipeline can also use predefined positions if they are available (e.g., networks with molecular structures, brain regions, or geospatial information). Fixed points can maintain position fidelity and use the same process as a network with predefined positions, even for non-network visualizations. The computational pipeline can model networks only with straight links, though it can also be operated with curved links. The operation can employ visualizations modeled as a hub-and-strut form: a series of connected points (e.g., vertices in a Voronoi diagram or points on a line chart).

Network Layout Adjustment (530). The 3D representation network (e.g., generated from 528) might have an undesirable structure for fabrication. Since most existing layout algorithms do not consider 3D volumes of nodes and links, conductive nodes and resistor links might intersect with each other, resulting in unexpected changes in the circuit. The computational pipeline employs a network layout adjustment algorithm (530) to adjust network geometry to avoid fabrication issues. FIG. 5D shows an example of 3D representation networks before (FIG. 5D, subpanel A) and after (FIG. 5D, subpanel B) applying our layout adjustment.

The layout adjustment may have (i) a primary goal that all resistor links must not intersect with each other. The restriction may also apply to all nodes, (ii) a secondary goal of preserving the structure of the original layout as much as possible, and (iii) optional aesthetic goals of having (a) intersections of non-conductive links should also be minimized and (b) link lengths should be closely uniform [9]. To efficiently satisfy multiple goals, a neural network (NN) may be employed with loss functions corresponding to these goals. Other optimizers, neural networks, or trained AI models may be used.

Loss functions. Node-link diagrams are intuitively represented as cylinders (links) and spheres (nodes). The intersection of two cylinders can be detected when the minimum distance of their axes is smaller than the sum of their base radii. Similarly, two spheres can intersect if the distance between their centers is smaller than the sum of their radii. Let dist(·) be a function computing the distance of links' cylinder axes or the distance of nodes' spheres and radius (·) be a function returning a radius of the link's cylinder base or node's sphere. An intersection loss for all links and nodes can be expressed per Equation 9.

$$J_{int} = \sum_{i} \sum_{j, i \neq j} ReLU(dist(e_i, e_j) - \mathrm{radius}\,(e_i) - \mathrm{radius}\,(e_j)) \quad \text{(Eq. 9)}$$

In Equation 9, $\{e_i\}$ is a set of nodes or links, and ReLU(·) is the rectified linear unit function (ReLU(x)=max(0,x)). While ReLU or thresholding can be used, ReLU can more easily train an NN for if there is no intersection, ReLU returns 0; otherwise, it returns the intersected length. The intersection loss may be computed separately for resistor links $$(J_{int}^{res}),$$

non-resistor links $$(J_{int}^{non\_res}),$$

and nodes $$(J_{int}^{node}).$$

Similar to Wang et al. [106], the network layout can be measured for changes before and after adjusting node positions with Procrustes distance. Procurstes distance computes the sum of Euclidean pairwise distances of nodes after aligning two sets of node positions with translation, uniform scaling, rotation, and axis flipping [31], [34]. The measure can eliminate the influence of non-essential layout differences. Let $P^o$ and $P^u$ be the node positions of the 3D representation network before and after the layout adjustment. Then the loss function for the layout change can be written as: $J_{pos}$=Procrustes $(P^o, P^u)$ where Procrustes (·) computes the Procrustes distance. Lastly, a loss can be measured corresponding to non-uniform link lengths, $J^{len}$, as the standard deviation of link lengths.

Neural network architecture and optimization procedure. An NN can be used to find appropriate updated 3D node positions, $P^u$. The NN can be designed to output $P^u$ from $I_N$, an input identity matrix with the size of N. The training can input the node and link information required to compute the loss functions. It is expected the network physicalization operation to be relatively small (e.g., less than 1000 nodes), e.g., a multilayer perceptron (MLP) consisting of three 100-neuron hidden layers may be used. Other sizes may be employed.

The training may include (i) learning the original layout and (ii) adjusting the layout. The first phase can learn neuron weights such that $P^u$ becomes the same layout as $P^o$ by minimizing $J_{pos}$ during training. The second phase then adjusts the learned neuron weights to satisfy the optimization goals, e.g., to minimize the sum of multiple weighted loss functions. To place a higher priority on removing intersections, larger weights can be assigned to $$J_{int}^{res}$$

and $$J_{int}^{node}.$$

For the loss functions corresponding to the secondary goal of layout preservation and optional aesthetic goals, weights can be selected based on the design needs. After training, the adjusted layout is obtained.

Data Generation for Fabrication (518). The digital fabrication operation (518) can be performed to create the necessary CAD files for 3D printing the updated network. The computational pipeline can generate a fabrication-ready network by embedding the resistor network into the 3D representation network.

Figure 5E:
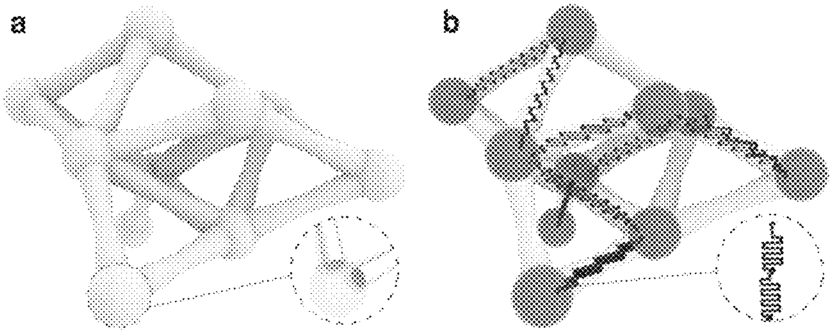

Resistor network embedding. Nodes can be fabricated with a conductive filament to provide high conductivity. To materialize resistor links, the links need to have high resistance within a limited volume of each cylinder link, e.g., by drawing a thin, long trace of the conductive filament using a serpentine trace pattern [93]. Given a surface area, the resistivity is maximized by drawing on the xy-plane layers with a serpentine trace pattern and connecting the endpoints with the z-direction line, resulting in a zig-zag structure (FIG. 5E). To strength the structure support, tapering or cone-shaped structural features can be added to the joints, to further maximize contact (e.g., FIG. 5E, subpanel A).

To achieve the resistance specified in the resistor network, the computational pipeline may determine the length of each resistor link's trace based on the resistivity law (r=pl/a, Equation 1A). Due to the potential printing resolution of printers (e.g., FDM printers), different thicknesses may be for a line on xy-plane and a line along z-direction (e.g., the line thickness for the xy-plane can be close to the printer's nozzle extrusion width, e.g., 0.4 mm, while the thickness for z-direction may be at least twice the diameter, e.g., 0.8 mm, to ensure contact from the previous layer.

A conductive filament's resistivity (i.e., ρ in Equation 1A) along the xy-plane and z-direction may be provided by the filament makers. Then, with the given thickness, resistivity, and link cylinder shape (radius, angle, and length), the computational pipeline may computationally identify the appropriate length and drawing pattern of the trace. Various external conditions may influence the line area and resistivity (e.g., printing precision, nozzle temperature, and filament production errors). Thus, the resistance per length (i.e., ρ/a) may be identified for the xy-plane and z-direction under the expected printing condition.

Example Method of Design #2

Figure 6A:
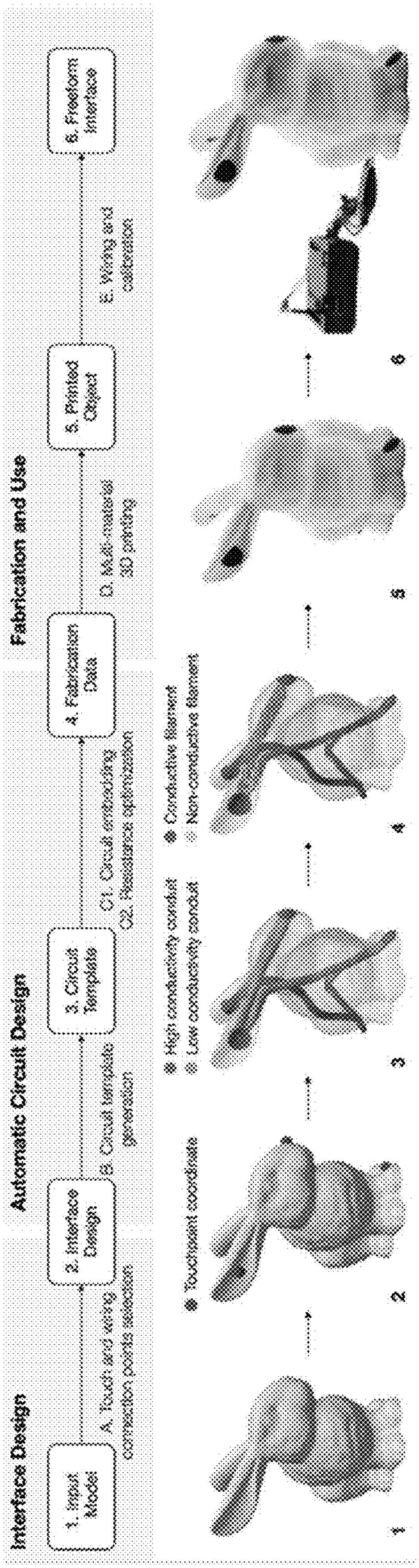
FIGS. 6A-6C show a flow chart and associated process for modeling and a second algorithm for a touch sensing circuit in accordance with an illustrative embodiment.
Figure 6B:
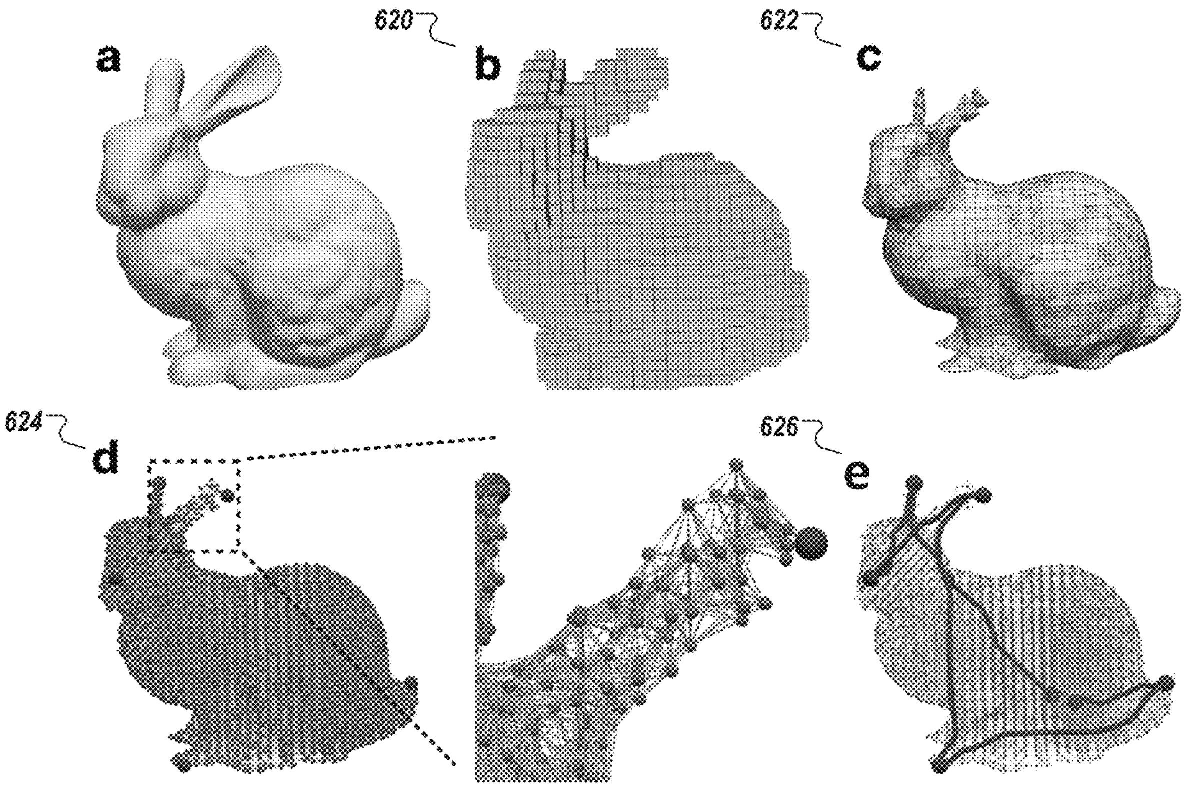
Figure 6C:
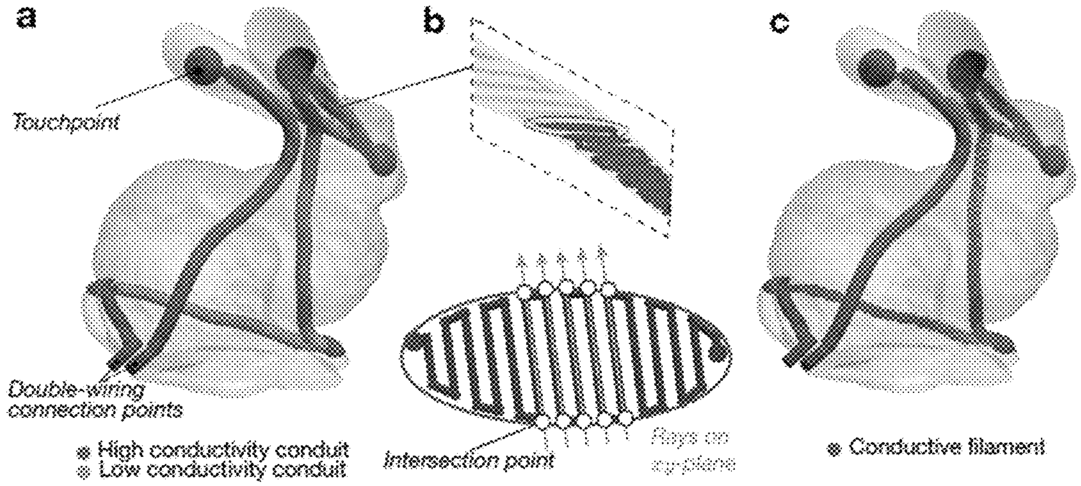

FIGS. 6A-6C shows various aspects of a method for automatic circuit design to generate an appropriate internal circuit design that can be embedded in a freeform model. The stage is fully automatic and does not require any active involvement from the interface designer. In some embodiments, the stage may be partially manualized.

The automatic circuit generation pipeline includes two substages: (i) a first for circuit template generation and (ii) circuit embedding.

The circuit template specifies the geometry of points (touchpoints, wiring points) and conduits (FIG. 6C, subpanel A). The template is used to embed the internal circuit design into the freeform model in the circuit embedding operation. FIG. 6C shows the circuit template being used to generate the conductive traces for 3D printing using a space-filling algorithm. In circuit template operations, points refer to the touchpoints, and the wiring connection point(s), and conduits refer to the generated pipes within the freeform models' volume.

The circuit template can be applied to a freeform model. In some embodiments, the freeform model may be generated, e.g., by a designer using a design software such as Fusion360 or Rhino, to generate the coordinates. To select the touchpoints and wiring connection points, the designer may freely lasso different areas on the model's surface to indicate where the touchpoints and wiring connection points would be placed. Once the point selection has been finalized, the designer can export the points' coordinates. The centroids of these coordinates may be used to generate touchpoints and wiring connection points on the surface of the freeform model.

A. Circuit Template Generation. Generating a Circuit Template Requires Two Sets of Information.

i. Preparing Point Geometry. An initial step of the circuit template generation is to prepare the geometry of the points by using the coordinates of touchpoints and wiring connection points.

ii. Touchpoints. The pipeline operation ensures the geometry of touchpoints is bounded within the freeform model's volume with two steps. The first step involves generating a 3D geometry at the centroid of each touchpoint's coordinate. A sphere with a 12 mm diameter may be used, but other sizes and types of 3D geometries can also be considered depending on the designer's needs. The pipeline operation then volumetrically clips the sphere based on its intersection with the freeform model's surface.

iii. Wiring Connection Points. For the wiring connection point(s), the pipeline operation may generate a cylinder that intentionally extrudes beyond the model's surface (FIG. 6C, subpanel A). A cylindrical design can allow external wires (e.g., alligator clips) to easily connect to the freeform model at the fabrication and use stage. To achieve the cylindrical design, the pipeline operation may first compute both the centroid and normal of a polygon at the specified coordinates of the wiring connection point(s). The pipeline operation may then generate a cylinder, e.g., with a 4 mm diameter and that is 10 mm long, using the centroid as the cylinder's center and the normal as the cylinder's axis. The cylinder's height, diameter, and axis direction can also be manually specified. The cylinder diameter can be user definable.

Routing Conduits with Pathfinding Algorithm. Next, the pipeline operation may generate conduits (i.e., 3D pipes) to (i) connect the points within the 3D model's bounding volume and (ii) house the 3D printed conductive traces.

Notably, the conduits generated may be curved. Connection of points may be either in series or parallel. A series connection would be more straightforward to generate, and a model is estimated to have sufficient volume to house a series connection within a model.

To make a series connection, the pipeline operation is configured to determine the order of the points. In the case of the double-wire connection, the first and last points are the wiring connection points. For the single-wire connection, the first point corresponds to the wiring connection point. The point may be manually specified. Subsequently, the pipeline operation may then connect the remaining points (i.e., touchpoints) in the selected order during the interface design stage. In the example shown in FIG. 6A, subpanel A, the point order first wiring connection point, tail, foot, right car, nose, left ear, and second wiring connection point.

The pipeline operation may then route the conduits to connect the points in the specified order with a graph-based pathfinding algorithm. FIG. 6B shows an example pipeline operation for the conduit routing. In the example shown in FIG. 6B, the pathfinding algorithm includes (1) voxelating (620) the freeform model, (2) trimming (622) the voxels that are close to the freeform model's surface, (3) constructing (624) a weighted neighbor graph with the remaining voxels, and (4) finding (626) the shortest path between each point to connect all points. Other path selection metrics may be employed, e.g., an optimized path for material, interference, and path that provides unique sensing.

The shortest path can be used to ensure there is sufficient space to generate other conduits with the remaining bounding volume. To help distinguish from the terminology used for the circuit template design (i.e., points, conduits), graphs, vertices, and edges are terminologies used for the pathfinding algorithm.

Voxelating operation (620). Voxelization can prepare a graph that would route the conduits inside the freeform model's bounding volume. The pipeline operation can generate a voxel representation of the model using a specified voxel size. An example voxel size that can be used is 0.5% of the maximum dimension of any side of the model's bounding box.

Model surface trimming operation (622). If a conduit is placed too close to the model surface, it can introduce parasitic capacitance (i.e., unintentional capacitance) during use. Parasitic capacitance is non-ideal as it can influence the overall sensing capability. To avoid parasitic capacitance, the pipeline operation can trim the voxels that are too close to the model surface (by default, 3 mm from the surface).

Weighted neighbor graph construction (624). The pipeline operation can generate a weighted neighbor graph from the trimmed voxel representation. The pipeline operation can first compute the distance between each voxel and then construct a k-nearest neighbor graph based on the distances (k=10). The value for k can be user definable. The process can generate a graph consisting of vertices corresponding to the voxels, the edges of neighbor relationships, and the edge weights corresponding to the distances.

Path Generation (626). The pipeline operation can find the path (e.g., shortest path) between a pair of vertices using a pathfinding algorithm such as Dijkstra's algorithm or A* [13']. In some embodiments, the pathfinding operation can find the route that connects all points in series. In parallel, the algorithm can aim to avoid overlapping conduits with each other. Since conduits would house the conductive traces, an overlap can change the circuit design. After each iteration, the pathfinding operation can assign a large penalty for the edge weights (e.g., 300 mm) that have already been used or are too close to the found path. Although the shortest path is generally preferable to ensure sufficient space, the path between two points may be too short to generate sufficiently large resistance in the circuit embedding step. To resolve such a case, the pathfinding operation can either (i) randomly permute the connection order of touchpoints until all paths become longer than the designer-specified lengths and/or (ii) run the shortest pathfinding algorithm multiple times. Due to the penalty added in the edge weights, the algorithm can make a path gradually longer.

After the route of the conduits is finalized, the conduits are then rendered as 3D pipes (e.g., 5 mm diameter). The diameter can be user-specified.

B. Circuit Embedding. FIG. 6C shows a method for automatic circuit design. FIG. 6C, subpanel A shows an automatic circuit design first operation to generate a circuit template, which outlines how the touchpoints and conductive traces would be embedded within a freeform interface. FIG. 6C, subpanel B shows, during circuit embedding, serpentine trace patterns are generated inside low conductivity conduits by using a space-filling algorithm. FIG. 6C, subpanel C shows an example of output fabrication data (STL files), e.g., for use for multi-material printing.

The method may employ a circuit template to generate the freeform model's internal circuit design. 3D printing the circuit requires a combination of conductive and non-conductive materials where points are the touchpoints and wiring connection points and are filled with a large amount of conductive filament (100% infill) by default. As a result, points have high conductivity and negligible resistance. In contrast, the generated conduits can have either high conductivity or low conductivity (FIG. 6C, subpanel A).

The conductivity may be determined based on the conduit's role in the internal circuit. Conduits that originate from the wiring connection point(s) may have high conductivity (brown links in FIG. 6C, subpanel A). The conduits are meant to act as wires (i.e., negligible resistance). Similar to points, the high conductivity conduits will also be 3D printed with a 100% infill with a conductive filament. In comparison, the conduits between each pair of touchpoints have low conductivity (yellow links in FIG. 6C, subpanel A).

The low-conductivity conduits act as resistors. To leverage RC delay for capacitive sensing, three low-conductivity conduits are configured to have high resistance within their limited volume. In some embodiments, to achieve high resistance, the approach discussed by Bac et al. [2'] may be employed. The method may draw a thin, long trace of the conductive filament using a serpentine trace pattern [34'] inside the low conductivity conduits (FIG. 6C, subpanel B).

Due to the resistivity law, a thinner conductive trace may provide lower conductivity and higher resistance. Bac et al. suggested the thickness of the conductive traces should vary when drawing the trace on the xy-plane versus along the z-direction. The thickness for the xy-plane can be close to the printer's nozzle extrusion width (e.g., 0.8 mm), while the thickness for z-direction should be at least twice the extrusion width (e.g., 1.2 mm) to ensure contact with the previously printed layer. The variance in thickness may be to account for the printing resolution of common FDM printers. Unlike the straight conduits used in Bae et al.'s work, the instant pipeline has to handle curved conduits. A space-filling algorithm may be employed to draw serpentine trace patterns in these curved conduits.

For a given z-coordinate along the xy-plane, the method may cast multiple rays that are parallel to each other in which each ray finds the intersection points with the conduit and creates line segments by connecting the intersection points. By alternatively connecting one line segment's endpoint and another line segment's start point, the method can obtain a serpentine pattern for one layer (FIG. 6C, subpanel B). The method may repeat this process while gradually increasing (or decreasing) the z-coordinate, resulting in multiple layers of serpentine patterns. The method may then connect the serpentine patterns with a staircase pattern using vertical lines along the z-direction. The method may also evaluate the margin between each ray as well as between each layer to ensure the margin is larger than the printer's nozzle extrusion width. Based on the specifications of most FDM printers, 1.2 mm may be used as the margin for both the ray and layer by default. Othe values may be used based on the printer specification.

After generating all circuit components described above, the internal circuit design is output as STL files for multi-material 3D printing.

i. Resistance Optimization. An example heuristic resistance optimization for the single-wire connection may include: (1) identifying the appropriate resistance values and (2) adjusting the geometry of the serpentine trace patterns (and/or external resistance value). The adjustment may take place, for example, during the circuit embedding step using a routing algorithm.

ii. Identify Appropriate Resistance Values. The objective of the first step may be to optimize $r_1$ and $r_2, \ldots, r_N$, to maximize the minimum difference among the time delays to ensure the time delay difference for each touchpoint is sufficiently large for RC delay detection to measure. To heuristically achieve this goal, a grid search may utilize a circuit simulator, e.g., Lcapy [14']. To make the search space reasonably small, it may be considered that all resistance values within the freeform model have the same value, i.e., $r_2 = \ldots = r_N = r$, which would only have two parameters, $r_1$ and r, to search for a given N (i.e., the number of touchpoints), $v_{in}$, and $v_{thres}$. The serpentine trace pattern's geometry can be adjusted in the subsequent step to satisfy $r_2 = \ldots = r_N = r$.

Figure 3C:
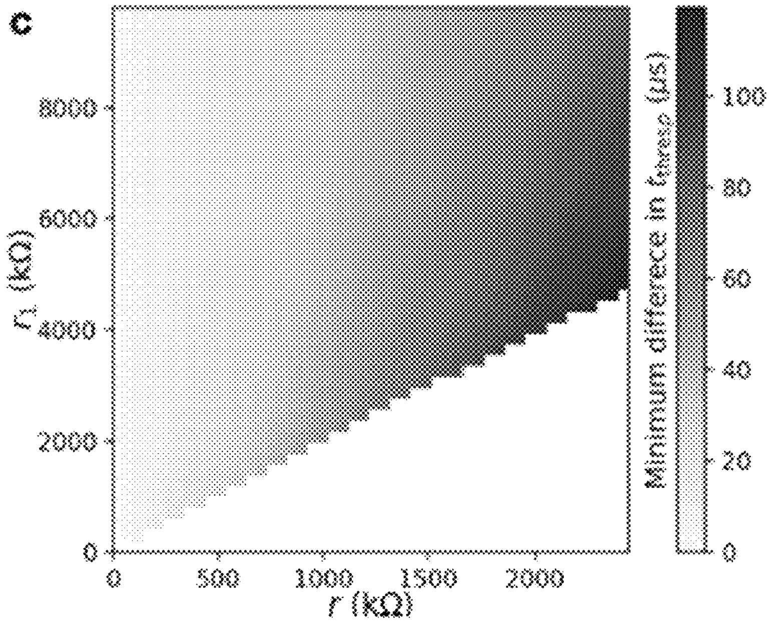
FIGS. 3C-3D show analysis for single-wire connection in accordance with an illustrative embodiment.
Figure 3D:
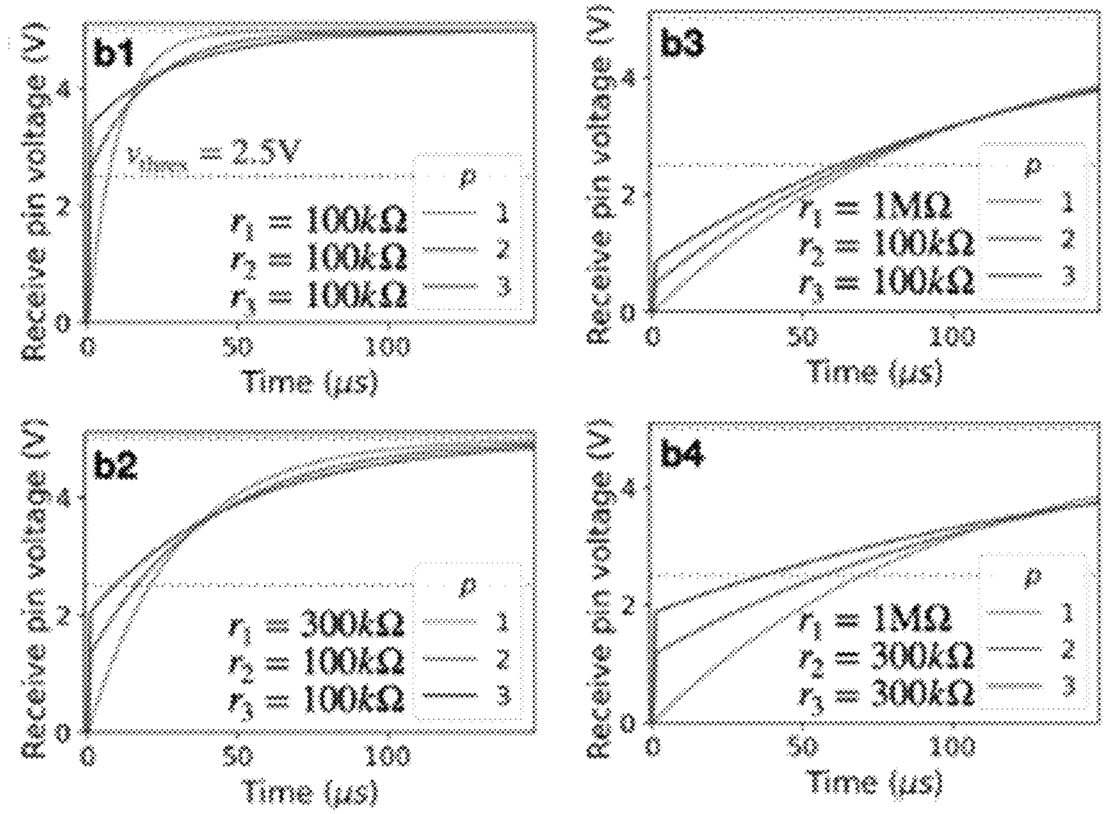

The method may include first specifying a search range and step for each $r_1$ and r. For $r_1$, the search range may be set as [200 kΩ, 10MΩ] and the step increment as 200 kΩ by default, e.g., to balance computational performance and optimization quality. For r, the method may first identify the highest resistance each conduit can achieve with the serpentine trace pattern. Among these values, the method may then select the lowest value as the upper limit for r. The step increment may be set as 50 kΩ. For each grid cell (e.g., $r_1$=1MΩ and r=100 kΩ), the method may use a circuit simulator to generate N circuits, each of which corresponds to a case where the p-th point is touched/contacted ($1 \leq p \leq N$). Among the N different $t_{thresp}$ values, the method may select the pair that has the minimum difference. Each non-white cell in FIG. 3C illustrates the minimum difference. The optimal result in FIG. 3C may be the cell with the largest r and smallest $r_1$ (i.e., r=2500 kΩ, $r_1$=4200 kΩ). However, when $r_1$ is near the boundary of the hard constraint, $v_p(0)$ for the N-th touchpoint may also be close to $v_{thres}$ (e.g., FIG. 3D, subpanel b2). Cases when $v_N(0)$ is close to $v_{thres}$ may be problematic, introducing violations where r may be larger than expected that can be further exacerbated when 3D printing the conductive traces with poor precision. To account for general fault tolerance in 3D printers, the method may select a pair of $r_1$ and r that achieves a close-to-optimal result while satisfying the condition that $v_p(0) \leq 0.9\ v_{thres}$.

iii. Adjust the Serpentine Trace Patterns. After optimizing $r_1$ and r, the method may apply the values to the circuit design where $r_1$ is the resistance of an outside resistor connected to a microcontroller, and thus, it can be easily adjusted by hand. In contrast, r is the resistance value for each low-conductivity conduit. The method may achieve r by adjusting the serpentine trace patterns. The circuit embedding step may aim to generate the longest conductive trace (i.e., largest resistance) by filling a serpentine trace pattern with a given small margin (by default, 1.2 mm). The method may find the serpentine trace pattern that achieves $r_2 = \ldots = r_n = r$ by gradually increasing both the margin between each ray and the margin between each layer.

Example Fabrication Operation

A. Multi-Material Printing. In some embodiments, after automatically designing the circuit, the computational pipeline may output the fabrication data to STL files, e.g., the original 3D model, the conductive traces, the touchpoints and wiring connection point(s), and the conduits to encase the conductive traces.

i. Single-pass operation. To fabricate freeform interfaces with embedded multi-points within one pass, the operation may employ a multi-material FDM 3D printer using nonconductive and conductive filaments. An example is the Snapmaker JIS 3D printer, which supports dual-nozzle printing. Both nozzles are 0.4 mm standard soft brass. A print speed can be user definable, e.g., 60 mm/s, for both conductive and non-conductive filaments. The layer height of all prints can be user definable, e.g., 0.24 mm. Other devices and materials may be used, e.g., as those referenced or described herein.

The conductive filament may be printed using Protopasta's conductive PLA (1.75 mm) [23]. The filament is commercially available and provides good conductivity and resistivity for a sensing network. The term "sensing network" in the computation design pipeline operation refers to a printed network that has sensing capabilities. The non-conductive filament can be any standard PLA filament. The print and build plate temperatures for both filaments used were based on vendor recommendations. Other devices and materials may be used, e.g., as those referenced or described herein.

The infill percentage may be defined differently for the different files. The original body may use an infill, e.g., of 20% using the gyroid pattern. In some of preliminary tests, it was observed that not having enough infill (e.g., 0%) can cause parasitic capacitance [24] where the coupled charge dissipates due to the air inside the model's body. As such, a range between 5-20% infill may be employed to provide steady sensor readouts. The other STL files may have an infill percentage of 100% using the rectilinear pattern.

Wiring and Calibration. After 3D printing, the operation may entail connecting the printed object to a controller (e.g., microcontroller) or circuit, among others, as described herein. An example controller is described in [12'], which is incorporated by reference herein in its entirety. The schematic would be a single-wire or double-wire connection, e.g., as described in relation to FIGS. 3A and 3B. Using the signal processing, e.g., described in Bac et al. [2'], the controller may calibrate the RC delay corresponding to each touchpoint by manually touching each touchpoint for five seconds and observing the time required to reach a microcontroller's logic threshold voltage. Calibration is necessary as each individual and external factors (e.g., clothing, temperature) may generate a different capacitance [12'].

EXPERIMENTAL RESULTS AND ADDITIONAL EXAMPLES

A study was conducted to develop a computational design pipeline to 3D print network physicalizations with integrated sensing capabilities. The first computational pipeline is described herein in relation to FIGS. 5A-5E. The pipeline can input network data, compute the internal circuitry for capacitive sensing, adjust the layout to support fabrication, and produce a sensing network physicalization. By automating low-level hardware design challenges in favor of application-level implementations, the approach could create more complex and powerful tools for designing physicalizations that can lower the barrier to physicalization research, creation, and adoption. The study developed a second computational design pipeline that embeds multiple capacitive touchpoints into any 3D model that has a closed mesh without self-intersection. The second computational pipeline is described herein in relation to FIGS. 6A-6C.

First Study Evaluation. Implementation. The study implemented a data processing stage with Python 3 and libraries for matrix computations such as NumPy/SciPy [105]. The study used NetworkX [36] for the DFS-based resistor link selection. For the resistance optimization, the study used Lcapy [39] and SymPy [63] for the circuit simulation and symbolic computation and Pathos for multiprocessing. The network layout adjustment is implemented with PyTorch [68].

For the digital fabrication stage, the study used Rhinoceros 7 [77] as CAD software and its programming environment, Grasshopper [17], to computationally build 3D models. The study used a Prusa i3 MK3S+3D printer [73] coupled with a Mosaic Palette Pro 2 [64] to enable multi-material printing. Our conductive filament was Protopasta's conductive PLA (1.75 mm) [72]. This filament is commonly available and provides good conductivity and resistivity to design a sensing network. The non-conductive filament can be any standard PLA filament. The study used iSANMATE Wood Filament PLA+ (1.75 mm) to emphasize color contrast between the nodes and links. The study used the Arduino Uno R3 [4]—16 MHz CPU as the controller with a 5V power source and a 2.5V logic threshold. To measure the time delays, the study used the CapacitiveSensor library using two digital I/O pins [5].

The study evaluated the first computational pipeline via (i) a quantitative scalability evaluation, (ii) three usage scenarios driven by three general visualization tasks, and (iii) discussion with six domain experts.

Scalability Evaluation. The study conducted a two-part scalability evaluation. First, the study established the practical performance limitations of the data processing stage (i.e., resistor network and network layout design) for networks of various sizes and confirmed the effectiveness of our resistance optimization in determining a user's touch selection. Then, the study analyzed the size of the network that can be fabricated with the developed approach.

Computational Scalability. The study performed a time complexity analysis. In the analysis, resistor link selection performed DFS for each starting node, having $O(N(N+L))$ where N and L are the numbers of nodes and links, respectively. The main computation for resistance optimization is the matrix inversion, which is required to solve the equation for each touched node (line 7 in Alg. 1). This has $O(NS^3)$ where S is the number of involved symbols. The number of symbols was linearly correlated to the number of resistor path branches, B (e.g., B=2 for FIG. 5C, subpanel C). The time complexity can be rewritten as $O(NB^3)$.

From the analysis, the network layout adjustment to avoid link intersection has the largest computational cost ($O(N^2+L^2)$). The matrix inversion using symbolic computing also usually requires time-consuming computations even when the number of symbols is very small (e.g., 1000 seconds when S=10 [39]). Resistance optimization ($O(NB^3)$) can be a bottleneck when a network has a large number of path branches, B (e.g., a network with many star shape sub-networks).

Experimental evaluation. The study used a MacBook Pro with 2.3 GHZ 8-Core Intel Core i9 and 64 GB 2,667 MHZ DDR4 (no GPU use). The study collected networks from the graph-tool's dataset collection [70] and the Netzschleuder network repository [71] to evaluate the pipeline with various real-world and synthetic networks. Given current limitations on 3D printing resolution, the study selected all networks with less than 100 nodes, resulting in 57 networks with the ranges of N: [4, 96] and L: [5, 2539]. For layout adjustment, the study measured the time needed to process a network with all loss functions.

As expected from the time complexity analysis, resistance optimization and network layout adjustment had longer completion times than other pipeline phases. The friendship network of New Guinea Highlands tribes (N=16, L=58) took 0.7 ms for resistor link selection, 50 s for resistance optimization, 4 ms for network layout, and 300 s for network adjustment. From this bottleneck, the study focused on evaluating the completion times of resistance optimization and network adjustment.

Figure 7A:
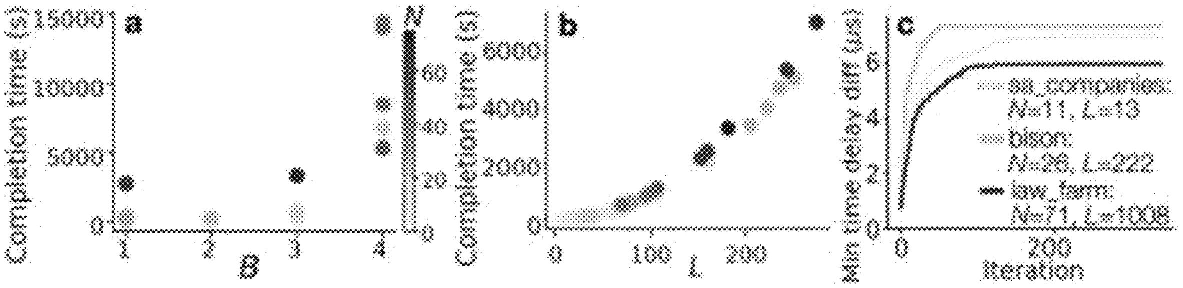
FIGS. 7A and 7B show experimental results associated with the first algorithm of FIGS. 5A-5F in accordance with an illustrative embodiment.

FIG. 7A, subpanels A and B show the results of resistance optimization and network adjustment, respectively. The x-axis reflects the most influential variable for their time complexity (e.g., B for resistance optimization due to $O(NB^3)$). The sequential colormap reflects N as the secondary influential variable. These results follow the theoretical time complexity.

Resistance optimization finished in approximately 4 hours for a network with N=47 and L=504 (B=4). Network layout adjustment completed in 2 hours for a network with N=70 and L=274.

The study also evaluated the quality of resistance optimization to examine its effectiveness in practically distinguishing touched nodes with a microcontroller. The study initialized the resistance of resistor links randomly within a range of [50 kΩ, 300 kΩ] and performed optimization. FIG. 7A, subpanel C shows the transition of the minimum difference among the time delays. Optimization significantly increases the minimum difference (e.g., from 0.8 μs to 7.4 μs for the bison network) and quickly converges.

The resistance optimization was designed such that it maximized the minimum difference of the time delays. An order of magnitude increased time delays significantly improved the sensitivity of node recognition. It was observed that the improvement enabled the Arduino UNO R3 to further distinguish touched nodes by the difference of 120 clock cycles (i.e., 7.4 μs) instead of 13 clock cycles (i.e., 0.8 μs).

Figure 7B:
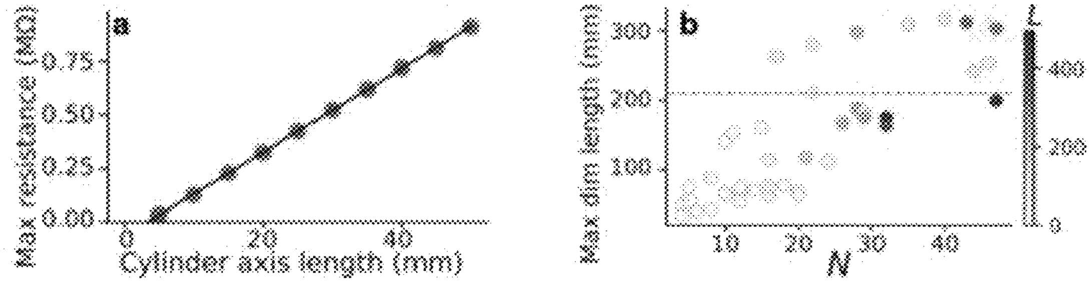

Fabrication Scalability. To determine the largest network we can fabricate, the study assumed a 3D printer with a 0.4 mm nozzle (standard for consumer FDM 3D printers) using Protopasta's conductive PLA (1.75 mm). The study first measured the maximum resistance produce-able with the conductive traces using the serpentine trace pattern. As it depends on the cylindrical volume of a resistor link, the study applied the resistor network embedding method to cylinders with different axis lengths and a fixed base radius of 3 mm. In FIG. 7B, a linear relationship cab be observed between the maximum achievable resistance and the cylinder length.

Next, the study identified the required resistance for sensing networks' resistor links to be able to distinguish each selected node. To keep the evaluation concise, the study assumed sensing networks can be built with the Arduino Uno R3 (one clock cycle per 62 ns); at least 3.1 μs difference (50 clock cycles) among the time delays is required to distinguish a touched node; the involved capacitance for each touch is 100 pF (a representative value for a human body [25]); and all resistor links are connected in series. With the assumptions and Equation 1B, the required resistance for each resistor link was derived as 45 kΩ.

The study used the resistance to derive the required print sizes to fabricate sensing networks. As shown in FIG. 7B, subpanel A, the minimum cylinder length to satisfy 45 kΩ is 6 mm. The study also set the radius of each node to be 6 mm (twice the base radius of a cylinder). Following the network layout and adjustment processes, the study laid out the networks such that their minimum resistor link length matched the identified cylinder length using $$J_{int}^{res}$$

and $$J_{int}^{node}$$

to avoid intersections of conductive materials. The study then obtained the maximum distance of all possible pairs of nodes to compute the required length for the printing area. Based on these computations, the study estimated that the printable sensing network size was between 20-30 nodes when using a consumer 3D printer such as the Prusa i3 MK3S+. The result implied that the scale of the approach is currently limited by the size of the 3D printer rather than the computational complexity of the algorithms.

Usage scenarios. The study demonstrated the utility of the sensing network in practice through three usage scenarios. These usage scenarios focus on three general visualization tasks—exploration, explanation, and analytic provenance—contextualized in the educational context of a student exploring disease spread using a social network. These scenarios are driven by the concept of exploration [112] (i.e., how exploratory and explanatory visualization techniques can inform each other). The exploratory case demonstrates how our approach aligns with emerging uses of tangible 3D input devices for 3D interaction and exploration [11, 37]. Various studies confirm the benefits of using 3D input devices, such as reducing mental effort, compared to the traditional keyboard and mouse setup [10, 26, 45, 83]. The explanatory case aligns with how physical models have also been used to richly explain abstract concepts (e.g., visualization [6, 46], thermodynamic surfaces [61], biology [3, 27]) for educational purposes and general science communication [79, 81, 89].

The third usage scenario emphasizes the capabilities of our network physicalization as a sensor. Building upon literature on analytic provenance [75, 110], the exemplary networks can richly and passively capture how users interact with the data physically, serving as a tangible data log for their physical navigation of the data.

The study derived these scenarios from discussions with subject matter experts who use networks in their everyday practice (e.g., chemistry, computational biology, network science). The usage scenarios summarize core functionality that experts currently rely on alternative solutions to support. We implemented each scenario based on the parameters described during our interviews (FIG. 8). Details of these discussions are stated in Sec. 4.3. See the supplemental video for the demo.

Study discussion. Designing physicalizations is complex. Developers must concurrently reason over the (sometimes conflicting) constraints of the materials, production methods, and human sensemaking. Current methods for integrating sensing and interactivity further complicate these constraints and often require advanced knowledge of electronics. The depth of data analysis that a physicalization supports generally depends on the number of interactions [7], but these interactions are difficult to design and implement. By concurrently generating data representations (form) alongside sensing capabilities (interaction), the exemplary pipeline of the instant study addressed several low-level engineering challenges associated with physicalization production (e.g., layout, circuit design, and sensor integration) for networks and any visualization using a hub-and-strut structure. This design paradigm shift enabled integrating sensing capabilities without disturbing a physicalization's form and can help achieve more complex physicalizations. As a result, this work lowers the barrier of entry for people to incorporate physicalizations into their work.

Past work in visualization authoring tools parallels our goal to make it easier to produce interactive data representations. Toolkits such as D3 [13], Vega-lite [84], and prefuse have made it easier to create interactive visualizations. The power of these toolkits is their ability to concurrently consider interactions and visual representations, similar to our pipeline. However, prior to these tools, developers used systems designed for general graphics applications, which lacked specific support for designing interactive visualizations. Consequently, developers had to develop custom solutions for common operations, such as mapping data to visual elements and event handlers. Digital toolkits reduced the time and labor associated with visualization development, leading to readily reusable and reliable components for common operations. Toolkits for physicalizations have the potential to achieve similar goals, enabling developers to focus more on what analytical scenarios they want to explore with a physicalization rather than how to build one.

The exemplary computational pipeline developed in the instant study can currently support selection by touch through capacitive sensing and computational inference. Though limited, select is a fundamental interaction primitive that can enable designers to implement more complex interactions at the application layer. At the application level, physicalizations must be able to work alongside other visualizations (e.g., desktop-based, immersive visualizations). This need was confirmed in discussions with experts once they understood that our sensing network could be integrated into their analytical practices.

Though the experts work with different media (e.g., CAVEs, desktops, AR/VR headsets), the exemplary sensing network physicalizations could be readily integrated with these different devices through serial communication. The integration would allow systems to simultaneously leverage the responsiveness of digital displays with the intuitive interactions and cognitive benefits of physicalizations. In turn, the hybrid modality can shed a more critical perspective on analyzing the strengths and weaknesses of digital and physical approaches, possibly leading to a stronger post-WIMP (windows icon menu pointer) paradigm [50], [51], [78], [80].

Second Study Evaluation. The second study evaluated the efficacy of the second computational pipeline with three technical evaluations and several applications, including (i) the practical constraints of the second pipeline, specifically the number of touchpoints that are fabricate-able while ensuring each touchpoint is distinguishable, (ii) the computational performance evaluation of the algorithms used in the automatic circuit design stage, and (iii) a user evaluation for real-time recognition accuracy.

Fabrication Scalability. To determine the scalability of the capacitive touchpoints that are fabricate-able with the second computational pipeline, the second study evaluated the requirements for minimum length of each conduit (mm) between two touchpoints to distinguish each selected point. Determining the minimum length of each conduit between two touchpoints can infer the smallest possible volume of a freeform interface. The study did not evaluate the maximum size of a freeform interface, as the maximum size is restricted by the build volume of a given 3D printer.

For a double-wire connection configuration, the second study considered the time difference required to reach a microcontroller's logic threshold voltage when touching p-th and $(p+1)^{th}$ touchpoint, which can be written as $t_{thresp+1}-t_{thresp}=cr_{p+1}\ \ln\ (v_{in}/(v_{in}-v_{thres}))$. To analyze $t_{thresp+1}-t_{thresp}$, the study assumed (i) c=100 pF as a representative capacitance for a human body when selecting a touchpoint [7'], (ii) vin=5V and vthres=2.5V, following the technical specifications of the Arduino UNO R4, and (iii) 5 μs as the minimum value required for $t_{thresp+1}-t_{thresp}$, which corresponds to 240 clock cycles of the Arduino UNO R4's CPU. From the conditions, the study derived $r_{p+1}\geq 35$ kΩ.

To determine the minimum length of a conduit (3D pipe) that can house conductive traces with over 35 kΩ, the second study assumed (i) the use of Snapmaker JIS, a 3D printer with a 0.4 mm nozzle (standard for consumer FDM 3D printers), (ii) using a 0.4 mm nozzle, the thickness of the conductive trace for the xy-plane is set to 0.8 mm; the ray and layer margins are set to 1.2 mm, and (iii) Protopasta's conductive PLA (1 75 mm) as the conductive filament [23'].

The second study measured the resistance of a conductive trace per length along the xy-plane and z-direction using Protopasta's conductive PLA. The results were 256 Ω/mm for the xy-plane and 1013 Ω/mm for the z-direction. The study focused only on the conductive traces on the xy-plane because the circuit embedding mainly relied on traces on the xy-plane. Thus, to achieve 35 kΩ, the study determined fabrication of approximately 137 mm of a conductive trace along the xy-plane. This length can be achieved by drawing the conductive trace within a conduit that has a 5 mm diameter and 9 mm length. The result inferred the minimum length of a conduit to be 9 mm between each pair of touchpoints.

Different technical assumptions would lead to different results. One significant but changeable assumption is the minimum value required for $t_{thresp+1}-t_{thresp}$ (i.e., 5 μs). The study considered 5 μs to be a conservative value corresponding to over 200 clock cycles for the Arduino UNO 4, providing some buffer to account for errors in the conductive trace's resistance (e.g., due to poor 3D printing precision). If further quantification of 3D printing errors can be performed (e.g., high-precision printing), the minimum required time delay difference can be reduced (e.g., 1 μs), e.g., reducing the required horizontal length of a conductive trace for each conduit (e.g., from 137 mm to 27 mm).

Single-wire Connection. For the single-wire connection, the study employed the same assumptions employed for the double-wire connection condition and additionally applied the constraint of $r_2= \ldots =r_n=r$ and performed a grid search of r and $r_1$ to find the minimum value of r that satisfied $t_{thresp+1}-t_{thresp}\geq 5$ μs for all p. Unlike the double-wire connection, r for the single-wire connection may vary based on the number of touchpoints.

Figure 8A:
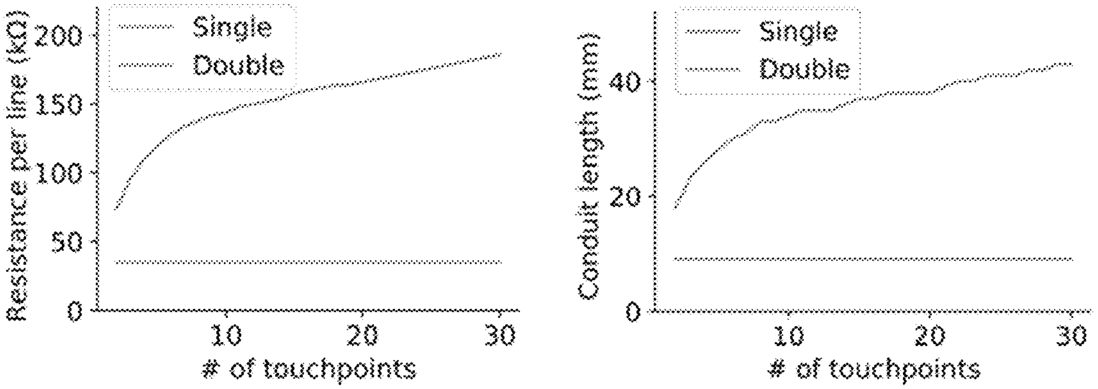
FIGS. 8A-8C show experimental results associated with the second algorithm of FIGS. 6A-6C in accordance with an illustrative embodiment.

FIG. 8A, subpanel A shows a summary of the value of r dependent on the different number of touchpoints. Following the same procedure as the double-wire connection, the study derived the minimum length of a conduit with a 5 mm diameter, as shown in FIG. 8A, subpanel B. The study inferred that (i) the required length of a conduit between two touchpoints is longer than the double-wire connection and (ii) the required length follows a close-to-logarithmic function as we increase the number of touchpoints. It was observed that the single-wire connection placed a stronger constraint on fabricating a small freeform interface with numerous touchpoints.

Computational Performance. The second study conducted a performance evaluation of the algorithms used in the automatic circuit design stage. The study analyzed the time complexity of the algorithms to uncover potential performance bottlenecks when dealing with complex or large 3D objects, then ran an experimental evaluation on different 3D models shown in FIG. 8B. The results show the automatic circuit design stages can be completed between 16s and 240s.

Time Complexity. The study observed the computationally demanding steps in the pipeline, includes (i) the voxelization operation of the freeform model, (ii) Dijkstra's pathfinding operation, and (iii) the circuit embedding operation. The voxelization used the implementation provided by PyVista [35'], which checks whether each position of voxel grids is within an object surface. Thus, the voxelization has $\mathcal{O}$ (TG) where T is the number of triangles constructing a surface, and G is the number of grid points. G is roughly proportional to the number of the resulting voxels, V (i.e., $\mathcal{O}(TG)\approx\mathcal{O}(TV)$). For each pair of touchpoints, Dijkstra's pathfinding algorithm was performed with the weighted graph of the trimmed voxel representation.

In total, this pathfinding has $\mathcal{O}$ (NV log V) where N is the number of touchpoints. The circuit embedding operation found a line segment for each ray on a conduit using the space-filling algorithm. With S triangles on a conduit's surface, the line segmentation was performed with $\mathcal{O}$ (S log S). When several rays were generated to slice a conduit (modeled as a 3D pipe) with a small margin, the circuit embedding for each conduit had a time complexity of $\mathcal{O}$ (US log S) where U is the volume of a 3D object.

The study applied the serpentine trace pattern only for low-conductivity conduits. In total, the circuit embedding took $\mathcal{O}$ (NUS log S). However, if a conduit's surface was modeled with a fixed small number of triangles, the study observed the complexity to reduce to $\mathcal{O}$ (NU).

In summary, the automatic circuit design involved $\mathcal{O}$ (TV) (i.e., voxelization), $\mathcal{O}$ (NV log V) (i.e., Dijkstra's), and $\mathcal{O}$ (NU) (i.e., circuit embedding) computations. The results indicate the critical parameters to affect computation cost to be U (volume), T (the number of triangles), V (the number of voxels), and N (the number of touchpoints).

Figure 8B:
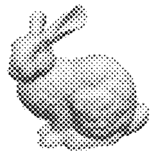
Figure 8B:
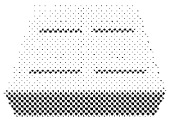
Figure 8B:
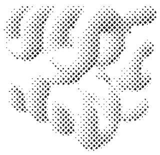
Figure 8B:
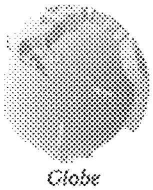
Figure 8B:
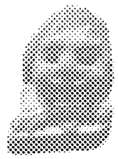

Experimental Evaluation. The second study also used the MacBook Pro with 2.3 GHZ 8-Core Intel Core i9 and 64 GB 2,667 MHZ DDR4 (no GPU use) per the first study. The second study collected and modeled eight 3D objects, some reproduced in FIG. 8B. For each object, the study ran the automatic circuit design stage five times and measured the average completion time. The breakdown and total completion times are shown in FIG. 8B. The miscellaneous steps shown in the table of FIG. 8B include the clipping touchpoints, the conversion from the trimmed voxel to the graph representation, and the resistance optimization. From the time complexity analysis, it can be observed that completion time differed based on the number of triangles, voxels, touchpoints, and model's volume and, for the selected 3D models, the automatic circuit design was completed in less than 4 minutes for all objects.

Applications. The second study demonstrated the applicability of the second computational design pipeline with six freeform interfaces with different geometry, including Stanford Bunny, MIDI Drumpad, a Hilbert Curve, a Chinese character (power), a museum artifact (Chinese lion), and a globe.

FIG. 4 shows the 3D printed model, its internal circuit, and its respective RC delay graph with the single-wire connection. Except for the Chinese Character (power) and MIDI Drumpad, the remaining four models were selected from the Thingi10K dataset repository [41']. The freeform interfaces represent different numbers of touchpoints with the required conduit length. In FIG. 4, the non-gray colors on the RC delay graph correspond to each touchpoint's unique RC delay. Each freeform interface's RC delay graph indicates all touchpoints can be individually sensed.

Recognition Accuracy. The study second evaluated two of the freeform interfaces and conducted a controlled study to measure the real-time recognition accuracy of the freeform interfaces. The single-wire and double-wire connections were employed as independent variables, and the accuracy of recognizing touchpoints was the dependent variable. The study measured the real-time recognition accuracy for 8 different objects selected based on the different number of touchpoints. The objects were generated from four different models: MIDI Drumpad with 4 keys (PAD_4), MIDI Drumpad with 9 keys (PAD_9), MIDI Drumpad with 16 keys (PAD_16), and a Hilbert Curve with 10 touchpoints (HILBERT_10). Each model was printed twice to represent the single-wire and double-wire connections. Each touchpoint was labeled with a number to indicate its touchpoint ID.

The study reviewed the MIDI Drumpads as a representative of simple geometry, having a geometry that is straightforward for users to recognize and select the touchpoints. The study also reviewed the Hilbert curve with 10 touchpoints.

Protocol. The second study recruited 10 participants for the study. The 3D-printed object was connected to an Arduino UNO 4 microcontroller, which was connected to a laptop. Participants were first given an overview of our capacitive sensing mechanism, and the experimenter demonstrated the sensing of touchpoints using the Stanford Bunny as an example.

The study alternated the order of the two conditions (i.e., single-wire and double-wire connection) per participant. For each object, the participants were given verbal instructions for the calibration process and to perform the test on the order of the touchpoints (left to right; row by row). For the MIDI pads, they held onto each touchpoint for 7s to account for fluctuation and noise. For the Hilbert Curve, participants were given 3 additional seconds to find the appropriate touchpoint because of the object's complex geometry. For each object, the study randomly generated the order of the touchpoint ID the participants should touch (i.e., target touchpoint).

Figure 8C:
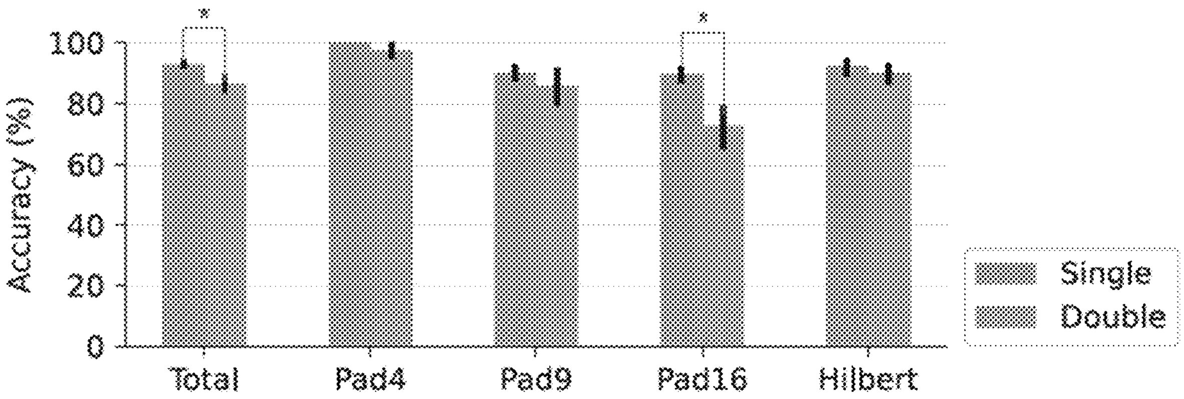

Findings. The study observed an average accuracy of 89.96% (SE=1.626) across the 8 freeform interfaces. FIG. 8C shows results from the real-time recognition accuracy. The bar charts show the average accuracy across n=10 participants with a 70% threshold. Error bars represent standard errors. There is a significant difference between the overall single-wire and double-wire connections and for (PAD_16).

It can be observed that 6 out of 8 freeform interfaces achieve real-time accuracy of 90% or higher. All objects in the single-wire connection demonstrated higher accuracy compared to their double-wire connection. A Wilcoxon signed-rank test also showed a statistically significant difference between the two conditions' accuracies (Z=1.848, p=0.03233). Overall mean accuracies are 92.84% (SE=1.338) for the single-wire connection and 86.34% (SE=2.893) for the double-wire connection.

The model that had the greatest difference was PAD_16. A Wilcoxon signed-rank exact test showed there is a significant difference (p=0.02328) in the accuracies between the single-wire and double-wire connections. Five participants had an accuracy of less than 80% with the double-wire connection. One has misrecognition errors due to calibration error.

Discussion

Interactions are critical for working with data. They help people build mental models as they explore a dataset by gathering additional information, zooming into critical details, filtering for important information, or panning to view otherwise hidden surfaces [21], [59]. Manipulating data physically can further enhance our data understanding when compared to more traditional formats (e.g., viewing on a 2D display) by being more natural [24], yielding better performance on certain tasks [52], and even improving information recall [55], [94], [95]. Despite these benefits, most physicalizations are static representations that do not support common data interactions (e.g., selecting, and filtering). Without interactions, physicalizations are essentially static images of datasets, reducing data expressiveness and inhibiting data exploration.

Creating interactive physicalizations is challenging because it requires cross-disciplinary knowledge spanning visualization, fabrication, and electronics [7], [22]. Visualization enables us to effectively represent data. Fabrication converts data into physical objects using computer-aided designs (CAD). Electronics integrate interactive capabilities into the resulting objects. Most interactive physicalizations are produced in an ad hoc, unstructured manner, resulting in one-off solutions tailored to a specific dataset, problem, or interaction. These designs cannot be easily extended to new scenarios or future physicalizations. Without generalizable approaches, these unstructured explorations mean that the form (i.e., physical structure) and function (i.e., interactive capabilities) of physicalizations are produced as separate workflows, leading to a lack of transferable and generalizable techniques.

This work presents a computational design pipeline for 3D printing network physicalizations with integrated sensing capabilities. Given a network dataset, our pipeline produces a network physicalization that supports node selection using capacitive sensing—a common technique for capturing touch input on devices (e.g., smartphones, touch tables) [35]. Leveraging multi-material 3D printing, we create capacitive sensors within the network that can be used to uniquely identify each node. By concurrently considering form and interactivity, our pipeline automates low-level hardware instrumentation to raise selection-driven interactions to application-level implementations, enabling the creation of more powerful and complex physicalizations.

Networks have broad utility in almost all domains [8], [56], [65], yet their complex geometry also requires significant engineering considerations to make them physically interactive (e.g., circuit design and sensor integration). The instant study addressed these challenges with a computational design pipeline—enabled by 3D printing—that generated electrical circuits and 3D models in pipeline steps. A designer can upload their network dataset, and the pipeline then automatically generates conductive traces (i.e., wires) with a tuned electrical resistance that will be integrated into the links of a network physicalization. Then, it generates the necessary 3D geometry needed to fabricate the sensing network physicalization consisting of links and nodes. Conductive traces within the links act as resistors, and the nodes act as electrodes. The nodes and links are computationally designed to exploit a phenomenon called resistor-capacitor (RC) delay. The exemplary pipeline can generate unique RC time delays when a user touches any node within the network, thereby enabling applications to identify the touched node using a single capacitance measure. Applications can use this identification to leverage selection by touch. Selection—the ability to indicate a mark of interest—is a fundamental interaction primitive for more complex interaction designs, such as filtering or elaborating [2], [28], [54], [92], [111].

The study demonstrated the efficacy of the approach with computational evaluations showing our method's scalability, expert discussion, and three usage scenarios. The usage scenarios focus on how selection can support three general visualization tasks: exploration, explanation, and analytic provenance [75], [90], [112]. The study shows the exemplary system and method can be used to broaden the interaction space by enabling communication with other devices (e.g., AR/VR and desktop visualizations) [51], [78] and can capture analytic provenance (e.g., data sensemaking) [75], [110].

As a whole, sensing physicalizations takes a critical step toward creating future physicalizations with responsive interactions that can support both input and output functionalities. The study showed how a systematic approach can lead to generalizable physicalization fabrication techniques that integrate form and interaction into one cohesive workflow.

Consequently, this new design paradigm can aid in lowering the barrier to physicalization research, creation, and adoption. Related work. Due to physicalizations' cross-disciplinary nature [7], we build on past work in (i) interaction primitives in visualization, (ii) fabrication techniques used in physicalizations, (iii) network physicalizations, and (iv) the fabrication of capacitive sensors within 3D printed objects.

Select as an Interaction Primitive. To efficiently explore data (whether digitally or physically), people must be able to easily navigate to different parts of the representation and inspect local details [21], [59], [111]. This navigation requires selecting the data of interest to move between locations and reveal (or hide) relevant details. Both HCl and visualization recognize select as an interaction primitive that enables other interactions to take place. Foley et al. [28] place selection at the highest hierarchical level of input interactions for graphics, indicating its foundational role in supporting more complex interaction designs. Similarly, several visualization interaction taxonomies [2], [54], [92], [111] highlight select as necessary for visualization systems before enabling other data-related interactions. While select is traditionally achieved with the keyboard and mouse in desktop visualizations, we lack a corresponding paradigm for physicalizations.

Despite the lack of interaction standards for physicalization, research identifies several benefits of interacting with data physically. Direct manipulation with physicalizations has been shown to be more natural and preferred [24], yield better performance [52], and improve information recall [55], [94], [95] compared to desktop visualizations. However, most physicalizations still have limited interaction capabilities.

A key reason for their limited interaction capabilities is that the materials used to create physicalizations generally do not sense and respond to users. Many physicalizations offset this difficulty by incorporating off-the-shelf electronic components (e.g., motors, LEDs) into their form [7, 58, 98] or using computer vision (CV) techniques [42, 62]. Electronic components have pre-defined scales and dimensions, ultimately affecting how they can be incorporated into a physicalization. The over-reliance on electronic components also does not generalize well to more complex physicalizations (e.g., complex spatial structures large datasets).

In addition, most devices using CV cannot reproduce the haptic benefits that naturally leverage (i.e., holding, rotating) with the sense of touch. Past studies [10], [24], [45], [107] confirm the importance of providing tangible inputs when virtually exploring data.

Separating form from interaction leads to a series of issues, including post-hoc instrumentation, the potential for conflicting constraints requiring costly design iterations, and a lack of generalizability across design instances. Most existing interaction infrastructures are designed for a specific implementation, resulting in one-off artifacts where the design insights and methods gained from a physicalization are specific to that instantiation [7], [22]. The exemplary system and method integrates sensing capabilities directly into a physicalization's form, enabling designers to concurrently consider form and interactivity. This concurrent design enables us to address key design and fabrication challenges in physicalization as outlined by Djavaherpour et al [22]: designing for manufacture and assembly, and prototyping and interactive design. Our approach is optimized to ensure fabricability, avoid manual assembly, enable interactivity, and reduce costly prototyping iterations.

Digital Fabrication Approaches for Physicalizations. Digital fabrication enables designers to use a digital representation (e.g., 3D model) to produce a physical object. This procedure allows designers to use computational techniques to generate designs for physicalizations that would be otherwise difficult to create manually. 3D printing is a common digital fabrication technique used to make physicalizations [7], [22]. In 3D printing, thin amounts of material are layered to produce an object with complex geometries (e.g., overhangs, lattices, and internal structures) that would be difficult to fabricate by other means (e.g., laser cutting). 3D printing can also employ multiple materials to achieve differences in color or material properties (conductivity, flexibility, etc.) [66]. These capabilities offer creative opportunities to represent data, including cartographic maps [1], [76], [100], customized data representations [57], [96], and common data representations (e.g., bar charts [97], networks [19, 24, 62]). These works illustrate how 3D printing is a powerful representational medium and highlight its potential to produce more complex physicalizations.

Various works [18], [97] show that using a computational pipeline with 3D printing can make designing physicalizations easier. MakerVis [97] imports a dataset to be fabricated as layered visualizations (e.g., bar, line) or prism maps. These physicalizations are passive, static objects. Abreu de Freitas et al. [18] extend MakerVis by enabling a designer to specify the intended behavior for bar charts (i.e., passive, reconfigurable, dynamic). Dynamic bars are printed but must be attached to various external electronic components for interaction.

In contrast, the instant study built on past pipelines to (i) support structural complexity and (ii) integrate key interaction support during production. The exemplary approaches can be employed for complex geometries (i.e., networks) to offer unique structural solutions for fabrication that the exemplary computational pipelines can dynamically resolve and also automatically specify and produce electrical circuitry inside of a physicalization using a conductive filament, rather than designing around electrical components that are integrated post-production. This approach cases the process of creating interactive physicalizations by linking electronic design and implementation with a physicalization form.

Network Physicalizations. Current network physicalizations are passive objects with no innate sensing capabilities [23], [29], [74]. Drogemuller et al. investigated haptic and visual comprehension of a flat 2D network physicalization (16-24 nodes) using an external camera to log user interactions. Dehmamy et al. [19] introduced a network layout algorithm for physical networks that is optimized to avoid link intersection, but their algorithm relies on a rigorous trial-and-error process to determine layout parameters. Their 3D printed network (184 nodes, 176 links) does not support integrated sensing. McGuffin et al. show the promise of physical network interactions (70 nodes, 140 links) mediated with augmented reality (AR) tracked using external cameras, which present interaction limitations (c.f., Sec. 2.1). In contrast, the instant studies and exemplary approaches support network physicalizations with minimal parameter-tuning to produce free-standing networks with integrated sensing capabilities.

Integrating Interactivity into 3D Printed Objects. Most objects made on 3D printers are static forms and have no interactive capabilities. HCl researchers explored embedding electronic components (e.g., sensors [40], [67], [85], [108], LEDs [40], [108]) and designing internal structures (e.g., pipes for light [86], [99], [108]) in printed objects to support interactivity through user input and display output. Various works also investigated how to create conductive traces within printed objects to achieve capacitive sensing [15], [87], [88], a common technique used in commercial devices (e.g., smartphones, tablets) to capture touch input [35]. A conductive material (e.g., conductive PLA) inside an object can create electrical traces for capacitive sensing [15], [87], [88]. Capricate [87] and ./trilaterate [88] created capacitive sensors in 3D printed forms; however, both rely on having an individual electrical connection (i.e., wire) for each sensor. This instrumentation can affect an object's mobility. Furthermore, neither system is designed to handle the complex structure of networks. In contrast, the exemplary approaches of the instant studies require at most two wires to achieve sensing and optimize the design of electrical traces, capacitive sensors, and physical geometry specifically for networks.

Additional Discussion

Recent advancements in 3D printing are transforming the role of 3D printers, opening a new range of applications from personal fabrication to formalized products [3'], [4']. However, most 3D printed objects are static and passive, which limits their functionalities and applications in real-world contexts. Researchers in human-computer interaction (HCl) and graphics have explored ways to enable interactivity (e.g., sensing and actuation) in 3D printed objects [3']. One popular approach is to embed off-the-shelf electronic components (e.g., sensors [40'], [42'] or LEDs [15'], [28']). However, designing around these electronic components can be difficult and time-consuming. Additionally, the 3D-printed objects still require instrumentation with these components after fabrication. Reliance on external electronic components can impact the design and use of 3D-printed objects.

Multi-material printing can address some of these challenges while presenting new design opportunities. Namely, it offers a new way to think about the overall design and manufacturing process to fabricate interactive 3D printed objects. The traditional design process separates form (i.e., a 3D model) and interactivity into two individual processes. However, multi-material printing can bridge these two processes. This bridge can lead towards the broad vision of 3D printing objects that are fully interactive and ready to be used straight off the printer. As one example, we can use conductive filaments to 3D print electronics such as resistors directly into the target object and minimize post-instrumentation.

Compared to off-the-shelf electronic components, 3D printed electronics offer advantages such as customization in their overall geometry and electronic properties. Other works have leveraged multi-material 3D printing with conductive materials to create interactive objects that have capacitive sensing abilities. However, these objects either still require significant instrumentation (e.g., n wires linked to a microcontroller to enable n touchpoints) [22'], [29'], [32'] or are limited to primitive geometry consisting of spheres and cylinders [2']. The goal of our work is to enable the design and fabrication of interactive objects that have more complex geometry and minimal instrumentation to achieve interactive functionality.

In contrast, the exemplary system and method can embed multiple capacitive touchpoints into any 3D model that has a closed mesh without self-intersection. The approach can optimize the electrical resistance across the user-defined touchpoints to exploit a phenomenon called resistor-capacitor (RC) delay. RC delay is the time required to charge a capacitor in a circuit through a particular amount of resistance. By creating unique RC time delays for all touchpoints, each touchpoint can be capacitively sensed using only a single-wire or double-wire connection. This approach enables interactivity in 3D printed objects for an extensive range of 3D geometry while imposing minimal instrumentation of electronic components.

Minimal instrumentation, especially through a single-wire connection, can promote easier assembly (or disassembly) for prototyping and use. For instance, a single-wire connection can support contexts where the 3D model is long (length- or width-wise) and has limited bounding volume (e.g., sword, robotic finger) to fit another wiring connection. A single-wire connection can further reduce design constraints when creating an interactive 3D-printed object by increasing circuit design flexibility (e.g., enabling the use of a smaller microcontroller) and potentially offering lower power consumption.

Interactive 3D Prints Using Electronics. The instant study was built on research that demonstrated ways to computationally design and fabricate interactive objects and capacitive sensors with 3D printing. Research in HCl and graphics is exploring how to support interactivity in 3D-printed objects. In surveying the design space, Ballagas et al. [3'] highlight six key mechanisms of interaction in 3D printed forms: acoustic, electronic, hydraulic, metamaterial, optic, and pneumatic.

Electronic components (e.g., motors, LEDs) offer versatile functionalities and are the backbone of most interactive devices we encounter. The most popular interactivity mechanism for modern 3D printed objects is embedding or attaching off-the-shelf electronic components to 3D printed objects [3']. However, integrating off-the-shelf electronic components into 3D prints can be challenging. An individual must design an object around these components, ensuring that they can be inserted and wired accordingly post-fabrication [3'], [11'], [21'], [27'], [36'].

Computationally, designing the location of electronic components can reduce design labor as well as minimize instrumentation. For example, SurfCuit [38'] and MorphSensor [43'] allow makers to computationally preview component placement (e.g., resistors and integrated circuits) on the exterior surface of an object and then manually connect them with conductive tape once the object is 3D printed. DefSense [1'] computationally designs channels so that wires and sensors can be embedded into a 3D print to enable deformation sensing. Similarly, ModElec [15'] further reduces the manual labor of wiring by generating 3D-printable conductive traces with an A* search algorithm [13'].

While these approaches help reduce design challenges, their methods still must account for the external physical electronic components. This reliance can influence the design of the object (e.g., prevent a small footprint) and still requires significant wiring and/or assembly, especially to integrate sensors. In contrast, the instant study developed the exemplary system and method that can fabricate electronics as part of the 3D printing process, contributing to emerging research on 3D printable electronics [8'], [10'], [17']. In certain embodiments of the instant approach, conductive traces can be automatically generated and 3D printed inside of an object to act as resistors. This approach supports any 3D models that have a closed mesh without self-intersection, reduces the need for manual assembly, and minimizes the use of additional electronic components.

Printed Capacitive Sensors. Capacitive sensing is a technique to capture touch input on devices by capacitively coupling the human body to a conductive material (e.g., an electrode or wire). Grosse-Puppendahl et al. [12'] provided a survey highlighting how capacitive sensing has been used in various HCl contexts. Embedding conductive materials-including conductive filament-into 3D-printed objects can enable capacitive sensing. These 3D printed objects generally fall under two categories: they are either designed with a conductive bottom surface that can be sensed on touchscreen devices [30'], [31'] or with conductive regions that can be wired to an external microcontroller [2'], [5'], [29'].

Several works [2'], [5'], [29'], [32'] demonstrated techniques to generate electrical traces within a 3D model. The resulting 3D-printed objects have multiple touchpoints for sensing once they are connected to a microcontroller. However, the majority of these approaches [5'], [29'], [32'] still require significant instrumentation (e.g., n wires connected to a microcontroller to sense n touchpoints). In contrast, the instant study minimized post-instrumentation by optimizing RC delay.

Though Bac et al. [2']'s approach use RC delay to minimize post-instrumentation with multiple touchpoints, their approach can only generate network structures consisting of primitive, low-complexity shapes (i.e., spheres and cylinders) [25']. Bae's pipeline does not extend to models with complex geometry—such as the Stanford Bunny—and users cannot specify which regions should be interactive. The pipeline does not work for a 3D model that has a closed mesh without self-intersection to enable users to design touchpoints directly on their 3D model. In terms of the sensing technique, Bac et al. [2'] focus primarily on capacitive sensing with two external wire connections. Careful circuit design considerations via a heuristic resistance optimization approach would be needed for robust single-wire sensing of multiple touchpoints.

Machine Learning. The exemplary system and method can be implemented using one or more artificial intelligence and machine learning operations in addition to those provided herein. In addition to the neural network described above, the term "artificial intelligence" can include any technique that enables one or more computing devices or computing systems (i.e., a machine) to mimic human intelligence. Artificial intelligence (AI) includes but is not limited to knowledge bases, machine learning, representation learning, and deep learning. The term "machine learning" is defined herein to be a subset of AI that enables a machine to acquire knowledge by extracting patterns from raw data. Machine learning techniques include, but are not limited to, logistic regression, support vector machines (SVMs), decision trees, Naïve Bayes classifiers, and artificial neural networks. The term "representation learning" is defined herein to be a subset of machine learning that enables a machine to automatically discover representations needed for feature detection, prediction, or classification from raw data. Representation learning techniques include, but are not limited to, autoencoders and embeddings. The term "deep learning" is defined herein to be a subset of machine learning that enables a machine to automatically discover representations needed for feature detection, prediction, classification, etc., using layers of processing. Deep learning techniques include but are not limited to artificial neural networks or multilayer perceptron (MLP).

Machine learning models include supervised, semi-supervised, and unsupervised learning models. In a supervised learning model, the model learns a function that maps an input (also known as feature or features) to an output (also known as target) during training with a labeled data set (or dataset). In an unsupervised learning model, the algorithm discovers patterns among data. In a semi-supervised model, the model learns a function that maps an input (also known as a feature or features) to an output (also known as a target) during training with both labeled and unlabeled data.

Neural Networks. An artificial neural network (ANN) is a computing system including a plurality of interconnected neurons (e.g., also referred to as "nodes"). This disclosure contemplates that the nodes can be implemented using a computing device (e.g., a processing unit and memory as described herein). The nodes can be arranged in a plurality of layers, such as an input layer, an output layer, and optionally, one or more hidden layers with different activation functions. An ANN having hidden layers can be referred to as a deep neural network or multilayer perceptron (MLP). Each node is connected to one or more other nodes in the ANN. For example, each layer is made of a plurality of nodes, where each node is connected to all nodes in the previous layer. The nodes in a given layer are not interconnected with one another, i.e., the nodes in a given layer function independently of one another. As used herein, nodes in the input layer receive data from outside of the ANN, nodes in the hidden layer(s) modify the data between the input and output layers, and nodes in the output layer provide the results. Each node is configured to receive an input, implement an activation function (e.g., binary step, linear, sigmoid, tanh, or rectified linear unit (ReLU), and provide an output in accordance with the activation function. Additionally, each node is associated with a respective weight. ANNs are trained with a dataset to maximize or minimize an objective function. In some implementations, the objective function is a cost function, which is a measure of the ANN's performance (e.g., an error such as L1 or L2 loss) during training, and the training algorithm tunes the node weights and/or bias to minimize the cost function. This disclosure contemplates that any algorithm that finds the maximum or minimum of the objective function can be used for training the ANN. Training algorithms for ANNs include but are not limited to backpropagation. It should be understood that an ANN is provided only as an example machine learning model. This disclosure contemplates that the machine learning model can be any supervised learning model, semi-supervised learning model, or unsupervised learning model. Optionally, the machine learning model is a deep learning model. Machine learning models are known in the art and are therefore not described in further detail herein.

A convolutional neural network (CNN) is a type of deep neural network that has been applied, for example, to image analysis applications. Unlike traditional neural networks, each layer in a CNN has a plurality of nodes arranged in three dimensions (width, height, and depth). CNNs can include different types of layers, e.g., convolutional, pooling, and fully-connected (also referred to herein as "dense") layers. A convolutional layer includes a set of filters and performs the bulk of the computations. A pooling layer is optionally inserted between convolutional layers to reduce the computational power and/or control overfitting (e.g., by downsampling). A fully-connected layer includes neurons, where each neuron is connected to all of the neurons in the previous layer. The layers are stacked similarly to traditional neural networks. GCNNs are CNNs that have been adapted to work on structured datasets such as graphs.

Other Supervised Learning Models. A logistic regression (LR) classifier is a supervised classification model that uses the logistic function to predict the probability of a target, which can be used for classification. LR classifiers are trained with a data set (also referred to herein as a "dataset") to maximize or minimize an objective function, for example, a measure of the LR classifier's performance (e.g., an error such as L1 or L2 loss), during training. This disclosure contemplates that any algorithm that finds the minimum of the cost function can be used. LR classifiers are known in the art and are therefore not described in further detail herein.

A Naïve Bayes' (NB) classifier is a supervised classification model that is based on Bayes' Theorem, which assumes independence among features (i.e., the presence of one feature in a class is unrelated to the presence of any other features). NB classifiers are trained with a data set by computing the conditional probability distribution of each feature given a label and applying Bayes' Theorem to compute the conditional probability distribution of a label given an observation. NB classifiers are known in the art and are therefore not described in further detail herein.

A k-NN classifier is an unsupervised classification model that classifies new data points based on similarity measures (e.g., distance functions). The k-NN classifiers are trained with a data set (also referred to herein as a "dataset") to maximize or minimize a measure of the k-NN classifier's performance during training. This disclosure contemplates any algorithm that finds the maximum or minimum. The k-NN classifiers are known in the art and are therefore not described in further detail herein.

Conclusion

In some implementations, the computational pipeline described herein automatically generates conductive traces with tuned electrical resistance that will be integrated into 3D-printed objects. These conductive traces are computationally designed to exploit a phenomenon called resistor-capacitor (RC) delay. Unique RC time delays occur when a user makes contact with the conductive parts of a 3D-printed object. Applications can use this identification to leverage selection by touch.

In some implementations, multi-material 3D printing can be used to create capacitive sensors from network datasets that can be used to uniquely identify each touch point. Multiple touch points (e.g., 20) may be supported using a minimum of one wire. This technique can be used to make any object with sensing capabilities as long as the object is broken down into a hub-strut structure.

In some implementations, objects made on 3D printers are static forms and have no interactive capabilities. There are industry efforts to make interactive 3D printed objects and can align with IoT and tangible input devices. These can lead to smart, sensing objects which can communicate with other devices (e.g., AR devices, desktop applications).

Configuration of Certain Implementations

The construction and arrangement of the systems and methods, as shown in the various implementations, are illustrative only. Although only a few implementations have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied, and the nature or number of discrete elements or positions may be altered or varied. Accordingly, all such modifications are intended to be included within the scope of the present disclosure. The order or sequence of any process or method steps may be varied or re-sequenced according to alternative implementations. Other substitutions, modifications, changes, and omissions may be made in the design, operating conditions, and arrangement of the implementations without departing from the scope of the present disclosure.

When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data that cause a computer, special purpose computer, or special purpose processing machines to perform a certain function or group of functions.

Although the figures show a specific order of method steps, the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps.

It is to be understood that the methods and systems are not limited to specific synthetic methods, specific components, or to particular compositions. It is also to be understood that the terminology used herein is for the purpose of describing particular implementations only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another implementation includes from the one particular value and/or to the other particular value. Similarly, when values are expressed as approximations, by use of the antecedent "about," it will be understood that the particular value forms another implementation. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal implementation. "Such as" is not used in a restrictive sense, but for explanatory purposes.

The following patents, applications, and publications, as listed below and throughout this document, are hereby incorporated by reference in their entirety herein.

REFERENCE LIST

[1] K. Allahverdi, H. Djavaherpour, A. Mahdavi-Amiri, and F. Samavati. Landscaper: A modeling system for 3D printing scale models of landscapes. Comput Graph Forum, 37 (3): 439-451, 2018.

[2] R. Amar, J. Eagan, and J. Stasko. Low-level components of analytic activity in information visualization. In Proc. INFOVIS, 2005.

[3] K. D. Ang, F. F. Samavati, S. Sabokrohiyeh, J. Garcia, and M. S. Elbaz. Physicalizing cardiac blood flow data via 3D printing. Comput Graph, 85:42-54, 2019.

[4] Arduino. Arduino Uno R3. https://docs.arduino.cc/hardware/uno-rev3, 2023. Accessed: 2023 Mar. 24.

[5] P. Badger. Capacitive sensing library. https://playground.arduino.cc/Main/CapacitiveSensor/. Accessed: 2023 Mar. 24.

[6] S. S. Bae, R. Vanukuru, R. Yang, P. Gyory, R. Zhou, E. Y.-L. Do, and D. A. Szafir. Cultivating visualization literacy for children through curiosity and play. IEEE TVCG, 29 (1): 257-267, 2022.

[7] S. S. Bae, C. Zheng, M. E. West, E. Y.-L. Do, S. Huron, and D. A. Szafir. Making data tangible: A cross-disciplinary design space for data physicalization. In Proc. CHI, 2022.

[8] A.-L. Barabási et al. Network Science. Cambridge university press, 2016.

[9] C. Bennett, J. Ryall, L. Spalteholz, and A. Gooch. The aesthetics of graph visualization. In D. W. Cunningham, G. Meyer, and L. Neumann, eds., Computational Aesthetics in Graphics, Visualization, and Imaging. The Eurographics Association, 2007.

[10] L. Besançon, P. Issartel, M. Ammi, and T. Isenberg. Mouse, tactile, and tangible input for 3D manipulation. In Proc. CHI, pp. 4727-4740, 2017.

[11] L. Besançon, A. Ynnerman, D. F. Keefe, L. Yu, and T. Isenberg. The state of the art of spatial interfaces for 3D visualization. Comput Graph Forum, 40 (1): 293-326, 2021.

[12] M. Billinghurst, A. Clark, G. Lee, et al. A survey of augmented reality. Found. Trends Hum.-Comput. Interact., 8 (2-3): 73-272, 2015.

[13] M. Bostock, V. Ogievetsky, and J. Heer. D3 data-driven documents. IEEE TVCG, 17 (12): 2301-2309, 2011.

[14] R. Brown. Series and parallel resistors and capacitors. The Physics Teacher, 41 (8): 483-485, 2003.

[15] J. Burstyn, N. Fellion, P. Strohmeier, and R. Vertegaal. PrintPut: Resistive and capacitive input widgets for interactive 3D prints. In Proc. INTERACT, pp. 332-339, 2015.

[16] J. S. Cohen. Computer Algebra and Symbolic Computation: Mathematical Methods. CRC Press, 2003.

[17] S. Davidson. Grasshopper: Algorithmic modeling for Rhino. https://www.grasshopper3d.com/, 2023. Accessed: 2023 Mar. 24.

[18] A. A. de Freitas, W. C. Monteiro, T. A. Soares de Sousa, V. F. Queiroz, T. D. Oliveira de Araújo, and B. S. Meiguins. A flexible pipeline to create different types of data physicalizations. In Proc. IV, pp. 73-78, 2022.

[19] N. Dehmamy, S. Milanlouei, and A.-L. Barabási. A structural transition in physical networks. Nature, 563 (7733): 676-680, 2018.

[20] A. Dijkshoorn, M. Schouten, G. Wolterink, R. Sanders, S. Stramigioli, and G. Krijnen. Characterizing the electrical properties of anisotropic, 3D-printed conductive sheets for sensor applications. IEEE Sens J, 20 (23): 14218-14227, 2020.

[21] E. Dimara and C. Perin. What is interaction for data visualization? IEEE TVCG, 26 (1): 119-129, 2020.

[22] H. djavaherpour, F. Samavati, A. Mahdavi-Amiri, F. Yazdanbakhsh, S. Huron, et al. Data to physicalization: A survey of the physical rendering process. Comput Graph Forum, 40 (3): 569-598, 2021.

[23] Dorota Grabkowska. What Made Me. https://www.grabkowska.com/what-made-me, 2023.

[24] A. Drogemuller, A. Cunningham, J. A. Walsh, J. Baumeister, R. T. Smith, and B. H. Thomas. Haptic and visual comprehension of a 2D graph layout through physicalisation. In Proc. CHI, 2021.

[25] ESD Association. Fundamentals of electrostatic discharge: Part five—device sensitivity and testing. https://www.esda.org/esd-overview/esdfundamentals/part-5-device-sensitivity-and-testing/, 2011.

[26] M. Feick, S. Bateman, A. Tang, A. Miede, and N. Marquardt. TanGi: Tangible proxies for embodied object exploration and manipulation in virtual reality. In Proc. ISMAR, pp. 195-206, 2020.

[27] P. Fens and M. Funk. Personal health data: Visualization modalities and their perceived values. In Proc. WSCG, 2014.

[28] J. D. Foley, V. L. Wallace, and P. Chan. The human factors of computer graphics interaction techniques. IEEE CGA, 4 (11): 13-48, 1984.

[29] C. Freksa, T. Barkowsky, Z. Falomir, and J. van de Ven. Geometric problem-solving with strings and pins. Spat Cogn Comput, 2019.
[30] T. M. Fruchterman and E. M. Reingold. Graph drawing by force-directed placement. Software Pract Exper, 21 (11): 1129-1164, 1991.
[31] T. Fujiwara, J.-K. Chou, S. Shilpika, P. Xu, L. Ren, and K.-L. Ma. An incremental dimensionality reduction method for visualizing streaming multidimensional data. IEEE TVCG, 26 (1): 418-428, 2020.
[32] T. Fujiwara, T. Crnovrsanin, and K.-L. Ma. Concise provenance of interactive network analysis. Visual Informatics, 2 (4): 213-224, 2018.
[33] S. Gerber, P.-T. Bremer, V. Pascucci, and R. Whitaker. Visual exploration of high dimensional scalar functions. IEEE TVCG, 2010.
[34] J. C. Gower, G. B. Dijksterhuis, et al. Procrustes Problems, vol. 30. Oxford University Press on Demand, 2004.
[35] T. Grosse-Puppendahl, C. Holz, G. Cohn, R. Wimmer, O. Bechtold, et al. Finding common ground: A survey of capacitive sensing in humancomputer interaction. In Proc. CHI, p. 3293-3315, 2017.
[36] A. A. Hagberg, D. A. Schult, and P. J. Swart. Exploring network structure, dynamics, and function using NetworkX. In G. Varoquaux, T. Vaught, and J. Millman, eds., Proc. SciPy, pp. 11-15, 2008.
[37] C. Hand. A survey of 3D interaction techniques. Comput Graph Forum, 16 (5): 269-281, 1997.
[38] O. Hanton, M. Wessely, S. Mueller, M. Fraser, and A. Roudaut. Protospray: Combining 3d printing and spraying to create interactive displays with arbitrary shapes. In Proc. CHI, CHI '20, p. 1-13, 2020.
[39] M. Hayes. Lcapy: Symbolic linear circuit analysis with Python. PeerJ Comput Sci, p. e875, 2022.
[40] L. He, J. A. Wittkopf, J. W. Jun, K. Erickson, and R. T. Ballagas. Mod-Elec: A design tool for prototyping physical computing devices using conductive 3D printing. Proc. IMWUT, 5 (4), 2022.
[41] J. Heer, S. K. Card, and J. A. Landay. Prefuse: A toolkit for interactive information visualizaiton. In Proc. CHI, p. 421-430, 2005.
[42] B. Herman, M. Omdal, S. Zeller, C. A. Richter, F. Samsel, G. Abram, and D. F. Keefe. Multi-touch querying on data physicalizations in immersive AR. Proc ACM Hum-Comput Interact, 5 (ISS), 2021.
[43] T. Hermann and H. Ritter. Listen to your data: Model-based sonification for data analysis. Advances in intelligent computing and multimedia systems, 8:189-194, 1999.
[44] G. Hu, M. Mao, Y. Zhao, et al. Remote care and collaboration for empty nest family: Smart home, digital twin and mixed reality. In Proc. ICVR, pp. 126-134, 2022.
[45] H. H. Huang, H. Pfister, and Y. Yang. Is embodied interaction beneficial? A study on navigating network visualizations. Inf Vis, p. 14738716231157082, 2016.
[46] S. Huron, S. Carpendale, A. Thudt, A. Tang, and M. Mauerer. Constructive visualization. In Proc. DIS, p. 433-442, 2014.
[47] M. Ibrahim, Y. Mogan, S. S. Jamry, and R. Periyasamy. Resistivity study on conductive composite filament for freeform fabrication of functionality embedded products. ARPN J Eng Appl Sci, 11 (10), 2016.
[48] iSANMATE. Wood filament PLA+. https://www.isanmate.com/productcategory/3d_filaments/pla/wood_filament, 2023.
[49] Y. Ishiguro and I. Poupyrev. 3d printed interactive speakers. In Proceedings of the SIGCHI Conference on Human Factors in Computing Systems, pp. 1733-1742, 2014.
[50] R. J. Jacob, A. Girouard, L. M. Hirshfield, M. S. Horn, O. Shaer, E. T. Solovey, and J. Zigelbaum. Reality-based interaction: A framework for post-WIMP interfaces. In Proc. CHI, p. 201-210, 2008.
[51] Y. Jansen and P. Dragicevic. An interaction model for visualizations beyond the desktop. IEEE TVCG, 19 (12): 2396-2405, 2013.
[52] Y. Jansen, P. Dragicevic, and J.-D. Fekete. Evaluating the efficiency of physical visualizations. In Proc. CHI, p. 2593-2602, 2013.
[53] Y. Jin, I. Qamar, M. Wessely, A. Adhikari, K. Bulovic, P. Punpongsanon, and S. Mueller. Photo-Chromeleon: Re-programmable multi-color textures using photochromic dyes. In Proc. UIST, p. 701-712, 2019.
[54] D. Keim. Information visualization and visual data mining. IEEE TVCG, 8 (1): 1-8, 2002.
[55] J. W. Kelly, M. N. Avraamides, and N. A. Giudice. Haptic experiences influence visually acquired memories: Reference frames during multimodal spatial learning. Psychon Bull Rev, 18:1119-1125, 2011.
[56] A. Kerren, H. Purchase, and M. Ward. Multivariate Network Visualization: Dagstuhl Seminar #13201. Lecture Notes in Computer Science. Springer International Publishing, 2014.
[57] R. A. Khot, J. Andres, J. Lai, J. von Kaenel, and F. F. Mueller. Fantibles: Capturing cricket fan's story in 3D. In Proc. DIS, p. 883-894, 2016.
[58] M. Le Goc, L. H. Kim, A. Parsaei, J.-D. Fekete, P. Dragicevic, and S. Follmer. Zooids: Building blocks for swarm user interfaces. In Proc. UIST, p. 97-109, 2016.
[59] Z. Liu and J. Stasko. Mental models, visual reasoning and interaction in information visualization: A top-down perspective. IEEE TVCG, 16 (6): 999-1008, 2010.
[60] I. López García and E. Hornecker. Scaling data physicalization-how does size influence experience? In Proc. TEI, pp. 1-14, 2021.
[61] J. Maxwell. Thermodynamic surfaces.
[62] M. J. McGuffin, R. Servera, and M. Forest. Path tracing in 2D, 3D, and physicalized networks. IEEE Trans Vis Compute Graph, pp. 1-14, 2023.
[63] A. Meurer, C. P. Smith, M. Paprocki, O. ˇ Certik, S. B. Kirpichev, et al. SymPy: Symbolic computing in Python. PeerJ Comput Sci, 2017.
[64] Mosaic Manufacturing. Palette 2. https://www.mosaicmfg.com/products/palette-2, 2023. Accessed: 2023 Mar. 24.
[65] M. Newman. Networks. Oxford university press, 2018.
[66] T. D. Ngo, A. Kashani, G. Imbalzano, K. T. Nguyen, and D. Hui. Additive manufacturing (3D printing): A review of materials, methods, applications and challenges. Compos B Eng, 143:172-196, 2018.
[67] M. Ono, B. Shizuki, and J. Tanaka. Touch & activate: adding interactivity to existing objects using active acoustic sensing. In Proc. UIST, pp. 31-40, 2013.
[68] A. Paszke, S. Gross, F. Massa, A. Lerer, J. Bradbury, et al. PyTorch: An imperative style, high-performance deep learning library. In Proc. NeurIPS, vol. 32, 2019.
[69] B. Patnaik, H. Peng, and N. Elmqvist. Sensemaking sans power: Interactive data visualization using color-changing ink. IEEE Transactions on Visualization and Computer Graphics, pp. 1-12, 2022. doi: 10.1109/TVCG.2022.3209631

[70] T. P. Peixoto. The graph-tool python library. figshare, 2014.
[71] T. P. Peixoto. The Netzschleuder network catalogue and repository. https://networks.skewed.de/, 2020.
[72] ProtoPasta. Conductive PLA. https://www.proto-pasta.com/products/conductive-pla, 2023.
[73] Prusa Research. Original Prusa i3 MK3S+. https://www.prusa3d.com/category/original-prusa-i3-mk3s/, 2023.
[74] R. Justin Stewart. Justin stewart's data sculptures. https://www.rbloggers. com/2013/10/the-maker-way-using-r-to-reify-social-mediadata-via-3d-printing/, 2023.
[75] E. D. Ragan, A. Endert, J. Sanyal, and J. Chen. Characterizing provenance in visualization and data analysis: An organizational framework of provenance types and purposes. IEEE TVCG, 22 (1): 31-40, 2016.
[76] W.-D. Rase. Creating physical 3D maps using rapid prototyping techniques. True-3D in Cartography: Autostereoscopic and Solid Visualisation of Geodata, pp. 119-134, 2012.
[77] Robert McNeel & Associates. Rhinoceros. https://www.rhino3d.com/, 2023. Accessed: 2023 Mar. 24.
[78] J. C. Roberts, P. D. Ritsos, S. K. Badam, D. Brodbeck, J. Kennedy, and N. Elmqvist. Visualization beyond the desktop—the next big thing. IEEE Comput Graph Appl, 34 (6): 26-34, 2014.
[79] F. C. Rodríguez, G. Frattini, L. F. Krapp, H. Martinez-Hung, D. M. Moreno, et al. MoleculARweb: A web site for chemistry and structural biology education through interactive augmented reality out of the box in commodity devices. J Chem Educ, 98 (7): 2243-2255, 2021.
[80] J. S. Roo and M. Hachet. One reality: Augmenting how the physical world is experienced by combining multiple mixed reality modalities. In Proc. UIST, p. 787-795, 2017.
[81] H. Rosling. Global population growth, box by box.
[82] S. Ruder. An overview of gradient descent optimization algorithms. arXiv: 1609.04747, 2016.
[83] K. A. Satriadi, J. Smiley, B. Ens, M. Cordeil, T. Czauderna, et al. Tangible globes for data visualisation in augmented reality. In Proc. CHI, 2022.
[84] A. Satyanarayan, D. Moritz, K. Wongsuphasawat, and J. Heer. Vega-Lite: A grammar of interactive graphics. IEEE TVCG, 23 (1): 341-350, 2016.
[85] V. Savage, C. Chang, and B. Hartmann. Sauron: embedded single-camera sensing of printed physical user interfaces. In Proc. UIST, pp. 447-456, 2013.
[86] V. Savage, R. Schmidt, T. Grossman, G. Fitzmaurice, and B. Hartmann. A series of tubes: Adding interactivity to 3D prints using internal pipes. In Proc. UIST, p. 3-12, 2014.
[87] M. Schmitz, M. Khalilbeigi, M. Balwierz, R. Lissermann, M. Mühlhäuser, and J. Steimle. Capricate: A fabrication pipeline to design and 3D print capacitive touch sensors for interactive objects. In Proc. UIST, p. 253-258, 2015.
[88] M. Schmitz, M. Stitz, F. Müller, M. Funk, and M. Mühlhäuser. ./trilaterate: A Fabrication Pipeline to Design and 3D Print Hover-, Touch-, and Force-Sensitive Objects. In Proc. CHI, pp. 1-13, 2019.
[89] K. J. Schönborn, G. E. Höst, and K. E. Lundin Palmerius. Interactive visualization for learning and teaching nanoscience and nanotechnology. In K. Winkelmann and B. Bhushan, eds., Global Perspectives of Nanoscience and Engineering Education, pp. 195-222. Springer, 2016.
[90] E. Segel and J. Heer. Narrative visualization: Telling stories with data. IEEE TVCG, 16 (6): 1139-1148, 2010.
[91] N. Shervashidze, S. Vishwanathan, T. Petri, K. Mehlhorn, and K. Borgwardt. Efficient graphlet kernels for large graph comparison. In Artificial intelligence and statistics, pp. 488-495. PMLR, 2009.
[92] B. Shneiderman. The eyes have it: A task by data type taxonomy for information visualizations. In Proc. VL, pp. 336-343, 1996.
[93] W.-S. Soh, K.-Y. See, W.-Y. Chang, M. Oswal, L.-B. Wang, et al. Comprehensive analysis of serpentine line design. In 2009 Asia Pacific Microwave Conference, pp. 1285-1288. IEEE, 2009.
[94] S. Stusak, M. Hobe, and A. Butz. If your mind can grasp it, your hands will help. In Proc. TEI, p. 92-99, 2016.
[95] S. Stusak, J. Schwarz, and A. Butz. Evaluating the memorability of physical visualizations. In Proc. CHI, p. 3247-3250, 2015.
[96] S. Stusak, A. Tabard, F. Sauka, R. A. Khot, and A. Butz. Activity Sculptures: Exploring the impact of physical visualizations on running activity. IEEE TVCG, 20 (12): 2201-2210, 2014.
[97] S. Swaminathan, C. Shi, Y. Jansen, P. Dragicevic, L. A. Oehlberg, and J.-D. Fekete. Supporting the design and fabrication of physical visualizations. In Proc. CHI, p. 3845-3854, 2014.
[98] F. Taher, Y. Jansen, J. Woodruff, J. Hardy, K. Hornbæk, and J. Alexander. Investigating the use of a dynamic physical bar chart for data exploration and presentation. IEEE TVCG, 23 (1): 451-460, 2017.
[99] C. E. Tejada, R. Ramakers, S. Boring, and D. Ashbrook. Airtouch: 3dprinted touch-sensitive objects using pneumatic sensing. In Proc. CHI, pp. 1-10, 2020.
[100] M. C. Thrun and F. Lerch. Visualization and 3D printing of multivariate data of biomarkers. In Proc. WSCG, 2016.
[101] P. W. Tuinenga. SPICE A Guide to Circuit Simulation and Analysis Using PSpice. Prentice-Hall, Inc., 1995.
[102] Ultimaker. Ultimaker S3. https://ultimaker.com/3d-printers/ultimaker-s3, 2023.
[103] J. Vasquez, H. Twigg-Smith, J. Tran O'Leary, and N. Peek. Jubilee: An extensible machine for multi-tool fabrication. In Proc. CHI, p. 1-13, 2020.
[104] G. Verhulsdonck. Issues of designing gestures into online interactions: Implications for communicating in virtual environments. In Proc. DOC, pp. 26-33, 2007.
[105] P. Virtanen, R. Gommers, T. E. Oliphant, M. Haberland, et al. SciPy 1.0: Fundamental algorithms for scientific computing in Python. Nat Methods, 17:261-272, 2020.
[106] Y. Wang, Z. Jin, Q. Wang, W. Cui, T. Ma, and H. Qu. DeepDrawing: A deep learning approach to graph drawing. IEEE TVCG, 26 (1): 676-686, 2020.
[107] M. Whitlock, S. Smart, and D. A. Szafir. Graphical perception for immersive analytics. In Proc. VR, pp. 616-625, 2020.
[108] K. Willis, E. Brockmeyer, S. Hudson, and I. Poupyrev. Printed optics: 3D printing of embedded optical elements for interactive devices. In Proc. UIST, pp. 589-598, 2012.
[109] J. A. Wittkopf, K. Erickson, P. Olumbummo, A. Hartman, H. Tom, and L. Zhao. 3d printed electronics with multi jet fusion. In NIP & Digital Fabrication Conference, vol. 2019, pp. 29-33. Society for Imaging Science and Technology, 2019.
[110] K. Xu, S. Attfield, T. Jankun-Kelly, A. Wheat, P. H. Nguyen, and N. Selvaraj. Analytic provenance for sensemaking: A research agenda. IEEE Comput Graph Appl, 35 (3): 56-64, 2015.

[111] J. S. Yi, Y. a. Kang, J. Stasko, and J. Jacko. Toward a deeper understanding of the role of interaction in information visualization. IEEE TVCG, 13 (6): 1224-1231, 2007.
[112] A. Ynnerman, J. Löwgren, and L. Tibell. Exploranation: A new science communication paradigm. IEEE Comput Graph Appl, 38 (3): 13-20, 2018.
[113] A. Ynnerman, T. Rydell, D. Antoine, D. Hughes, A. Persson, and P. Ljung. Interactive visualization of 3D scanned mummies at public venues. Commun ACM, 59 (12): 72-81, 2016.

REFERENCE LIST #2

[1'] Moritz Bächer, Benjamin Hepp, Fabrizio Pece, Paul G. Kry, Bernd Bickel, Bernhard Thomaszewski, and Otmar Hilliges. 2016. DefSense: Computational design of customized deformable input devices. In Proc. CHI. ACM, New York, NY, USA, 3806-3816. https://doi.org/10.1145/2858036.2858354
[2'] S. Sandra Bae, Takanori Fujiwara, Anders Ynnerman, Ellen Yi-Luen Do, Michael L. Rivera, and Danielle Albers Szafir. 2024. A computational design pipeline to fabricate sensing network physicalizations. IEEE Transactions on Visualization and Computer Graphics 30, 1 (2024), 913-923. https://doi.org/10.1109/TVCG. 2023.3327198
[3'] Rafael Ballagas, Sarthak Ghosh, and James Landay. 2018. The design space of 3D printable interactivity. Proceedings of the ACM on Interactive, Mobile, Wearable and Ubiquitous Technologies 2, 2 (2018), 1-21.
[4'] Patrick Baudisch and Stefanie Mueller. 2017. Personal fabrication. Foundations and Trends® in Human-Computer Interaction 10, 3-4 (2017), 165-293. https://doi.org/10.1561/1100000055
[5'] Jesse Burstyn, Nicholas Fellion, Paul Strohmeier, and Roel Vertegaal. 2015. Print-Put: Resistive and capacitive input widgets for interactive 3D prints. In Proc. INTERACT. Springer, Cham, 332-339. https://doi.org/10.1007/978-3-319-22701-6_25
[6'] Chris. 2018. The perfect multi-button input resistor ladder. http://www.ignorantofthings.com/2018/07/the-perfect-multi-button-input-resistor.html
[7'] ESD Association. 2020. Fundamentals of electrostatic discharge: Part five-device sensitivity and testing. https://www.esda.org/esd-overview/esdfundamentals/part-5-device-sensitivity-and-testing/.
[8'] David Espalin, Danny W Muse, Eric MacDonald, and Ryan B Wicker. 2014. 3D Printing multifunctionality: Structures with electronics. The International Journal of Advanced Manufacturing Technology 72 (2014), 963-978.
[9'] Patrick F. Flowers, Christopher Reyes, Shengrong Ye, Myung Jun Kim, and Benjamin J. Wiley. 2017. 3D printing electronic components and circuits with conductive thermoplastic filament. Additive Manufacturing 18 (2017), 156-163. https://doi.org/10.1016/j.addma.2017.10.002
[10'] Guo Liang Goh, Haining Zhang, Tzyy Haur Chong, and Wai Yee Yeong. 2021. 3D printing of multilayered and multimaterial electronics: a review. Advanced Electronic Materials 7, 10 (2021), 2100445.
[11'] Daniel Groeger, Elena Chong Loo, and Jürgen Steimle. 2016. HotFlex: Post-print customization of 3D prints using embedded state change. In Proc. CHI. ACM, New York, NY, USA, 420-432. https://doi.org/10.1145/2858036.2858191
[12'] Tobias Grosse-Puppendahl, Christian Holz, Gabe Cohn, Raphael Wimmer, Oskar Bechtold, et al. 2017. Finding common ground: A survey of capacitive sensing in human-computer interaction. In Proc. CHI. ACM, New York, 3293-3315. https://doi.org/10.1145/3025453.3025808
[13'] Peter E Hart, Nils J Nilsson, and Bertram Raphael. 1968. A formal basis for the heuristic determination of minimum cost paths. IEEE Transactions on Systems Science and Cybernetics 4, 2 (1968), 100-107.
[14'] Michael Hayes. 2022. Lcapy: Symbolic linear circuit analysis with Python. PeerJ Computer Science (2022), e875: 1-e875: 30. https://doi.org/10.7717/peerj-cs.875
[15'] Liang He, Jarrid A. Wittkopf, JiWon Jun, Kris Erickson, and Rafael Tico Ballagas. 2022. ModElec: A design tool for prototyping physical computing devices using conductive 3D printing. Proc ACM Interact Mob Wearable Ubiquitous Technol 5, 4, Article 159 (2022), 20 pages. https://doi.org/10.1145/3495000
[16'] Garrett Johnson. 2023. three-mesh-bvh. https://github.com/gkjohnson/threemesh-bvh. Accessed: 2023 Sep. 10.
[17'] Eric Macdonald, Rudy Salas, David Espalin, Mireya Perez, Efrain Aguilera, Dan Muse, and Ryan B. Wicker. 2014. 3D Printing for the rapid prototyping of structural electronics. IEEE Access 2 (2014), 234-242. https://doi.org/10.1109/access.2014.2311810
[18'] Aaron Meurer, Christopher P Smith, Mateusz Paprocki, Ondřej Čertík, Sergey B Kirpichev, et al. 2017. SymPy: Symbolic computing in Python. PeerJ Computer Science (2017).
[19'] Fabian Pedregosa, Gaël Varoquaux, Alexandre Gramfort, Vincent Michel, Bertrand Thirion, et al. 2011. Scikit-learn: Machine learning in Python. Journal of Machine Learning Research 12 (2011), 2825-2830.
[20'] Tiago P. Peixoto. 2014. The graph-tool python library. figshare (2014). http://figshare.com/articles/graph_tool/1164194.
[21'] Huaishu Peng, Jennifer Mankoff, Scott E. Hudson, and James McCann. 2015. A layered fabric 3D printer for soft interactive objects. In Proc. CHI. ACM, New York, NY, USA, 1789-1798. https://doi.org/10.1145/2702123.2702327
[22'] Narjes Pourjafarian, Anusha Withana, Joseph A. Paradiso, and Jürgen Steimle. 2019. Multi-Touch Kit: A do-it-yourself technique for capacitive multi-touch sensing using a commodity microcontroller. In Proc. UIST (New Orleans, LA, USA). ACM, New York, NY, USA, 1071-1083. https://doi.org/10.1145/3332165. 3347895
[23'] ProtoPasta. 2023. Conductive PLA. https://www.proto-pasta.com/products/conductive-pla. Accessed: 2023 Jun. 28.
[24'] Jordi-Roger Riba, Francesca Capelli, and Manuel Moreno-Eguilaz. 2019. Analysis and mitigation of stray capacitance effects in resistive high-voltage dividers. Energies 12, 12 (2019). https://doi.org/10.3390/en12122278
[25'] Jarek Rossignac. 2005. Shape complexity. The Visual Computer 21 (2005), 985-996.
[26'] Munehiko Sato, Ivan Poupyrev, and Chris Harrison. 2012. Touché: enhancing touch interaction on humans, screens, liquids, and everyday objects. In Proceedings of the SIGCHI Conference on Human Factors in Computing Systems (Austin, Texas, USA) (CHI '12). Association for Computing Machinery, New York, NY, USA, 483-492. https://doi.org/10.1145/2207676.2207743
[27'] Valkyrie Savage, Colin Chang, and Björn Hartmann. 2013. Sauron: Embedded single-camera sensing of printed physical user interfaces. In Proc. UIST. ACM, New York, 447-456. https://doi.org/10.1145/2501988.2501992
[28'] Valkyrie Savage, Ryan Schmidt, Tovi Grossman, George Fitzmaurice, and Björn Hartmann. 2014. A series of tubes: Adding interactivity to 3D prints using internal pipes. In Proc. UIST. ACM, New York, 3-12. https://doi.org/10.1145/2642918.2647374
[29'] Martin Schmitz, Mohammadreza Khalilbeigi, Matthias Balwierz, Roman Lissermann, Max Mühlhäuser, and Jürgen Steimle. 2015. Capricate: A fabrication pipeline to design and 3D print capacitive touch sensors for interactive objects. In Proc. UIST. ACM, New York, 253-258. https://doi.org/10.1145/2807442.2807503
[30'] Martin Schmitz, Florian Müller, Max Mühlhäuser, Jan Riemann, and Huy Viet Viet Le. 2021. Itsy-Bits: Fabrication and recognition of 3D-printed tangibles with small footprints on capacitive touchscreens. In Proc. CHI. ACM, New York, NY, USA, Article 419, 12 pages. https://doi.org/10.1145/3411764.3445502
[31'] Martin Schmitz, Jürgen Steimle, Jochen Huber, Niloofar Dezfuli, and Max Mühlhäuser. 2017. Flexibles: Deformation-aware 3D-printed tangibles for capacitive touchscreens. In Proc. CHI. ACM, New York, NY, USA, 1001-1014. https://doi.org/10.1145/3025453.3025663
[32'] Martin Schmitz, Martin Stitz, Florian Müller, Markus Funk, and Max Mühlhäuser. 2019 . . . /trilaterate: A fabrication pipeline to design and 3D print hover-, touch-, and force-sensitive objects. In Proc. CHI. ACM, New York, 1-13. https://doi.org/10.1145/3290605.3300684
[33'] Will Schroeder, Ken Martin, and Bill Lorensen. 2006. The Visualization Toolkit (4th ed.). Kitware.
[34'] Wei-Shan Soh, Kye-Yak See, Weng-Yew Chang, Manish Oswal, Lin-Biao Wang, et al. 2009. Comprehensive analysis of serpentine line design. In Proc. APMC. IEEE, USA, 1285-1288. https://doi.org/10.1109/APMC.2009.5384455
[35'] Bane Sullivan and Alexander Kaszynski. 2019. PyVista: 3D plotting and mesh analysis through a streamlined interface for the Visualization Toolkit (VTK). Journal of Open Source Software 4, 37 (May 2019), 1450. https://doi.org/10.21105/joss.01450
[36'] Saiganesh Swaminathan, Jonathon Fagert, Michael Rivera, Andrew Cao, Gierad Laput, Hae Young Noh, and Scott E. Hudson. 2020. OptiStructures: Fabrication of room-scale interactive structures with embedded fiber Bragg grating optical sensors and displays. Proceedings of the ACM on Interactive, Mobile, Wearable and Ubiquitous Technologies 4, 2, Article 50 (June 2020), 21 pages. https://doi.org/10.1145/3397310
[37'] three.js authors. 2023. three.js. https://github.com/mrdoob/three.js. Accessed: 2023 Sep. 10.
[38'] Nobuyuki Umetani and Ryan Schmidt. 2017. SurfCuit: Surface-mounted circuits on 3D prints. IEEE Computer Graphics and Applications 37, 3 (2017), 52-60. https://doi.org/10.1109/MCG.2017.40
[39'] Pauli Virtanen, Ralf Gommers, Travis E Oliphant, Matt Haberland, et al. 2020. SciPy 1.0: Fundamental algorithms for scientific computing in Python. Nature Methods 17 (2020), 261-272. https://doi.org/10.1038/s41592-019-0686-2
[40'] Guanyun Wang, Fang Qin, Haolin Liu, Ye Tao, Yang Zhang, Yongjie Jessica Zhang, and Lining Yao. 2020. MorphingCircuit: An integrated design, simulation, and fabrication workflow for self-morphing electronics. Proceedings of the ACM on Interactive, Mobile, Wearable and Ubiquitous Technologies 4, 4 (2020), 1-26.
[41'] Qingnan Zhou and Alec Jacobson. 2016. Thingi10 k: A dataset of 10,000 3Dprinting models. arXiv preprint arXiv: 1605.04797 (2016).
[42'] Junyi Zhu, Lotta-Gili Blumberg, Yunyi Zhu, Martin Nisser, Ethan Levi Carlson, Xin Wen, Kevin Shum, Jessica Ayeley Quaye, and Stefanie Mueller. 2020. CurveBoards: Integrating breadboards into physical objects to prototype function in the context of form. In Proc. CHI. ACM, New York, NY, USA, 1-13. https://doi.org/10.1145/3313831.3376617
[43'] Junyi Zhu, Yunyi Zhu, Jiaming Cui, Leon Cheng, Jackson Snowden, Mark Chounlakone, Michael Wessely, and Stefanie Mueller. 2020. MorphSensor: A 3D electronic design tool for reforming sensor modules. In Proc. UIST (Virtual Event. USA). ACM, New York. NY. USA. 541-553. https://doi.org/10.1145/3379337. 3415898

What is claimed is:

1. A system for capacitive touch sensing, the system comprising:

a resistor network comprising a first subcircuit and a plurality of touch-sensing nodes, the plurality of touch-sensing nodes including a first node and one or more additional nodes, wherein: i) the first node is electrically connected to the first subcircuit by a first conductor, ii) the first node is electrically connected to at least one of the one or more additional nodes by a second conductor, and iii) the one or more additional touch-sensing nodes are electrically interconnected by respective third conductors; and a controller configured to:

detect a voltage drop on the first subcircuit responsive to one of the plurality of touch-sensing nodes being touched or contacted; and determine which of the plurality of touch-sensing nodes was touched or contacted based on a time delay between detecting the voltage drop and a voltage on the first subcircuit returning to a first threshold, wherein each of the plurality of touch-sensing nodes is associated with a unique time delay responsive to being touched.

2. The system of claim 1, wherein the controller is further configured to apply an initial voltage to the first subcircuit.

3. The system of claim 1, wherein the controller is configured to output an encoded signal or a data value of the determined touch-sensing node.

4. The system of claim 3, wherein the controller is further configured to determine when two of the plurality of touch-sensing nodes are simultaneously touched, and wherein the controller is configured to modify the output of the encoded signal or the data value based on the determination.

5. The system of claim 1, wherein the resistive network connects to an input of the controller.

6. The system of claim 1, wherein the resistive network connects to two inputs of the controller.

7. The system of claim 1, wherein the plurality of touch-sensing nodes each has (i) an area having a defined resistance that is substantially lower than the conductors and (ii) the area having a define capacitance that is substantially higher than the conductors, to effect a resistor-capacitor (RC) delay when touched or contacted by the capacitive body.

8. The system of claim 1, wherein the first conductor, second conductor, and third conductors are conductive traces, ink, or dyes.

9. The system of claim 1, wherein the circuit is integrated or embedded into a substrate comprising a 3-dimensional (3D) object.

10. The system of claim 1, wherein the controller comprises a microcontroller, wherein the single-conductor circuit is connected to a general purpose input/output pin, and wherein the determining which of the plurality of touch-sensing nodes.

11. The system of claim 1, wherein the substrate is a fabric or textile.

12. The system of claim 1, wherein the single-conductor circuit forms a touch or contact sensor sensitive to electrostatic discharge.

13. The system of claim 1, wherein the 3D object and the circuit are 3D printed using multi-material printing.

14. The system of claim 1, wherein the resistor network was determined by constructing a weighted neighbor graph of vertices and finding a path between pairs of the vertices.

15. A method for detecting touch at a given location on a substrate, the method comprising:

providing a touch-sensing circuit formed on the substrate, the touch-sensing circuit comprising a first subcircuit and a plurality of touch-sensing nodes, the plurality of touch-sensing nodes including a first node and one or more additional nodes, wherein: i) the first node is electrically connected to the first subcircuit by a first conductor, ii) the first node is electrically connected to at least one of the one or more additional nodes by a second conductor, and iii) the one or more additional touch-sensing nodes are electrically interconnected by respective third conductors;

detecting a voltage drop on the first subcircuit responsive to one of the plurality of touch-sensing nodes being touched or contacted by a capacitive body; and determining which of the plurality of touch-sensing nodes was touched or contacted based on a time delay between detecting the voltage drop and a voltage on the first subcircuit returning to a threshold, wherein each of the plurality of touch-sensing nodes is associated with a unique time delay responsive to being touched.

16. The method of claim 15, further comprising applying an initial voltage to the first subcircuit.

17. The method of claim 15, further comprising:

outputting an encoded signal or a data value of the determined touch-sensing node.

18. The method of claim 15, wherein the circuit is integrated into a 3-dimensional (3D) object or fabric.

19. The method of claim 15, wherein the 3D object and the circuit are 3D printed using multi-material printing.

20. A method of fabricating a resistor network for a capacitive touch or contact sensing apparatus, the method comprising:

forming a resistor network comprising a first subcircuit and a plurality of touch-sensing nodes, the plurality of touch-sensing nodes including a first node and one or more additional nodes, wherein: i) the first node is electrically connected to the first subcircuit by a first conductor, ii) the first node is electrically connected to at least one of the one or more additional nodes by a second conductor, and iii) the one or more additional touch-sensing nodes are electrically interconnected by respective third conductors; and connecting a controller to the resistor network, the controller being configured to: (i) detect a voltage drop on the first subcircuit responsive to one of the plurality of touch-sensing nodes being touched or contacted and (ii) determine which of the plurality of touch-sensing nodes was touched or contacted based on a time delay between detecting the voltage drop and a voltage on the first subcircuit returning to a first threshold, wherein each of the plurality of touch-sensing nodes is associated with a unique time delay responsive to being touched.

* * * * *